(12) United States Patent
Meyers et al.

(10) Patent No.: US 8,983,303 B2
(45) Date of Patent: Mar. 17, 2015

(54) QUANTUM BASED INFORMATION TRANSFER SYSTEM AND METHOD

(71) Applicant: U.S. Army Research Laboratory, Adelphi, MD (US)

(72) Inventors: Ronald E Meyers, Columbia, MD (US); Keith S Deacon, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 11 days.

(21) Appl. No.: 13/948,660

(22) Filed: Jul. 23, 2013

(65) Prior Publication Data

US 2013/0308956 A1 Nov. 21, 2013

Related U.S. Application Data

(63) Continuation-in-part of application No. 12/705,566, filed on Feb. 12, 2010, now Pat. No. 8,503,885, which is a continuation-in-part of application No. 11/196,738, filed on Aug. 4, 2005, now Pat. No. 7,660,533.

(60) Provisional application No. 60/598,537, filed on Aug. 4, 2004.

(51) Int. Cl.
*H04B 10/00* (2013.01)
*H04B 10/11* (2013.01)
(Continued)

(52) U.S. Cl.
CPC .............. *H04B 10/11* (2013.01); *G06N 99/002* (2013.01); *H04B 10/70* (2013.01); *Y10S 977/933* (2013.01); *B82Y 10/00* (2013.01); *B82Y 20/00* (2013.01)

USPC ........................... 398/140; 398/152; 977/933

(58) Field of Classification Search
USPC .................................. 398/140, 152; 380/256
See application file for complete search history.

(56) References Cited

U.S. PATENT DOCUMENTS 7,180,645 B2 2/2007 Azuma
7,536,012 B1 5/2009 Meyers et al.
(Continued)

OTHER PUBLICATIONS

Sangouard, Nicolas, et al. "Quantum repeaters based on atomic ensembles and linear optics," Review of Modern Physics, vol. 83, Jan.-Mar. 2011.

(Continued)

*Primary Examiner* — Daniel Dobson
(74) *Attorney, Agent, or Firm* — Lawrence E. Anderson

(57) ABSTRACT

A method and system for transferring data comprising:
  an entangled photon source for producing first and second entangled photons associated with a receiver and a sender, respectively;
  a Bell state measurement device for performing a joint Bell state measurement on the second entangled photon and the at least one qubit; the Bell state measurement device outputting two bits of data to be used at the receiver;
  a transmission channel for transmitting two bits from the outcome of the Bell state measurement device to the receiver;
  a unitary transformation device for performing a unitary transformation operation on the first entangled photon based upon the value of the two bits of data;
  at least one detector for detecting encoded information from the first entangled photon;
at least one processor operating to determine whether or not to transmit portions of data from a sequential successive qubit based upon the preceding qubit.

20 Claims, 21 Drawing Sheets

(51) Int. Cl.
*G06N 99/00* (2010.01)
*H04B 10/70* (2013.01)
*H04B 10/06* (2006.01)
*B82Y 10/00* (2011.01)
*B82Y 20/00* (2011.01)

(56) References Cited

U.S. PATENT DOCUMENTS

| | | | |
|---|---|---|---|
| 7,660,533 | B1 | 2/2010 | Meyers et al. |
| 8,103,172 | B2 | 1/2012 | Peters |
| 2004/0252732 | A1 | 12/2004 | Ralph |
| 2008/0089696 | A1 | 4/2008 | Furuta |
| 2010/0150222 | A1* | 6/2010 | Meyers et al. ............ 375/240 |
| 2012/0237209 | A1* | 9/2012 | Ohkawa ..................... 398/25 |
| 2012/0237210 | A1* | 9/2012 | Ohkawa ..................... 398/25 |

OTHER PUBLICATIONS

Long, Gui-Lu et al. "Efficient scheme for initializing a quantum register with an arbitrary superposed state," The American Physical Society, Physical Review A, vol. 64, 014303 (2001).

Lloyd, S., et al. "Long Distance, Unconditional Teleportation of Atomic States via Complete Bell State Measurements," vol. 87, No. 16 Physical Review Letters 167903-1 (Oct. 15, 2001).

Peckham, Matt, "World's First Quantum Network Built with Two Atoms, One Photon," Time Magazine, Time.com (Apr. 12, 2012).

http://techland.time.com/2012/04/ 12/worlds-first-auantum-nctwork-built-with-two-atoms.

Kwiat, Paul G., et al., "Embedded Bell-state analysis," Physical Review A, Atomic, Molecular, and Optical Physics Third Series, vol. 58, No. 4, PRA 58 R2623 (Oct. 1998).

Kim, Yoon-ho, et al.,"Quantum Teleportation of a Polarization State with a Complete Bell State Measurement," Phys. Rev. Lett. 86 1370 Feb. 2001.

Ma, et al., "Single photon frequency up-conversion and its applications," Proc. of SPIE vol. 8163 81630N-1 (2011).

Coppersmith, D. "An approximate Fourier transform useful in quantum factoring," arXiv:quant-ph/0201 067v1 (Jan. 2002).

Griffiths, et al. "Semiclassical Fourier Transform for Quantum Computation," Phys. Rev. Letters, vol. 78, No. 17, pp. 3228-3231 (Apr. 22, 1996).

Lee, et al. "Treatment of sound on quantum computers" arXiv:quant-ph/0309018v1 Sep. 1, 2003.

Lijun, Mi, "Single photon frequency up-conversion and its applications," Information Technology Laboratory, National Institute of Standards and Technology, Physics Reports, vol. 521, Issue 2, Dec. 2012, pp. 69-94.

Shahriar, M. S. Connecting processing-capable quantum memories over telecommunication links via quantum frequency conversion, J. Phys. B: At. Mol. Opt. Phys. 45 (2012) 124018 (14pp).

Meyers, R., et al. "A Quantum Network with Atoms and Photons (QNET-AP)" Proc. of SPIE vol. 8518 85180G-2 (2012).

\* cited by examiner

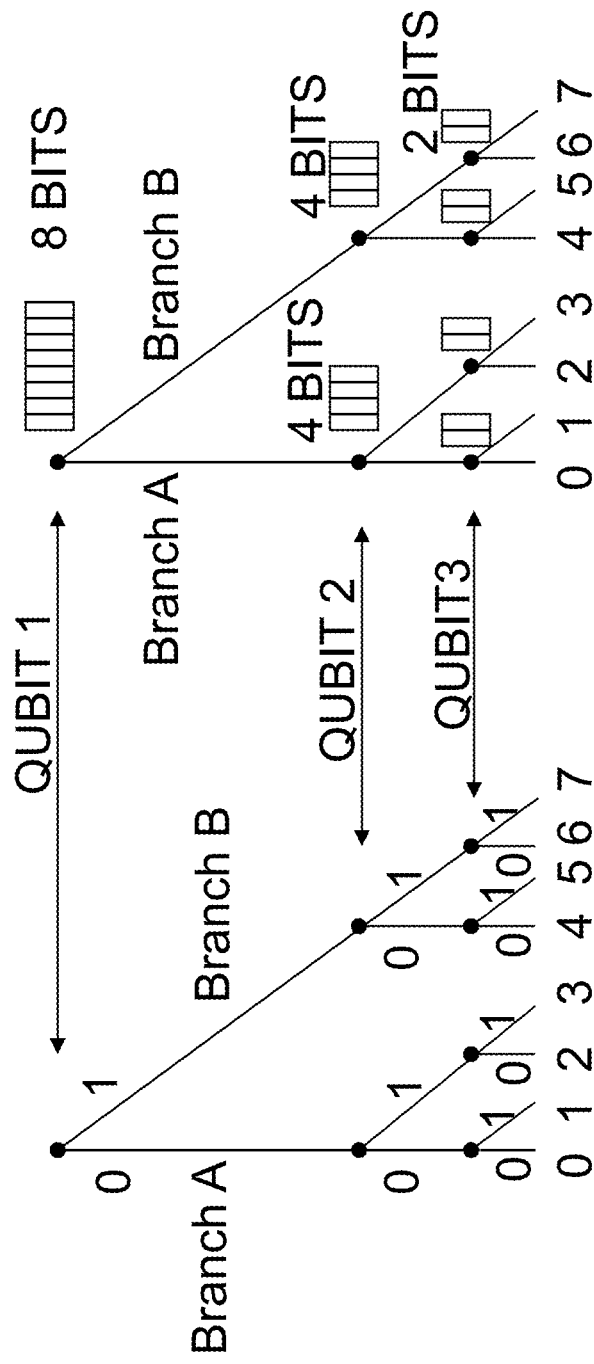
FIG. 1 QUANTUM BINARY TREE

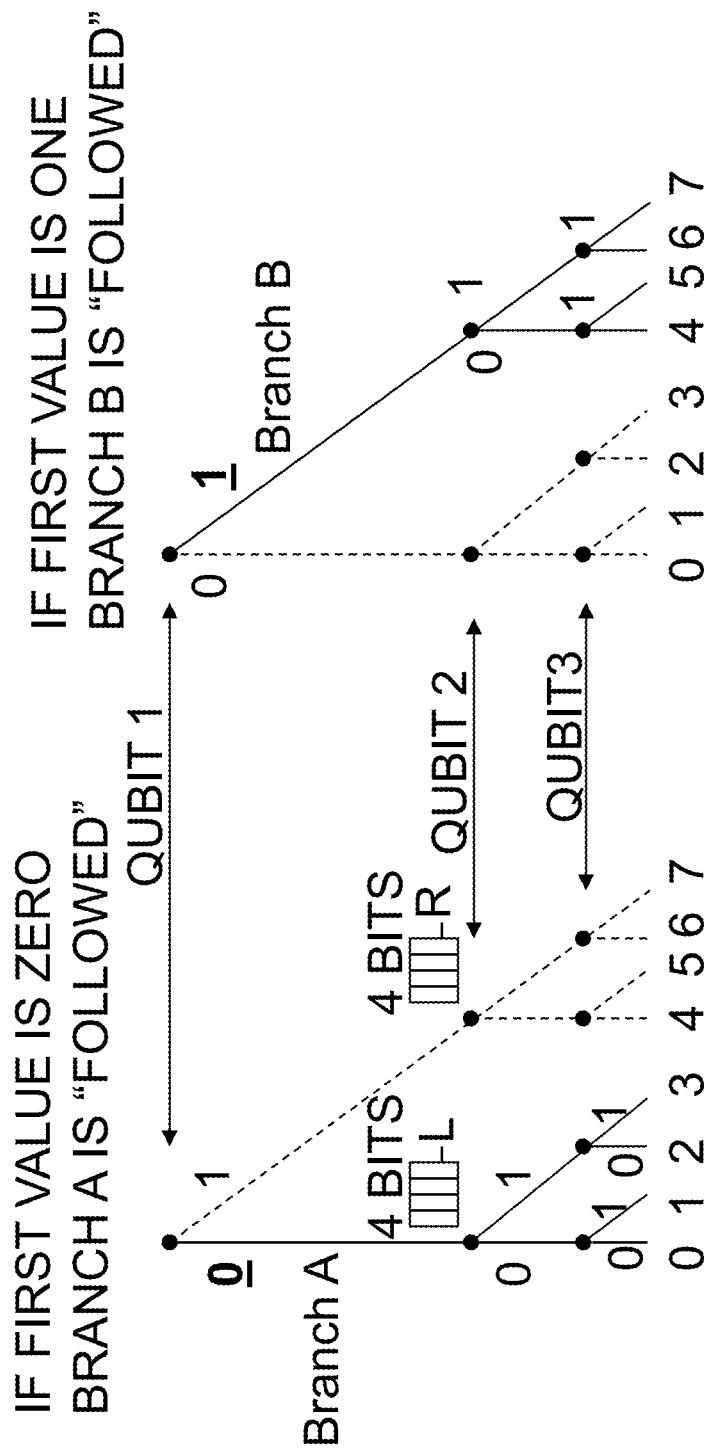
FIG. 1A QUANTUM BINARY TREE – FIRST BRANCH

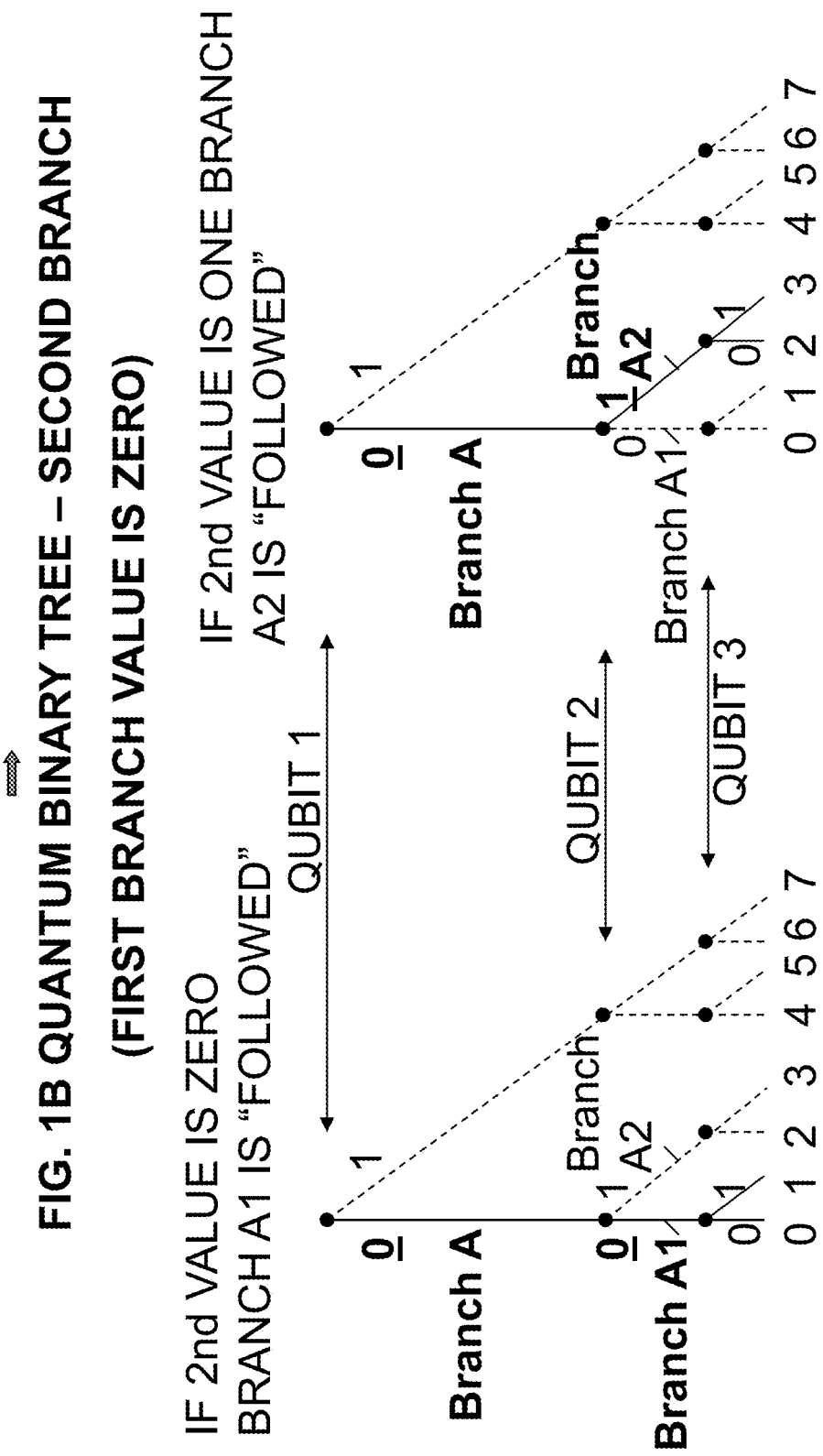
FIG. 1B QUANTUM BINARY TREE – SECOND BRANCH
(FIRST BRANCH VALUE IS ZERO)

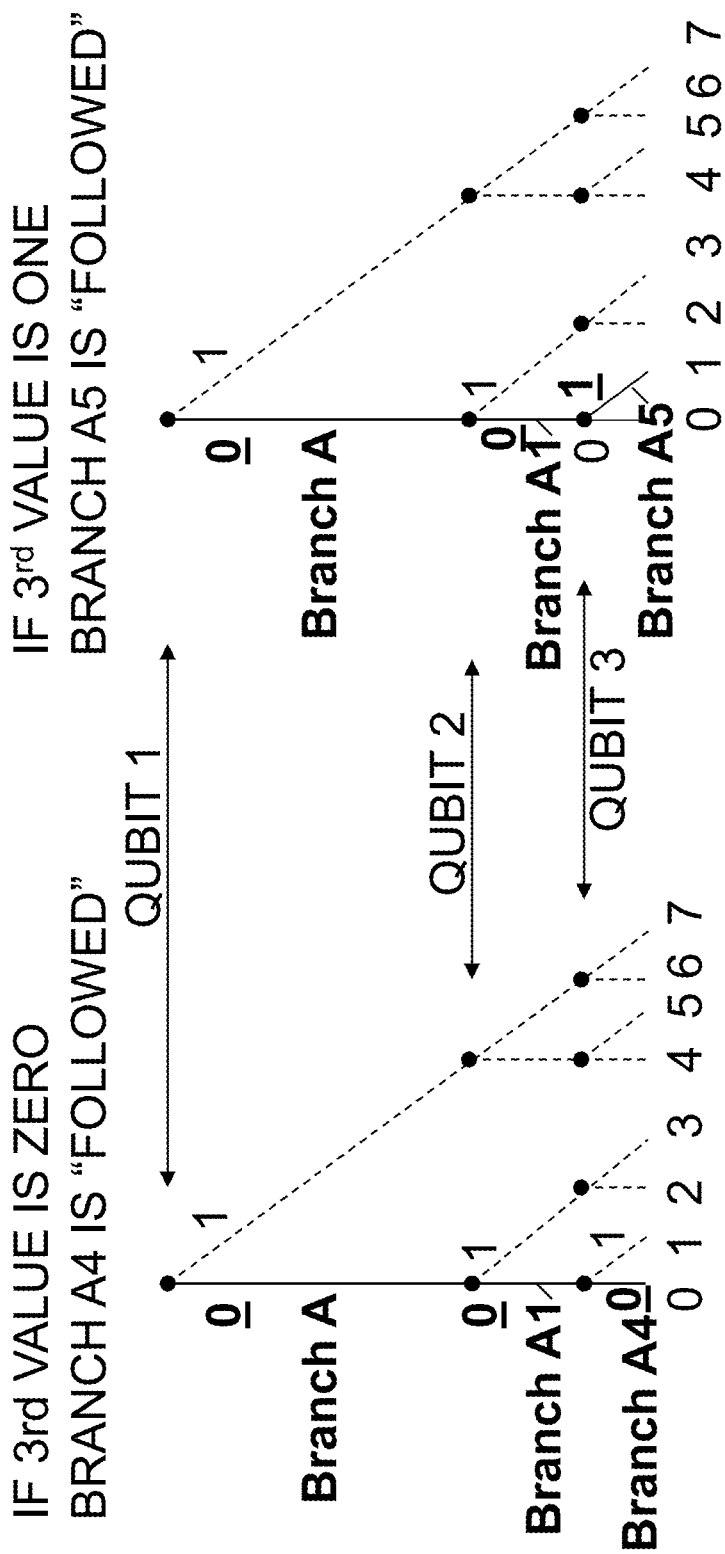

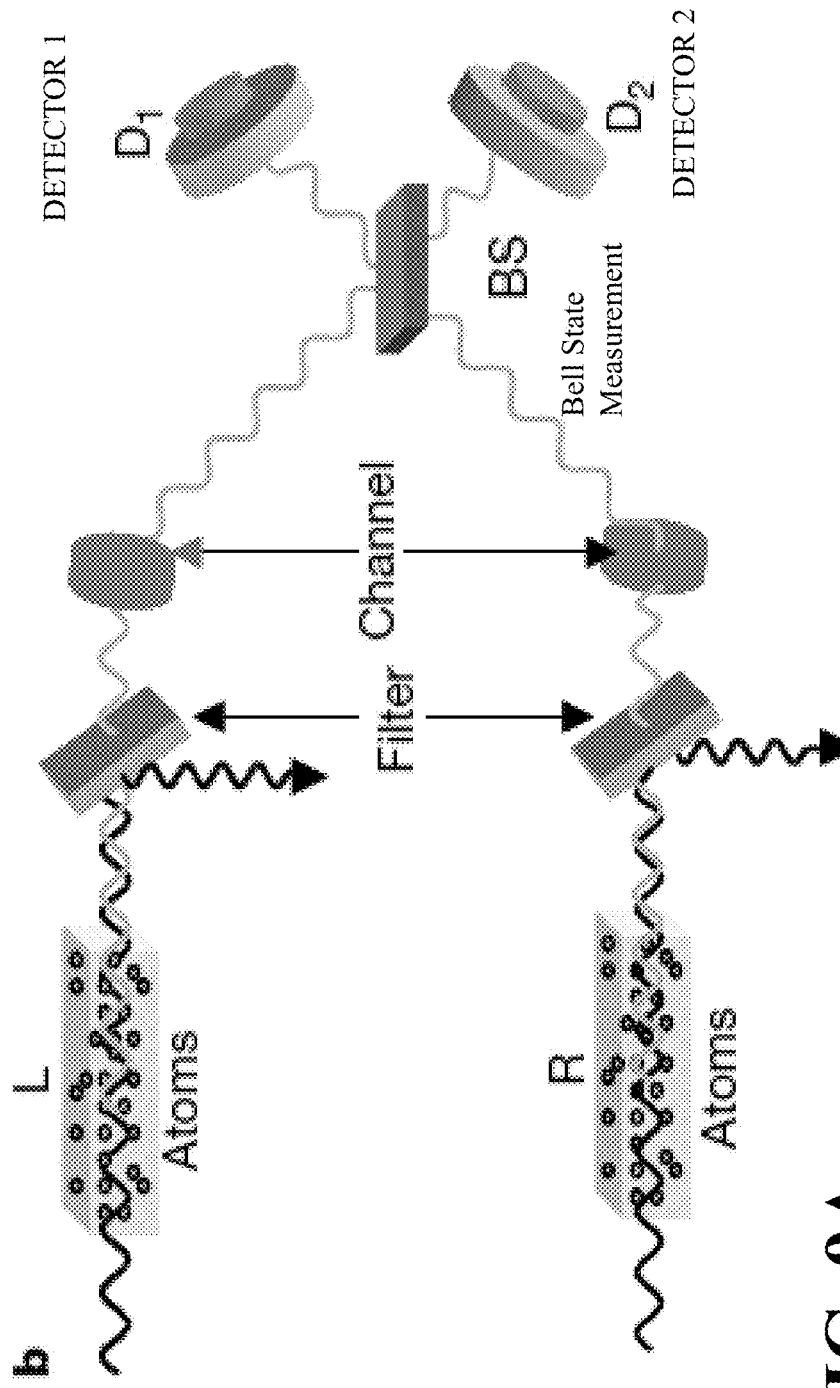
FIG. 9A  PRIOR ART Layout for demonstration of DLCZ protocol.1

PRIOR ART Phase stable scheme for entangling distant atomic ensembles through two-photon Hong-Ou-Mandel type interference.

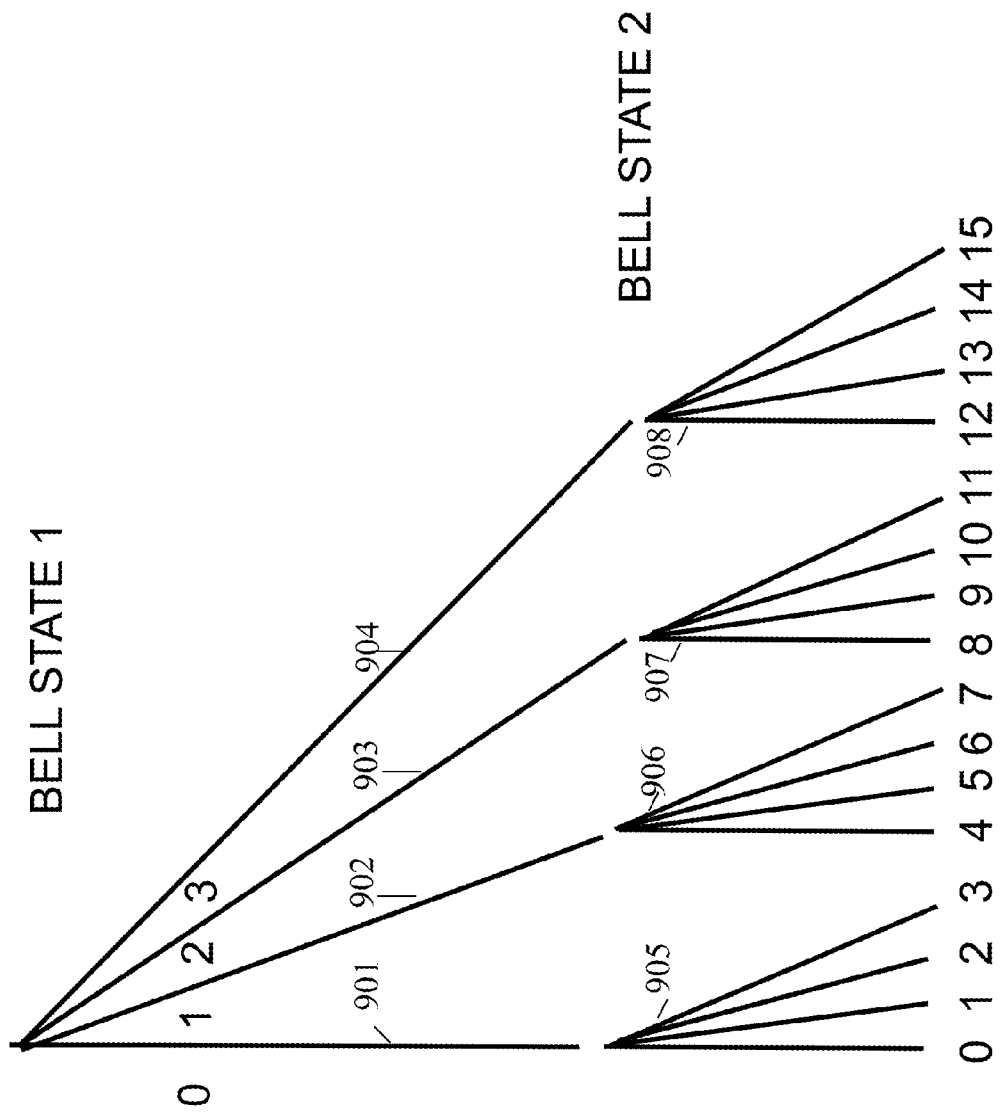
FIG. 17 QUANTUM QUAD TREE

QUANTUM BASED INFORMATION TRANSFER SYSTEM AND METHOD

CROSS REFERENCE TO RELATED APPLICATIONS

This application claims priority to and the benefit of U.S. patent application Ser. No. 12/705,566 entitled "Quantum Based Information Transmission System and Method," filed Feb. 12, 2010, by Ronald E. Meyers and Keith S. Deacon, the inventors herein, which in turn claims priority to U.S. application Ser. No. 11/196,738, filed Aug. 4, 2005, which issued as U.S. Pat. No. 7,646,797 on Feb. 9, 2010, and U.S. Provisional Patent Application Ser. No. 60/598,537 filed Aug. 4, 2004, all three of which are incorporated herein by reference.

GOVERNMENT INTEREST

The invention described herein may be manufactured, used, and licensed by or for the United States Government.

BACKGROUND OF THE INVENTION

This invention relates in general to methods and apparatus for processing, compression, and transmission of data based upon quantum properties and in particular to high density transmission of data employing the quantum teleportation of information as the means to transfer quantum information from the sender to the receiver. Quantum teleportation of information is linked to the property of quantum entanglement. Quantum entanglement can exist between any two quantum systems such as between two photons, two atomic/ionic systems, or between a photon and an atom/ion based quantum system. Prior art FIG. 9A, is a layout for the demonstration of DLCZ protocol 1 wherein atoms L and R are entangled and a Bell state measurement is performed with detection by detectors D1 and D2. In FIG. 9B a phase stable scheme is proposed for entangling distant atomic ensembles through two-photon Hong-Ou-Mandel type interference. Note that a Bell state measurement is depicted in the center of FIG. 9B.

The combination of combining the data compression of application Ser. No. 12/705,566 entitled "Quantum Based Information Transmission System and Method" with the teleportation of quantum information provides an efficient use of the quantum entanglement resources.

Generally speaking, quantum computing represents a revolutionary frontier technology undergoing intense development. Quantum computing, for example, may render classically intractable computations feasible. In spite of theoretical calculations showing enormous efficiency increases for quantum computers relative to classical computers, such improvements have made slow progress. Transmission of voice, image, video and holographic signals in a lossy, extremely highly compressed format would impact a variety of fields of human endeavor. As the usage of cell phones, television signals and internet communications crowds the bandwidth available, there exists a need for compression of data communications.

As disclosed in application Ser. No. 12/705,566 entitled "Quantum Based Information Transmission System and Method", one compression technique in quantum communication is the usage of qubits, which are units of quantum information that may be visualized by a state vector in a two-level quantum-mechanical system. Unlike a binary classical bit, a qubit can have the values of zero or one, or a superposition of both. A qubit may be measured in basis states (or vectors) and a conventional Dirac symbol is used to represent the quantum state values of zero and one herein, as for example, $|0\rangle$ and $|1\rangle$. For example, on a physical qubit this may be implemented by assigning the value "0" to a horizontal photon polarization and the value "1" to the vertical photon polarization. The "pure" qubit state is a linear superposition of those two states which can be represented as combination of $|0\rangle$ and $|1\rangle$ or $q_k = A_k|0\rangle + B_k|1\rangle$, or in generalized form as $A_n|0\rangle$ and $B_n|1\rangle$ where $A_n$ and $B_n$ represent the corresponding probability amplitudes and $A_n^2 + B_n^2 = 1$. FIG. 1 is a diagrammatic visualization of a three-qubit quantum binary tree, which has an information storage index space equivalency to eight classical bits; i.e., 3 qubits provide an index space of 8.

Unlike classical bits, a qubit can exhibit quantum properties such as quantum entanglement, which allows for higher correlation than that possible in classical systems. When entangled photon pairs are split, the determination of the state (such as polarization or angular momentum) of one of the entangled photons in effect determines the state of the other half of the entangled photon pair; since entangle photon pairs are the conjugates of one another.

SUMMARY OF THE INVENTION

A preferred embodiment of the present invention comprises a system for transferring data from a sender to a receiver comprising an entangled photon source for producing first and second entangled photons, the first entangled photon becoming associated with a receiver, the second entangled photon being associated with a sender;

at the sender, a Bell state measurement device for performing a joint Bell state measurement on the second entangled photon and at least one qubit with encoded data; the Bell state measurement device outputting two bits of data to be used at the receiver;

a transmission channel for transmitting two bits of information from the outcome of the Bell state measurement device to the receiver;

at the receiver, a unitary transformation device operatively connected to the transmission channel for performing a unitary transformation operation on the first entangled photon based upon the value of the two bits of data;

at least one detector operatively connected to the unitary transformation device for detecting encoded information from the first entangled photon;

at least one processor operatively connected to the at least one detector, the at least one processor operating to determine whether or not to transmit portions of data from a sequential qubit based upon the value of the at least one qubit measured at the receiver location, and wherein based upon the value of the at least one qubit measured at the receiver location, data compression occurs such that fewer qubits are used to transmit a message to the receiver without changing the content of the data transferred.

Optionally, the unitary transformation device comprises a half wave plate and two quarter waveplates, and wherein based upon the two bits of data, the unitary transform device performs one of (a) no operation on the first entangled photon, (b) a half-wave plate operation, (c) a combination of the half wave plate and quarter wave plate operations, or (d) two quarter wave plate operations.

Optionally, a shared entangled resource may be utilized comprising two atomic systems, the first atomic system of the entangled atomic systems pair emitting the first photon and the second atomic system of the entangled atomic system pair emitting the second photon, the first photon may be emitted seconds later than the emission of the second photon and after the joint Bell state measurement on the second photon and the at least one qubit with encoded data.

Optionally, a beam splitter operatively associated with the unitary transformation device in conjunction with two detectors outputs the result of the unitary transformation device. Specifically, the beam splitter operates to reflect the first entangled photon into one of the two detectors and the first entangled photon is measured based upon which detector records a hit.

Optionally, the at least one processor operates to convert data into n qubits representing 2n bits of data and to determine whether or not to transfer portions of data from a sequential successive qubit based upon the values measured by the at least one detector, and wherein based upon the values measured, data compression occurs such that fewer qubits are used to transfer a message to the receiver without changing the content of the data transferred.

A preferred method comprises:

using at least one processor, converting data into a plurality of sequential qubits having information associated therewith; providing first and second entangled photons from an entangled photon source;

associating the first entangled photon with the sender and the second entangled photon with the receiver;

performing a joint Bell state measurement on the second entangled photon and the a first qubit of the plurality of sequential qubits;

obtaining a two-bit measurement from the joint Bell state measurement; the two bits indicating whether or not to perform a unitary transformation operation on the transferred qubit;

transmitting the two bits obtained from the two-bit measurement to the at least one receiver;

performing a unitary transformation operation on the first entangled photon and, using at least one photodetector, measuring the output of the unitary transformation operation to obtain the value of the qubit being transferred;

based upon the value or the qubit, determining whether or not to transmit portions of data from a sequential qubit, and wherein based upon the value of the qubit measured at the output of the unitary transformation operation, data compression occurs such that fewer qubits are used to transmit a message to the receiver without changing the content of the data transferred.

Optionally, the unitary transformation operation comprises using an element that causes rotation in a 2D space.

Optionally, the plurality of sequential qubits comprises n qubits and wherein for n equal to 3, the first qubit represents a first group of four bins of data weighted for a first photon characteristic and a second group of four bins of data weighted for the conjugate of the first photon characteristic; and, depending upon the measured value of the first qubit, only one half of the data is used to prepare the second qubit, represented by $2^{(n-1)}$ bins for transmission. Optionally, the third qubit may be represented by four groups of two bins, and depending upon the measurement of the second qubit, data represented by 2 bins is transmitted and the data represented by the remaining 6 bins is discarded. Optionally, each of the at least one qubit may represent $2^n$ bins of data, and for each successive qubit, data represented by the qubit is decreased by a factor of 2.

An alternate preferred embodiment comprises a system for data compression and transmission comprising a sender and a receiver, an entangled photon source for providing first and second entangled photons; the first entangled photon of an entangled photon pair being utilized by the receiver, second entangled photon of an entangled photon pair being utilized by the receiver;

the sender comprising:

at least one processor for converting data into qubits of information;

a operator performing a Bell state measurement on the second entangled photon and a first qubit containing information; the Bell state measurement producing an output comprising two measurement bits;

a transmitter for transmitting the two measurement bits to the receiver;

the receiver comprising:

a device for performing a unitary transform operation on the first entangled photon based upon the two measurement bits to thereby obtain the information in the first qubit;

the at least one processor operating to determine whether or not to transmit portions of data from a sequential successive qubit based upon the value of the at least one qubit measured at the receiver location, and wherein based upon the value of the at least one qubit measured at the receiver location, data compression occurs such that fewer qubits are used to transmit a message to the receiver without changing the content of the data transferred.

Optionally, the alternate preferred embodiment system comprises a feedback circuit for transmitting the measured value of the first qubit to the sender prior to performing a Bell state operation between the second entangled photon and a second qubit; such that the transfer of data for each successive qubit is based upon the value measured for the preceding qubit and the sender utilizes only the data for each successive qubits which correlates to the measured value of the preceding qubit.

Optionally, the qubits are interrelated such that the measurement of the first qubit determines what portion of the data is necessary data for transfer of the second qubit. Optionally, the at least one processor comprises at least one processor associated with the receiver and at least one processor associated with the sender, the at least one processor associated with the sender operating to: (a) divide a signal into a series of sections with each section comprising N samples of the signal; (b) preparing a first qubit from N samples of the signal using a Quantum Fourier transform; and wherein the at least one processor associated with the receiver operates to: (c) pass the first entangled photon though a unitary transfer device; (d) measure each qubit and recording the result of the measurement of each qubit; (e) transmit the result of the qubit measurement to the at least one processor associated with the sender and wherein the at least one processor associated with the sender operates to: (f) determine which half of the N samples of the current signal section are used as a subsection to prepare the next qubit, and discarding the remainder; (g) prepare a next qubit generated from the original signal section with the next qubit using only half of the succeeding signal subsection; (h) pass the succeeding qubit though a phase shift device; (i) measuring the succeeding qubit and recording the result of the Bell state measurement; (j) determine which half of the N samples of the succeeding signal section are used as a subsection to prepare the next qubit, and discarding the remainder; (k) repeat the steps (g) through (j) until the last qubit is prepared.

Optionally, the at least one processor operates to convert data into qubits of information by:

splitting an entangled polarization wave function into an arbitrarily oriented elliptical polarization state component and a comparator wave function state component for each of a plurality of qubits encoding an input data set, the input data set having a maximum amplitude;

transmitting the comparator wave function state component to a detector;

performing on a controlled phase shift transform on the arbitrarily oriented elliptical polarization wave function state to yield a phase shifted recombined state;

performing a quantum Hadamard gating transform on the phase shifted recombined state component to yield successive qubits each in one of two quantum Fourier transformed states;

evaluating each of the successive qubits each in one of the two quantum Fourier transformed states based on coincidence with the comparator wave function state component to yield a plurality of coincident qubits; and reconstructing the input data set by inverse Fourier transforming the plurality of coincident qubits.

Optionally, the at least one processor operates to perform a quantum Fourier transform on the arbitrarily elliptically oriented polarization wave function state component prior to transmission to the detector. Optionally, the at least one processor operates to encode a first sound having a maximum amplitude as a light output at the sender from a light source; perform a quantum Fourier transform on at least a portion of the light output to yield successive qubits each in one of two quantum Fourier transformed states; evaluate coincidence between qubits each in one of two quantum Fourier transformed states with a comparator wave function state component to yield a plurality of coincident qubits; and reconstruct the first sound at the receiver by inverse Fourier transforming the plurality of coincident qubits. Optionally, the qubits of data may originate from an input data set and the system may further comprise a light source having a photonic output coding the input data set having a maximum amplitude; a nonlinear optical crystal of a type selected from the group consisting of: Type I and Type II receiving the photonic output to yield an entangled photonic output; a polarization modulator and a phase modulator for polarization and phase modulation of least a portion of the entangled photonic output to yield an arbitrarily oriented polarization state; a polarization interferometer performing a controlled phase shift transform on the arbitrarily oriented polarization state to yield an interferometer output; a half wave plate generating one of two photonic states from the interferometer output completing the quantum Fourier transform; and electronics evaluating the quantum Fourier transform state based on coincident arrival of the one of two photonic signals and one of: the entangled photonic output or the interferometer output; and performing an inverse Fourier transform on a set of coincident photons to reconstruct at the receiver the input data set. Optionally, the coincident arrival is determined with single photon counting modules. Optionally, the nonlinear optical crystal is Type I and the entangled photonic output is passed to the coincidence electronics via the interferometer, and wherein the half wave plate may be oriented to perform a quantum Hadamard transform, and the polarization interferometer may have the geometry of a Mach-Zehnder, Micklesen, or Sagnac interferometer.

Quantum teleportation of information has the capability to transfer the information of one quantum state from a sender to a receiver using a joint measurement known as a Bell state measurement and the transmission to the receiver of two bits of classical information which informs the receiver of the operation they need to perform on their remaining portion of the initially entangled quantum pair to reproduce the state of the quantum system that the sender transferred or "teleported." Thus, using two classical bits, the quantum information contained in a single qubit, involving multiple bits of information unrelated in nature to the two bits, may be transferred from the sender to a receiver.

The present inventive method provides, inter alia, a method for higher correlation of data through the usage of entangled photons. As disclosed in application Ser. No. 12/705,566 entitled "Quantum Based Information Transmission System and Method", a preferred methodology comprises splitting a wave function representative of an input data set into an arbitrarily oriented elliptical polarization state and a comparator wave function state, the comparator wave function state being transmitted to a detector (or receiver). In preferred embodiments shown in FIGS. 2 through 7, a quantum Fourier transform is performed on the arbitrarily oriented elliptical polarization state using optical components (comprising interferometers 60 (FIGS. 2 & 5), 92 (FIGS. 3 & 6), 122 (FIG. 4 or 7)), as depicted in the respective figures, to yield a quantum computational product. A quantum Hadamard transform may be performed on the quantum computational product to yield one of two possible quantum particle outputs (via half wave plate 78). Through feedback circuitry, the input data set is processed based upon the coincident arrival of the comparator wave function state and one of the two quantum particle outputs. Data compression and transmission in accordance with a preferred embodiment of the present invention may be performed on either a quantum computer or a digital computer.

A preferred embodiment provides for transfer of information using qubits. A quantum tree formed of qubits is depicted in FIGS. 1, 1A, 1B and 1C. In the example shown, 3 qubits are used. However, the number of qubits may be changed without departing from the scope and principles of the present invention. As the first qubit is transmitted, a measurement takes place and the result is inputted into computer 207, illustrated in FIG. 2, et seq. Based upon this measurement, as illustrated by the decision tree of FIG. 1A, either the left (L) or right (R) portion of qubit 2 is not used (or transmitted). Following the transmission of the portion of qubit 2, another measurement takes place and the result is inputted into computer 207. Based upon this measurement, as illustrated by the decision tree of FIG. 1B, either branch A1 or A2 is followed. In the example shown in FIG. 1C, where the first and second measured values were zeroes, the qubit portions represented by the nodes at the dotted line branches are unused and not transmitted.

Due to the properties of the qubits, a preferred embodiment system employs the quantum Fourier transform (QFT) and a classical or quantum inverse Fourier transform in the measurement process. Data inputted in the form of a wave function, generated using, for example, amplitudes of a given signal, is converted into a quantum state or qubits over which, in a preferred embodiment of the present invention, transforms, such as the quantum Fourier transform (QFT) operate. The conversion of the wave function to a quantum state represented by qubits is described, for example, in Gui Long, Yang Sun; "Efficient scheme for initializing a quantum register with an arbitrary superposed state," Physical Review A, Volume 64, 014303 (2001), hereby incorporated by reference). The quantum Fourier transform is implemented by a series of optical elements implementing quantum operations followed by a measurement as described for example, in Robert B. Griffiths, et al. "Semiclassical Fourier Transform for Quantum Computation," Physical Review Letters, Apr. 22, 1996, hereby incorporated by reference). Although a particular embodiment is described, other equivalent formulations, processes, and configurations are encompassed within the scope of the invention.

In terms of data flow, a preferred methodology comprises splitting a wave function representative of an input data set into an arbitrarily oriented elliptical polarization state and a comparator wave function state, the comparator wave function state being transmitted to a detector. In a preferred embodiment, a quantum Fourier transform is performed on the arbitrarily oriented elliptical polarization state to yield a quantum computational product. A quantum Hadamard transform is performed on the quantum computational product to yield one of two possible quantum particle outputs. Through feedback circuitry, the input data set is processed based upon the coincident arrival of the comparator wave function state and one of the two quantum particle outputs. Data compression and transmission in accordance with a preferred embodiment of the present invention may be performed on either a quantum computer or a digital computer.

A data communication system operating on quantum computation principles includes a light source having a photon output coding an input data set. A Type-I or Type-II nonlinear crystal converts the photon output into an entangled photon output. An arbitrarily oriented polarization state is assured by passing the entangled photon output through a polarization modulator (44) and a phase modulator (46). A polarization interferometer (122) performs a controlled phase shift transform on the arbitrarily oriented polarization state as an interferometer output. A halfwave plate then performs a quantum Hadamard gate transform to generate one of two possible photon states from the interferometer output thus completing the operations required for a quantum Fourier transform. Coincidence electronics reconstruct the input data set a distance from the light source. The reconstruction is based on the coincident arrival of the one of two possible photon states and at least one of the entangled photon output or the interferometer output. The result is then fed back via computer 207 and associated circuitry whereupon the computer 207 in conjunction with polarization modulator (44) and a phase modulator (46), based upon the "branch" determinations, processes only portions of the succeeding qubits, resulting in reduction in the amount of data which is transmitted.

BRIEF DESCRIPTION OF THE DRAWINGS

FIG. 1 is a schematic depicting a three qubit quantum binary tree to illustrate an information storage index space equivalency to eight classical bins.

FIG. 1A is schematic depiction of the first level branching of the three qubit quantum binary tree of FIG. 1.

FIG. 1B is schematic depiction of the second level branching of the three qubit quantum binary tree of FIG. 1.

FIG. 1C is schematic depiction of the third level branching of the three qubit quantum binary tree of FIG. 1.

FIG. 9A is a prior art layout for the demonstration of DLCZ protocol 1 wherein atoms L and R are entangled and a Bell state measurement is performed with detection by detectors D1 and D2.

FIG. 17 is a schematic depicting a two Bell state quantum quad tree to illustrate an information storage index space equivalency to sixteen classical bins.

DETAILED DESCRIPTION OF THE PREFERRED EMBODIMENTS

Figure 2:
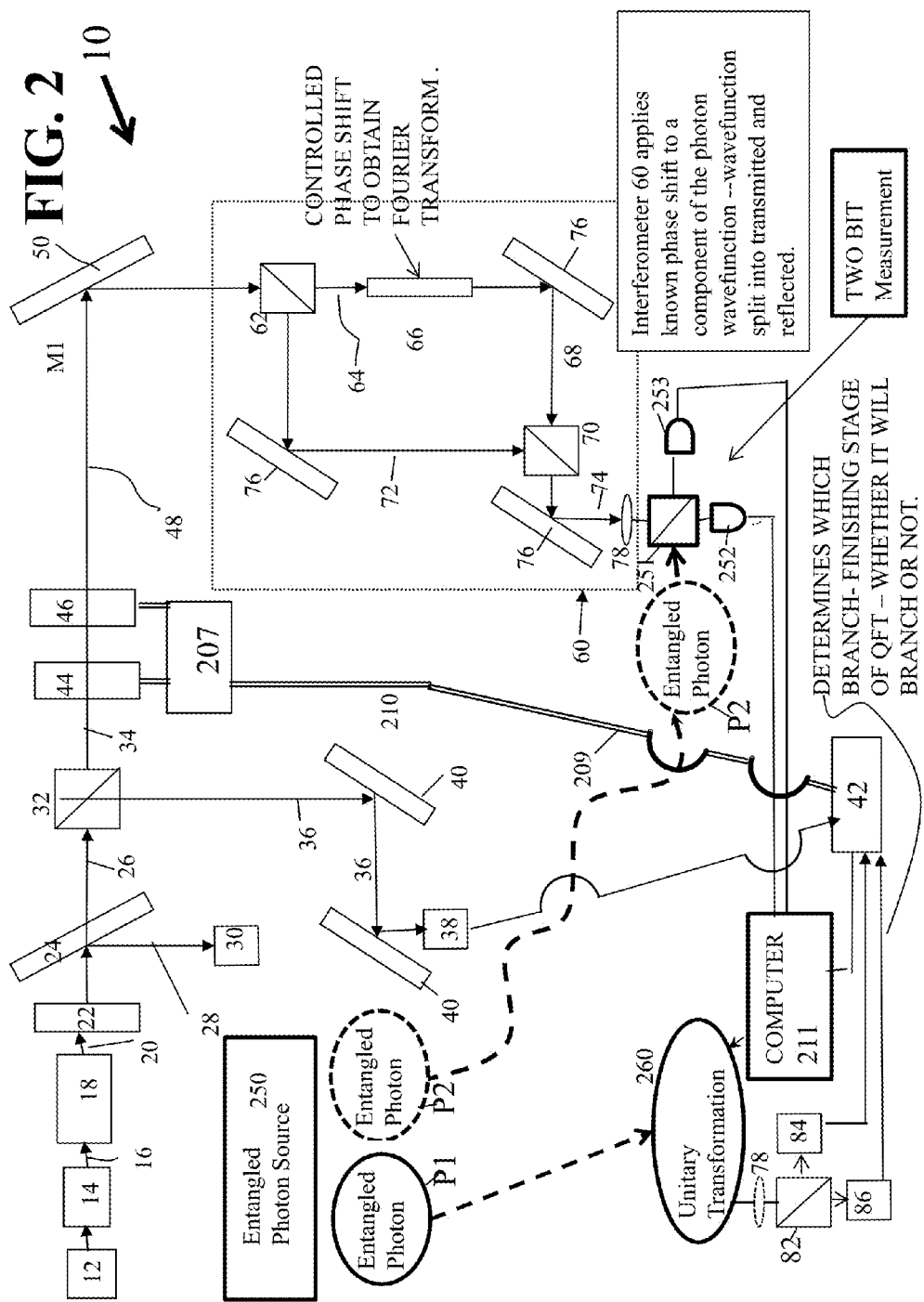
FIG. 2 is a schematic of an optical bench configured as a quantum computer system according to the present invention using a Type-II nonlinear optics crystal and a polarization Mach-Zehnder interferometer to perform a quantum Fourier transform (QFT).

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second entangled photon regions, these terms are only used to distinguish one entangled photon source, region, element, component, layer or section from another source, region, element, component, layer or section. Thus, a first source, region, element, component, layer or section discussed below could be termed a second source, region, element, component, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate. Embodiments of the present invention are described herein with reference to cross-section illustrations that are schematic illustrations of idealized embodiments of the present invention. As such, variations from the shapes of the illustrations are to be expected. Thus, embodiments of the present invention should not be construed as limited to the particular shapes of regions illustrated herein but are to include deviations in shapes that result, for example, from manufacturing. Regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

The present invention has utility in data transmission. A quantum computing algorithm for processing data has greater than classical efficiency when run on a quantum computer. It is appreciated that embodiments of the present invention comprises a method for data compression and transmission that is operative in a classical digital computing environment although without the superior speed and information storage properties of qubits that are realized on a quantum computer. While the embodiments of the present invention are described, inter alta, in the context of sound compression and transmission, it is appreciated that data corresponding to any number of media are equally well suited for transmission in a highly compressed and lossy manner, such as light transmission. Data set types other than sound readily transmitted according to the present invention illustratively include images, video, holograms, digital instrument output and numerical streams.

Challenges are presented in the transmission and exfiltration of quantum information, or qubits, over long distances or in challenging environments. To overcome the absorption or scattering losses inherent in long distance transmission of quantum information networks of quantum repeaters have been proposed to entangle remote quantum memories because Quantum information is typically fragile and not readily amplified. Quantum information transmission between two nodes in such a quantum network may be accomplished using quantum transfer techniques involving photon entanglement. The transfer of information using Quantum entanglement—is a process by which the information in a qubit (the basic unit of quantum information) can be transferred from one location to another, based upon the principles explained herein, without the qubit being transmitted through the intervening space.

In some of the preferred embodiments, the quantum transfer/communication of information involves performing a Bell state measurement between the qubit containing the information to be transferred and the state of one part of an entangled pair of nodes on the quantum network. A Bell state measurement has four possible outcomes, which correlates to two bits of "classical" information being transmitted to the other receiving node of the quantum network. The receiving node then uses the two bits of information to perform a unitary transformation on their remaining portion of the entangled state to locally reproduce the qubit that the sender used to perform their Bell state measurement. As an example, the identity function is trivially a unitary operator and rotations in R2 are a nontrivial example of unitary operators. Rotations do not change the length of a vector or the angle between 2 vectors.

Quantum Memory/Quantum Repeater

Generically, a quantum repeater is a quantum memory coupled to at least one other quantum memory. The quantum memories may be composed of atoms, ions, nitrogen-vacancy (NV) diamonds, quantum dots, superconducting quantum interference devices (SQUIDs), or other systems capable of representing and storage of quantum states. Quantum memories can be entangled with each other and transfer of information from one such quantum memory node to another quantum memory node is accomplished with Bell measurements and transmission of two bits over classical, i.e. fiber optic, electronic, wireless radio, free-space optical, communications channels representing the result of the Bell measurement.

Bell Measurement

A Bell measurement is a joint measurement between the states of two qubits that determines which of the four Bell states the pair of qubits is in. Typically the four Bell states are labeled as $\Psi^-$, $\Psi^+$, $\Phi^-$ and $\Phi^+$. For example, in terms of polarization, $\Psi^- = |HV> - |VH>$, $\Psi^+ = |HV> + |VH>$, $\Phi^- = |HH> - |VV>$, and $\Phi^+ = |HH> + |VV>$, where H and V indicate the Horizontal and Vertical polarization components of a photon wavefunction.

Quantum Teleportation

Quantum teleportation refers to the exact transfer of quantum information (a qubit) from one location to another without that qubit being transmitted directly through the space between the sender and the receiver. As an example, this can be accomplished by the sender and the receiver each sharing one half of an entangled quantum system. When the sender wishes to send a qubit (quantum teleportation) the sender will perform a Bell measurement with sender's half of the shared entangled quantum system and the qubit to be transferred to the receiver. The outcome of the Bell measurement will be sent to the receiver over classical channels and consists of two bits. When the receiver gets the two bits the receiver then applies to their remaining portion of the initially shared entangled state one of four unitary operations depending upon what the two bits indicate. Typically these operations can be represented by a matrix and correspond to the Identity matrix and three other matrices. For example, $$I = \begin{vmatrix} 1 & 0 \\ 0 & 1 \end{vmatrix}, T1 = \begin{vmatrix} 1 & 0 \\ 0 & -1 \end{vmatrix}, T2 = \begin{vmatrix} 0 & 1 \\ 1 & 0 \end{vmatrix}, \text{ and } T3 = \begin{vmatrix} 0 & -1 \\ 1 & 0 \end{vmatrix}.$$

The matrices are called unitary because they do not change the length, $\sqrt{a^2+b^2}$, of the vector that the matrix multiplies. After this operation, the receiver will possess the quantum information of the qubit that the sender transmitted. The unitary operation may be performed by an element comprising, for example, a half wave plate and a quarter wave plate. For example, if the identity matrix is to be applied, nothing is done with the remaining portion of the initially shared entangled state. If the two bits indicate that the matrix T2 is to be applied the half wave plate will perform a ninety degree rotation. If T1 is to be applied, then two suitable quarter waveplate operations will be performed. If T3 is to be applied, then two suitable quarter wave plate operations followed by a suitable half wave plate operation will be performed.

The terminology data "exfiltration" as used herein relates to the clandestine or stealthy transfer or collection of data from a computer that may be collected by a remote or distant person. Exfiltration may involve the transmission or recovery of information or data collected in a manner that has a low likelihood of revealing the existence, position, or information collected by the perpetrator. Exfiltration may involve the use of an optical transceiver, such as a telescope, to direct one part of an entangled photon towards a distant device or target and to collect the entangled photons returning from the device or target. Exfiltration of information to support enhanced situational awareness is useful for maintaining safety in hostile or dangerous environments. For example, it is important for safety to know if and when hostile combatants may threaten friendly troops. In such cases, unattended sensors may collect information to help achieve improved situational awareness. The exfiltration of the collected information to friendly troops provides them with needed situational awareness. Exfiltration of information without the hostile troops getting the information or discovering the location of the sensor provides enhanced security for the friendly troops.

It can be appreciated by those of ordinary skill in the art that entangled distant quantum memories are a precious resource and application of the methods of data compression and information exfiltration described in this disclosure provide a means to efficiently use this entanglement resource for transmission of information via the transfer of qubits.

A preferred embodiment of the present invention includes a system for the transmission and reconstruction of a data set through the utilization of a quantum Fourier transform (QFT) operation on qubits coding the data to be transferred from a sender to a receiver.

A preferred embodiment of the present invention prepares a wave function in a n data set; as described for example in Long, G., et al. "Efficient scheme for initializing a quantum register with an arbitrary superposed state," Physical Review A, vol. 64, Issue 1, 014303 (2001) (hereinafter Long, et al. (hereby incorporated by reference)). In Long, et al, a scheme is presented that can most generally initialize a quantum register with an arbitrary superposition of basis states as a step in quantum computation and quantum information processing. For example, Long, et al. went beyond a simple quantum state such as $|i_1, i_2, i_3, \ldots i_n\rangle$ with $i_j$ being either 0 or 1, to construct an arbitrary superposed quantum state. Long, et al. utilized the implementation of $O(Nn^2)$ standard 1- and 2-bit gate operations, without introducing additional quantum bits. Long, et al. presents a general scheme that initializes a quantum register without introducing additional qubits wherein the quantum circuit of a 3-qubit system transforms the state $|000\rangle$ to an arbitrary superposed state with $N=2^3$ basis states. The terminology arbitrary superposed quantum state as used herein correlates to the construction of an arbitrary superposed quantum state as described, inter alta, in Long, et al.

As depicted in FIG. 2, a series of optical elements are provided to act as quantum operators followed by a measurement to implement the quantum Fourier transform. See Griffiths, R., et al. "Semiclassical Fourier Transform for Quantum Computation," Physical Review Letters 76, 3328-3231 (1996) (herein incorporated by reference). An optical bench with appropriate electronics is well suited to function as a quantum computer for the compression and transmission of data corresponding to sound. Those of ordinary skill in the art can appreciate that although an optical bench is described as the platform for generating and performing operations on qubits, it is appreciated that three plus qubit quantum computers are known to the art, such as, for example, those computers utilized in conjunction with ion trapping and the nuclear magnetic resonance spectrometer. Although sound is used as an example for the data set amplitudes represented by a quantum wave function, the present invention is not limited to sound.

A wave function in quantum mechanics describes the quantum state of a particle as a function of space and time. The laws of quantum mechanics (such as, for example, the Schrödinger equation) describe how the wave function evolves over time. The symbol for a wave function $\Psi$ is a complex valued function; however $|\Psi|^2$ is real, and corresponds to the probability density of finding a particle in a given place at a given time, if the particle's position is measured.

In conjunction with the present invention, the wave function may be coded into qubits of quantum particles. Preferably, the quantum particles are photons, but trapped ions or magnetic spin states can also be utilized to practice the principles of the present invention.

The present invention may be utilized in conjunction with a classical computer, and the data series may be derived from, for example, sound, that is broken into a series of segments each represented by the number of qubits for classical computer storage and computation. In the operation of a preferred embodiment of the present invention on a quantum computer, the quantum particles, preferably photons, may be operated on by optical components to perform the inventive method steps.

A preferred method of the present invention utilizes qubits in a quantum computer setting or the simulation of qubits in a classical computer. Qubits comprise superpositions of ones and zeros where both simultaneously exist. Photons that define the wave function are subjected to a quantum Fourier transform operation. In the process, the photons are measured thereby destroying the quantum state, but providing the measured probability in terms of the wave function and its complex conjugate $$P = \psi\psi^*. \quad (1)$$

An inverse Fourier transform (FT) is then applied to the square root of the measured probability to recover a lossy intelligible data compression in the form of quantum particle detection. It is appreciated that the inverse Fourier transform may be either a classical or quantum transform. A classical fast Fourier transform is readily performed by optical bench elements or through a classical computer program. The forward and inverse transforms are conducted using a relatively small sample of the wave function Fourier modes which has the property of preserving much of the intelligibility of the data while providing a compression and communication efficiency. Using the quantum computing simulation of a classical computer according to the present invention, a sound data set (for example) is intelligibly reproduced with a lossy compression factor utilizing a classical computation. Computational efficiency with the present invention may be increased by increasing the set of qubits. In practice, the inventive method allows for the transmission of information over a long path using a small number of photons. Data transmission with a small number of photons carrying the data in a quantum particle form is amenable to free optical path transmission through air or vacuum, through optical fibers and via satellite transmission.

In one preferred embodiment, communication between remote locations can be accomplished utilizing a comparatively small number of qubits of quantum particles relative to the data exchanged. Photons are amenable to transit in an environment exposed to climactic weather between the locations. It is appreciated that co-linear transmission of a comparator wave function state and an information carrying state facilitates long-range data transmission.

State Preparation

According to the present invention, a data set is modeled by, or in the form of, a wave function. Using sound transmission as an example, the sound is characterized by intensity amplitudes at uniformly spaced intervals $$\alpha_i = \alpha(t_i) \quad (2)$$

where $$t_i = t_0 + \sum_{j=1}^{i} \Delta t_j. \quad (3)$$

A superimposed quantum form is applied to the sound data set to facilitate quantum computer manipulation. To accomplish the quantification, data amplitudes are equated to a wave function in the form of a series $$\psi = \sum_{i=0}^{2^N - 1} \alpha_i |i\rangle \quad (4)$$

where $$|i\rangle \quad (5)$$

is the quantum state key. The qubits are characterized as the quantum state superpositions $$q_k = A_k |0\rangle + B_k |1\rangle. \quad (6)$$

A quantum probability conservation condition is imposed such that $$A_n^2 + B_n^2 = 1 \quad (7)$$

To account for the quantum superposition, the quantum data is organized in terms of a conventional quantum binary tree. A prior art quantum binary tree is depicted as a branching between 0 and 1 outcomes for successive steps in FIG. 1. Using the qubit representation shown in FIG. 1, the first step is to determine whether a one or zero exists at the first branch located at the top of the triangle depicted in FIG. 1A. If a zero value is present, Branch A is followed and the right side of the triangle or the "Branch B" becomes unnecessary to future determinations. Elimination of either the "A Branch" or "B Branch" results in data compression inasmuch as the remaining ones or zeros in the A or B Branch need not be considered. FIG. 1B is a depiction of the second level branching following the determination depicted to the left in FIG. 1A. If the value is zero, Branch A1 is followed. If the value is one, Branch A2 is followed. In each case, the other branch is eliminated resulting in data compression. FIG. 1C is a depiction of the third level branching following the determination depicted to the left in FIG. 1B. If the value is zero, Branch A4 is followed. If the value is one, Branch A5 is followed. In each case, the other branch is eliminated resulting in further data compression. The particular values selected for depiction in FIGS. 1B and 1C are merely exemplary. Results of a "one" determination at first level are not shown in FIG. 1B to make the diagram easier to follow. Results of a "one" determination at the second level are not shown in FIG. 1C to make the diagram easier to follow.

The outcomes of the successive steps sum to the values 0 through 2n−1, where n is the number of qubits. The means of obtaining the 0 or 1 depends on the specific experimental and corresponding simulation implementation. There are several conventional rules that are possible for determining the 0 or 1 value. For example, a 0 state may correspond to a horizontal measurement and the 1 may correspond to a vertical measurement, or the reverse may be true. In general, the series of qubit measurements are prepared such that each value of the state preparation is conditioned to determine the 0 or 1 at each branch. An alternate qubit architecture operative herein is termed "winner takes all." In the simulation depicted in FIG. 1 (Quantum Binary Tree), n qubit measurements are made. The n value is determinative of the first branch.

The $2^n$, where n is the number of qubits, are divided into two parts, lower 0 to $((2^n)/2)-1$ and higher indices $((2^n)/2)$ to $2^n-1$. The side with the greatest sum of the indices measured determines the path of the first branch. The second level branch has one half the number of indices of the first branch. Consecutive indices assigned are from the selected half from the first branch. The same process is used for the second branch level as from the first branch, but with half of the indices. This process repeats until all the branching is determined and the selected single index is determined. The quantum binary tree depicted in prior art FIG. 1 for three qubits provides an index space of eight. The quantum binary tree is expandable to n qubits which is equivalent to an index space of $2^n$ over which transforms, such as the Quantum Fourier Transform (QFT) operate.

The quantum superposition amplitudes at any qubit level in the binary tree may be constructed from, for example, sound amplitudes $$A_k = \sum_{i=0}^{i=\frac{2^{n_k}}{2}-1} \alpha_i \quad (8)$$

where the summation is over the number of states $$n_k \quad (9)$$

at each level of the quantum binary tree. Similarly $$B_k = \sum_{i=\frac{2^{n_k}}{2}}^{i=2^{n_k}-1} \alpha_i. \quad (10)$$

The amplitudes $\alpha$ are approximated in the quantum computation by identification with probabilities which can then be sampled. For one realization, it is noted that $$\alpha_0 = \Pi_{i=0}^{i=2^{n_k}-1} A_i \quad (11)$$

and $$\alpha_k = \Pi_{i=0}^{i=2^{n_k}-1-j} \Pi_{j=0}^{j=i} A_j B_j \quad (12)$$

where $\Pi$ is the product of a sequence operator. The classical index k is given in terms of the quantum qubit indices n of the quantum binary tree made of n qubits $$k = \sum_{i=0}^{i=n-1} (2^{n-i}) \langle |q_1| \rangle. \quad (13)$$

The term $$\langle q_i \rangle \quad (14)$$

represents the measurement of the $i^{th}$ qubit, registering as a 0 or 1.

Quantum Data Simulation

Superpositions of qubits are used to store and process data such as sound. The amplitude of the "data" can be stored as the amplitudes of a superposed quantum state $$\psi = \Sigma \alpha_i |k\rangle_i \quad (15)$$

where $|k\rangle$ is the eigenstate of the wavefunction $\Psi$. The term $\Psi$ can be decomposed as a direct product of qubits $$|q\rangle_1 \otimes |q\rangle_2 \otimes \ldots \otimes |q\rangle_n \quad (16)$$

which compacts storage requirements by a factor of log 2 relative to a classical computation. A data set of size $2^n$ can be stored and operated on in n quantum bits. Mathematical transforms can also be performed on the quantum stored signal with the associated computational savings.

Quantum Computational System

Preferred embodiments for the system for quantum data compression and transmission that are preferably performed using photons as quantum particle qubits will now be described. In the preferred embodiments of the present invention depicted in FIGS. 2-7 like numerals described with reference to subsequent figures correspond to previously detailed elements.

Referring now to FIG. 2, a preferred embodiment is depicted generally at 10. A data encoder 12 converts the data set to a set of qubit amplitudes that satisfies the expression of Equation 15 and triggers a light source 14 accordingly. The light source 14 may be a laser, such as Nd:YAG, ion lasers, diode lasers, excimer lasers, dye lasers, and frequency modified lasers. Photons in path 16 emitted from the light source 14 are optionally passed through a spatial filter 18. Filter 18 converts the photons in path 16 in an image space domain to a spatial frequency domain and serves the purpose of removing, for example, stripe noise of low frequency and/or high frequency noise. Examples of noise associated with the system comprise fluctuations typically include line noise powering the light source 14, thermal gradients, detector noise, and inherent quantum noise. The photons 20 having passed through spatial filter 18 are then passed through a Type-II nonlinear optics crystal 22. Examples of Type-II nonlinear optic crystals that may be utilized include potassium dihydrogen phosphate, potassium titanyl phosphate, beta-barium borate, cesium lithium borate and adamantyl amino nitro pyridine. An optional dichroic mirror or bandpass filter that is operative to transmit specified wavelengths and reflect all others 24 is used to selectively reflect out of the beam path 26 those photons 28 that have reflected wavelengths as a result of passing through the crystal 22 into a stop 30. After passage through mirror 24, the remaining entangled photons 26 are split by interaction with a polarization beam splitter 32 into two paths; a known photon state path 34 and a comparator wave function state path 36. The comparator wave function state path 36 is directed onto a single photon counting module 38 by an optional mirror set 40. It is appreciated that a reorganization of beam paths in the system 10 obviates the need for mirror set 40. The detection of the photons from the comparator wave function state path 36 by the single photon counting module 38 is fed to coincidence electronics 42 and is used to reconstruct the data set. The entangled photons in the known photon state path 34 are then passed through a polarization modulator 44 and a phase modulator 46. Exemplary polarization phase modulators illustratively include liquid crystals, Kerr cells, and Pockel cells. Preferably, a series of two liquid crystal devices and a quarter wave plate may be used to achieve arbitrary polarization. Upon the entangled photons known photon state path 34 interacting with the polarization and phase modulators 44 and 46, respectively, the entangled photons are transformed into an arbitrarily oriented elliptical polarization state for passage via path 48 based on the data set signal being transformed and any previously measured photon state, if any is known. Note that both the polarization modulator 44 and phase modulator 46 are controlled by processor or computer 207, which in turn is connected via lines 208, 210 to the coincidence electronics 42. The entangled photons in the arbitrarily oriented elliptical polarization state passing via path 48 are optionally reflected from a mirror 50 and then enter a polarization interferometer depicted generally at 60. The interferometer 60 has the geometry of a polarization Mach-Zehnder interferometer and includes a polarization beam splitter 62 that transmits one portion 64 to a phase modulator 66 resulting in a phase shift in the light component 68 reaching polarization beam splitter 70 relative to the other polarization component 72. Polarization beam splitter 70 recombines beam components 68 and 72 to complete a controlled phase shift transform on the recombined state 74 from the interferometer 60. Three ancillary mirrors each numbered 76 are provided to reflect light in desired directions. The controlled phase shift transformed light component representing a recombined phase state 74 then interacts with a half wave plate 78 oriented at 22.5 degrees in order to implement a quantum Hadamard gate transformation therein and thus complete a quantum Fourier transform. The half wave plate 78 provides a qubit prioritized input 80 to a polarization beam splitter 82. Note that the half wave plate 78 may optionally be positioned following the Unitary Transformation circuitry 260 (as shown by dotted lines).

The process that computes the Quantum Fourier Transform (QFT) of a signal may be described as follows. First, the computer or device that holds the signal divides the signal into a series of sections. Each section contains N samples of the signal. This section of N samples is then used to prepare the first qubit. As shown in FIG. 1, one qubit is representative of 8 contemporary bits, as illustrated by the base of the quantum binary tree. In accordance with a preferred embodiment, the qubit of the quantum state utilizes a prescribed technique for the Quantum Fourier Transform. This quantum state is then passed though a device that applies a particular phase shift (via phase shifters 44, 46) appropriate to this qubit of the Quantum Fourier Transform. The qubit is then measured and the result of that measurement is recorded as a 0 or 1. This measurement is also used to determine which half of the N samples of the current signal section are used as a subsection to prepare the next qubit, as the other half is not needed to prepare the next qubit for reasons described above in connection with FIG. 1A. This qubit and all the remaining qubits generated for the original signal section are prepared and measured in a similar way with each qubit measurement using only half of the remaining signal subsection to prepare the next qubit. This process ends when the last qubit that is prepared using only 2 samples of the signal section. When all these qubits have been measured for one section, a binary number remains that results in the adding of 1 to the bin addressed by that binary number, for instance the binary number 010 would indicate address 2 and the binary number 110 would indicate address 6. These steps are repeated a number of times on the same signal section to generate a power spectrum representation of the signal section. Signal processing techniques such as a classical inverse Fourier transform or compressive sensing/sampling can be used on this power spectrum to reconstruct the initial signal section in a lossy but still recognizable manner.

In the Quantum Fourier Transform a number of photons, each with prepared qubit states, are sent sequentially through quantum controlled phase transforms followed by quantum Hadamard transforms associated with the half wave plate 78. The state preparation is accomplished by setting the values of the phase and setting the photons to particular elliptical polarization values.

The Hadamard transform is a quantum transform operating on one qubit at a time. The Hadamard transform in connection with the embodiments of FIGS. 2-7 may be performed after the unitary transformation operation 260 or in the alternative, after the interferometers 60 (FIGS. 2 & 5), 92 (FIGS. 3 & 6), 122 (FIG. 4 or 7), as depicted in the respective figures. The Hadamard gate transform is given as $$\begin{pmatrix} 1 & 1 \\ 1 & -1 \end{pmatrix}. \quad (17)$$

The qubits are operated on by the Hadamard transform as $$|q'_{n_k}\rangle = H|q_{n_k}\rangle \quad (18)$$

where $n_k$ is the index of the current qubit state.

Hadamard transforms in the order of the most significant qubit to the least significant qubit. The initial state of each photon qubit is conditioned on the previously measured values of prior photon measurements.

A single photon is operated upon by a Hadamard transform, with the effect of Hadamard transforms on multiple photons representing an entire wave function is represented by the combined Hadamard transform.

Wave Function Transform

The total wave function made of arbitrary superposed states is operated on by the combined Hadamard transform $$|\psi'\rangle = \hat{H}_{gate}|\psi\rangle \quad (19)$$

where $$\hat{H}_{gate} = H \otimes I 5 \otimes I. \quad (20)$$

Here the direct product of the identities is repeated until all of the qubits are taken into account.

With reference now to FIG. 2, single photon counting modules 84 and 86 count individual photons with a different given polarization, respectively, and report a counting event to coincidence electronics 42. Only when coincidence is noted between a photon counting event at module 38 and 84, or between module 38 and module 86 is the count considered a valid probability density function measurement. The probability density function is defined by $$P = \psi\psi^* \quad (21)$$

(where $\Psi$ represents the wave function and $\Psi^*$ is the complex conjugate of the wavefunction) and sets the number of times on the average that a photon lands in an index space interval. For n qubits there are $2^n$ index space intervals (FIG. 1. provides an example of the index space for 3 qubits).

A determination as to the polarization of each photon is provided by signal measurement at one of the single photon counting modules 84 and 86. The polarization of each photon is measured by the counting modules 84, 86 which represent the end of the photon path through the Hadamard gate and electro-optics. If horizontal (0) is measured, for example by single photon counting module 86, then no phase operations are applied to the remaining qubits. Otherwise, a controlled phase operation $R_m$ is applied to remaining operations. Note that the phase polarization 44 and phase modulator 46 are controlled by the computer or processor 207 which is connected to the coincident circuitry 42, which is in turn receives the outputs of the detectors 84, 86. The $R_m$ set is defined as $$R_m = \begin{pmatrix} 1 & 0 \\ 0 & e^{\frac{i\pi}{2\Delta n}} \end{pmatrix}. \quad (22)$$

The term $\Delta n$ represents the distance between the $n_k$ indices of the binary tree levels under consideration, $$\Delta n = n_k - n_{k'} \quad (23)$$

Where $n_k$ represents the maximum number of levels on the binary tree and $n_{k'}$ represents the level of the binary tree currently being operated on. The output of an inventive system is provided to a buffer store. From the buffer store it may be provided to an output device on either a real-time or delayed basis as still images, video images, movies, audio sound representations, and the like.

Quantum Teleportation of Information

Turning to another facet of the preferred embodiments depicted in FIGS. 2 through 7, as an option, quantum teleportation of information may be utilized. Quantum teleportation refers to the exact transfer of quantum information (a qubit) from one location to another without that qubit being transmitted directly through the space between the sender and the receiver. As an example, this can be accomplished by the sender and the receiver each sharing one half of an entangled quantum system. When the sender wishes to send a qubit (quantum teleportation) the sender will perform a Bell measurement with their half of the shared entangled quantum system and the qubit to be transferred to the receiver. The outcome of the Bell measurement will be sent to the receiver over classical channels and consists of two bits. In each of FIGS. 2 through 7 a unitary transformation operation is performed in element 260. The following analysis applies to each of FIGS. 2 through 7 with respect to Unitary Transformation element 260. When the receiver gets the two bits (from the detectors 252, 253) the receiver then applies to the receiver's remaining portion of the initially shared entangled state one of four unitary operations depending upon what the two bits indicate. Typically these operations can be represented by a matrix and correspond to the Identity matrix and three other matrices. For example, $$I = \begin{vmatrix} 1 & 0 \\ 0 & 1 \end{vmatrix}, T1 = \begin{vmatrix} 1 & 0 \\ 0 & -1 \end{vmatrix}, T2 = \begin{vmatrix} 0 & 1 \\ 1 & 0 \end{vmatrix}, \text{ and } T3 = \begin{vmatrix} 0 & -1 \\ 1 & 0 \end{vmatrix}.$$

The matrices are called unitary because they do not change the length, $\sqrt{a^2+b^2}$, of the vector that the matrix multiplies. After this operation, the receiver will possess the quantum information of the qubit that the sender transmitted. The unitary transformation operation (performed by element 260) may be performed by an element comprising, for example, a half wave plate and a quarter wave plate. For example, if the identity matrix is to be applied, nothing is done with the remaining portion of the initially shared entangled state. If the two bits (from the detectors 252, 253) indicate that the matrix T2 is to be applied then a half wave plate will perform a ninety degree rotation. If T1 is to be applied, then two suitable quarter wave plate operations will be performed. If T3 is to be applied, then two suitable quarter wave plate operations followed by a suitable half wave plate operation will be performed. Upon completion of this unitary transformation operation (260 in FIGS. 2-7, 10 and 11), due to the quantum aspects of the transfer, the receiver obtains the quantum information contained in qubit Q1 that was inputted into the Bell State Measurement 251.

Figure 10:
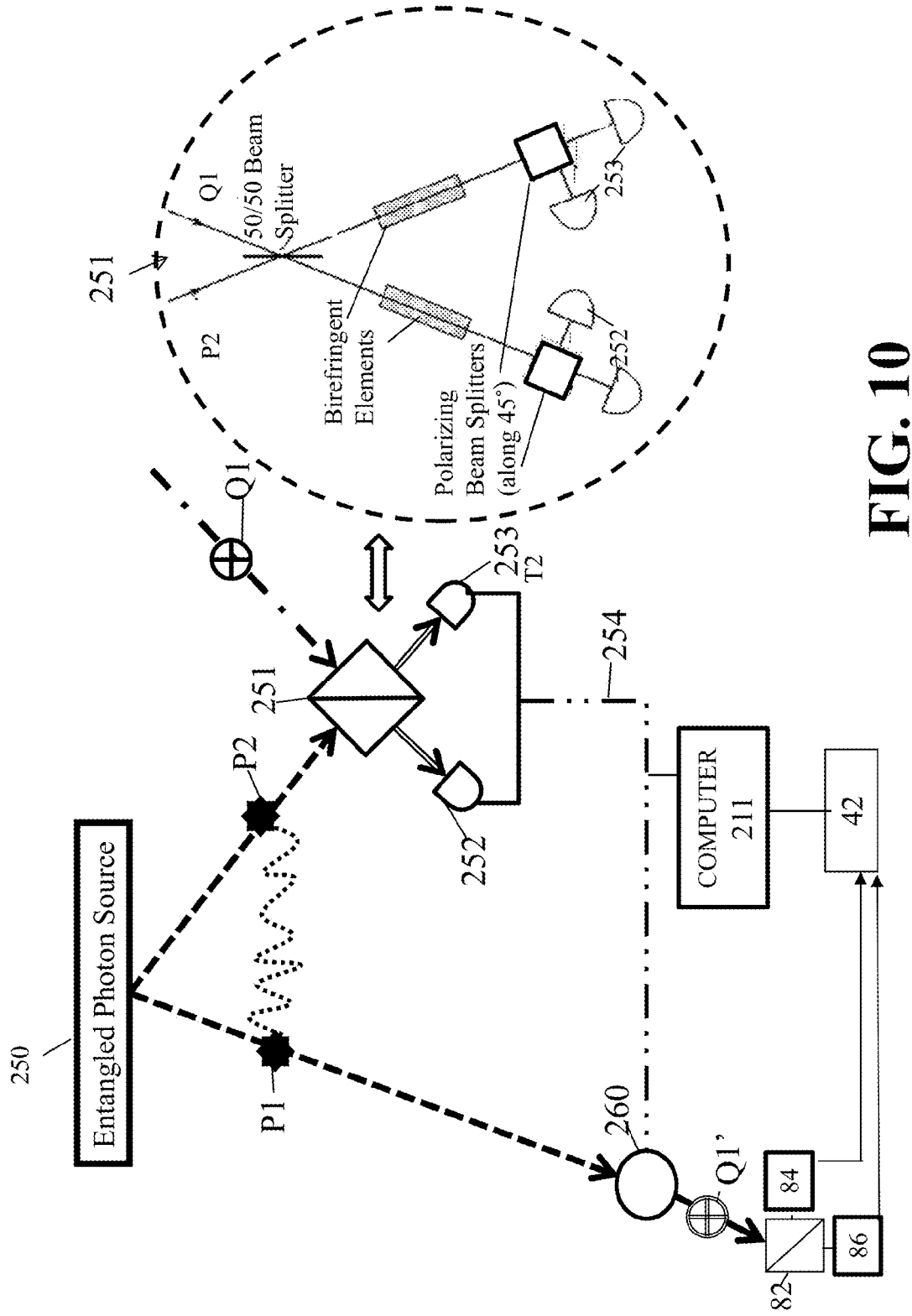
FIG. 10 is a schematic depiction of a preferred embodiment system wherein a qubit of converted data is transferred to the receiver as a photon state and wherein a classical channel transmits two bits to indicate how to measure the remaining photon.

With reference now to preferred embodiments of FIGS. 2 though 7, shown therein are entangled photon source 250 that provides a source for entangled photons P1 and P2. For ease of understanding, the second entangled photon P2 is repeated as an input into the Bell state measurement element 251 (represented by the square with a diagonal line). The Bell states are a concept in quantum information science representing an EPR pair; ie. a pair of qubits which jointly are in a Bell state that is, entangled with each other. In the embodiments of FIGS. 2 through 7, the Bell state measurement element 251 the entangled photon pair are the entangled photon P2 and the informational photon passing via the path 74 in FIGS. 2 through 4 and through the half wave plate 144 in FIGS. 5 through 7. Note that as discussed above, the informational photon may have passed though the half wave plate 78, which implements a quantum Hadamard gate transformation thereon. In the Bell state measurement element 251, the joint measurement takes place between the entangled photon P2 and the informational photon. This interaction is depicted in FIG. 10, also with photon P2 and qubit Q1. In the case of FIGS. 2 though 7, the qubit Q1 is the resultant of the interferometers 60 (FIGS. 2 & 5), 92 (FIGS. 3 & 6), 122 (FIG. 4 or 7). The determination of the Bell measurement, a joint quantum-mechanical measurement of two qubits that determines which of the four Bell states the two qubits are in is recorded by the photodetectors 252, 253, also referred to as the "two-bit measurement." In the context of the entangled photons being separated with photon P1 being at the receiving side and the photon P2 being at the sender, information contained in the qubit Q1 may be transmitted from the sender to the receiver with only the two-bit measurement being physically transmitted. That is, the information contained in the qubit Q1, as shown in FIG. 10, appears on the receiving side (bottom left of FIG. 10) due to the quantum properties of entanglement. Specifically, entangled photon P1 enters a unitary transformation at element 255, labeled unitary transformation operation, wherein the result or output is the information contained on qubit Q1 by detector 256. Thus, the information contained in qubit Q1 is passed from the sender to the receiver with only the physical transfer of the two-bit measurement via "classical channels." Thus, data relating to how to perform the Bell state measurement is transferred while the properties of entanglement between photons P1 and P2 result in the transference of information by teleportation of information; i.e., when the photon P2 encounters the qubit Q1 in the bell state measurement element 251, the other photon P1 is effected by the encounter so as to in effect impart information from qubit Q1 to the entangled P1, P2 photon state. Photons P1 and P2 may be significant distances from each other and still achieve the effects of entanglement.

Figure 11:
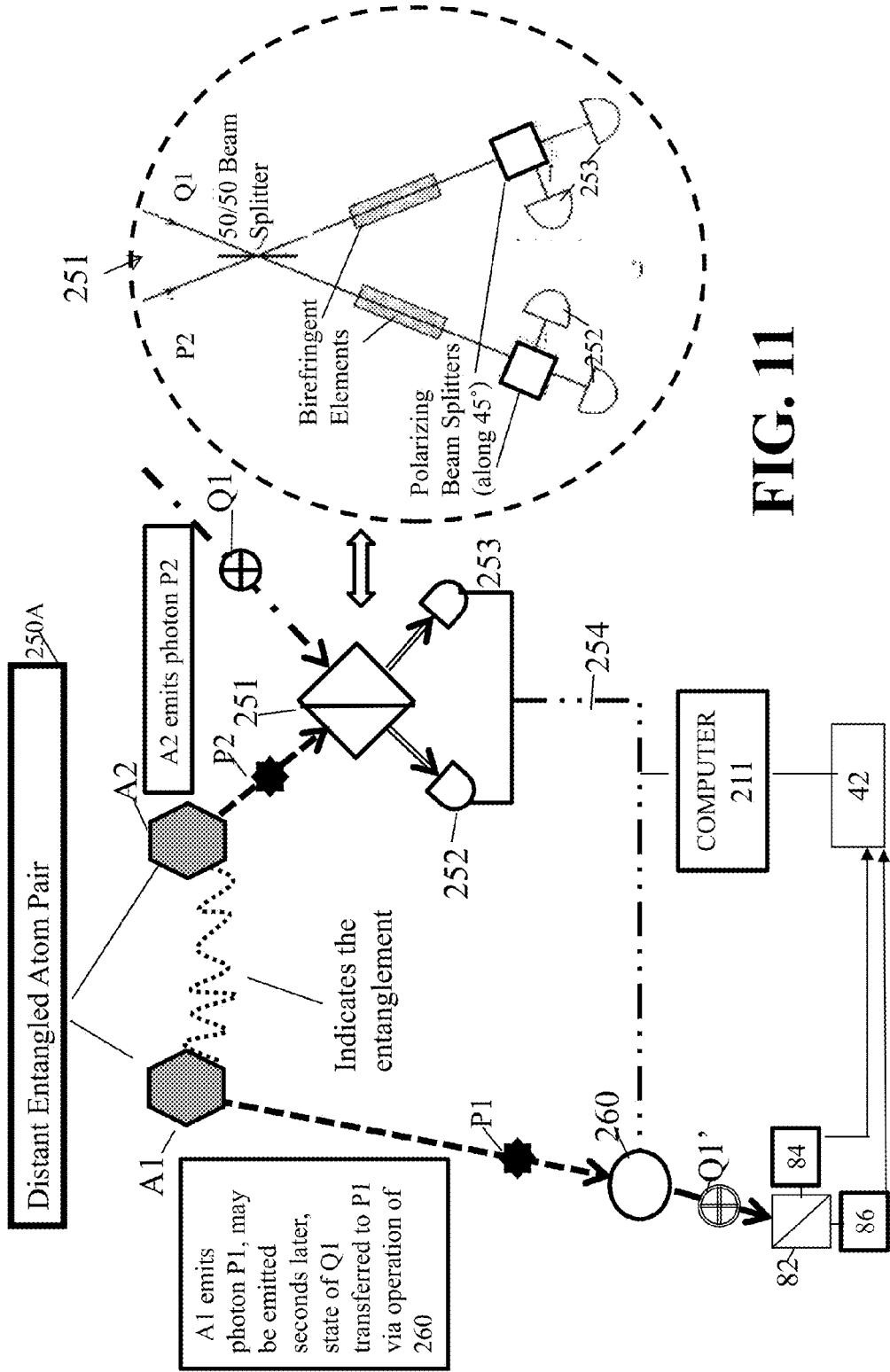
FIG. 11 is a schematic depiction of a preferred embodiment system of the present invention using a distant entangled atom pair and wherein a classical channel transmits two bits to indicate how to measure the remaining entangled atom system.
Figure 12:
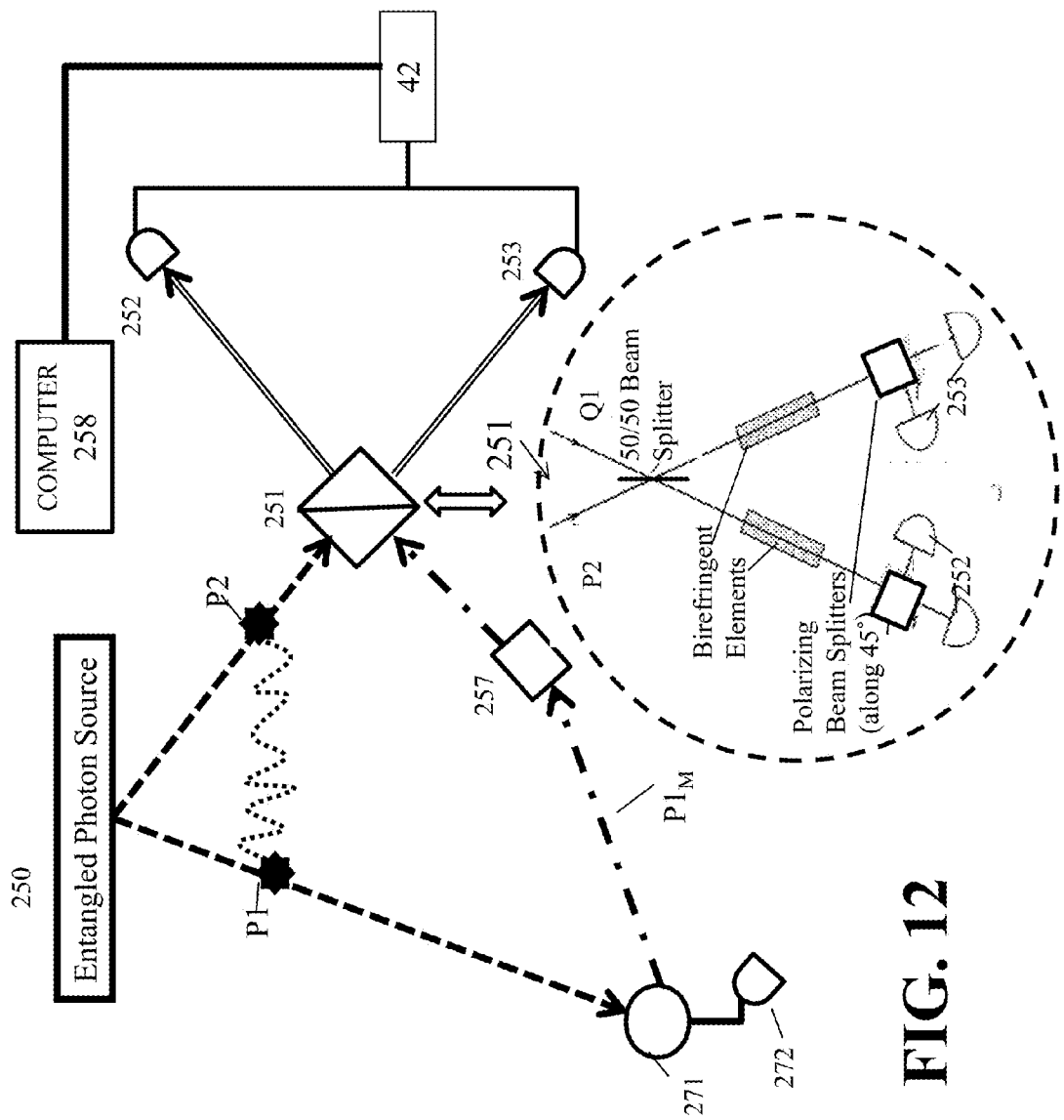
FIG. 12 is a schematic depiction of a preferred embodiment system used for exfiltration from a sensor of remotely generated information comprising an entangled photon source and a distant sensor that modulates an entangled photon.
Figure 13:
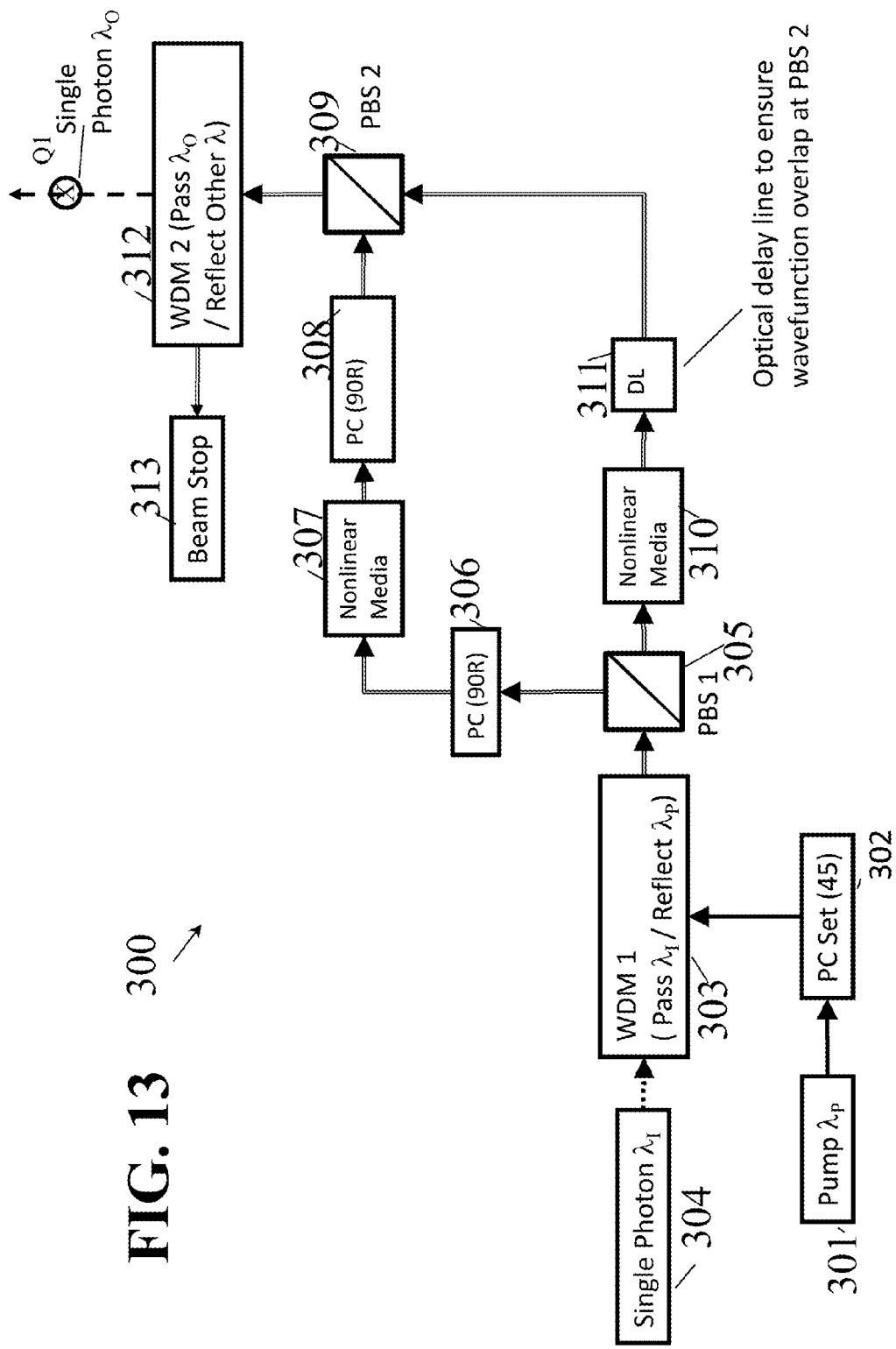
FIG. 13 is a schematic depiction of an alternate preferred embodiment utilizing a Mach-Zehnder configuration, wherein a single qubit of quantum information is frequency/wavelength converted prior to transmission, detection, or manipulation to a more favorable frequency/wavelength.

Note that while the entanglement of two photons is shown in FIGS. 2 through 7 and the concept is shown in FIG. 10, alternative uses of entanglement are represented in FIGS. 11 through 13. In FIGS. 11 and 12, instead of entangled photons P1 and P2, an entangled atom pair A1 and A2 is illustrated. Similar circuitry from FIGS. 11 and 13 may be utilized in conjunction with the implementation of the embodiments of FIGS. 2 through 7 to integrate or substitute the atom pair A1, A2 for the photon pair P1, P2 of FIGS. 2 through 7. FIG. 12 is similar to FIG. 10, but includes an optical delay 257.

It is noted that with respect to the Bell state measurement, for entanglement using a single qubit variable, difficulties are presented when only three distinct classes out of four Bell states are generally distinguishable. By using multiple qubit variables, for example, polarization, orbital angular momentum, or energy states, tracing or redundancy of variables can be used to in effect achieve complete Bell state measurements.

Figure 3:
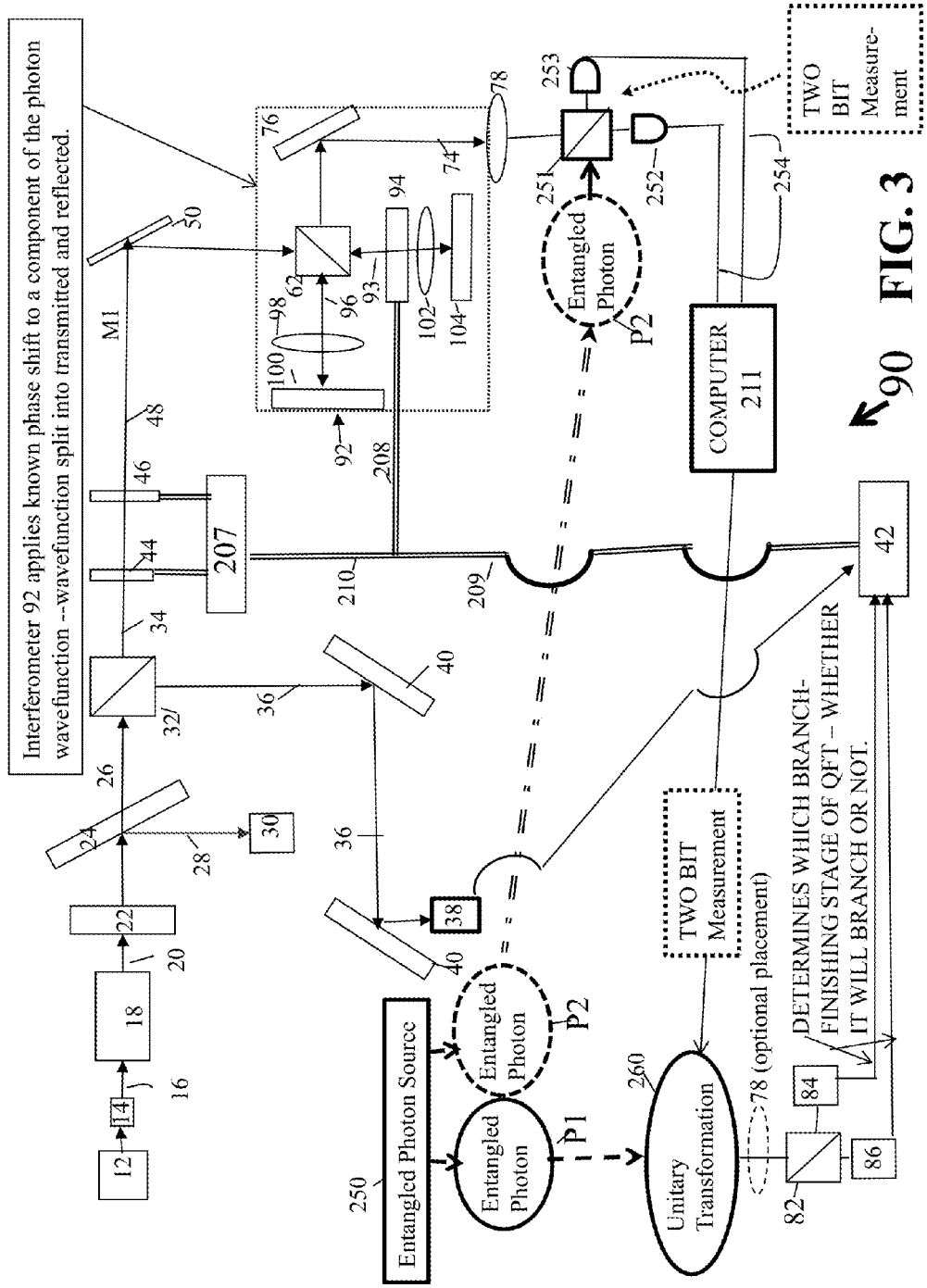
FIG. 3 is a schematic of an optical bench configured as a quantum computer system according to the present invention using a Type-II nonlinear optics crystal and a polarization Michelson interferometer to perform a QFT.
Figure 4:
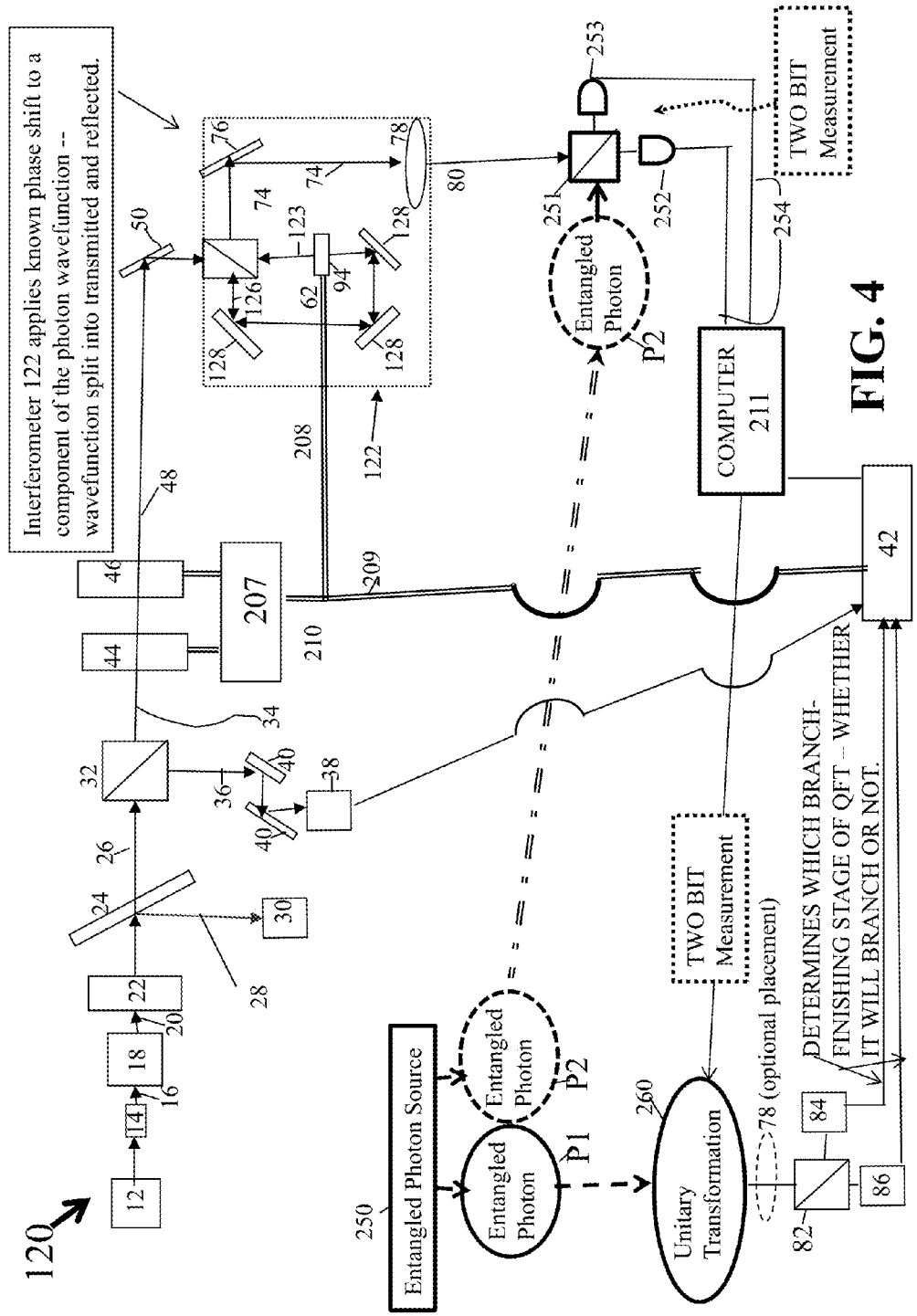
FIG. 4 is a schematic of an optical bench configured as a quantum computer system according to the present invention using a Type-II nonlinear optics crystal and a polarization Sagnac interferometer to perform a QFT.

Referring now to FIG. 3, preferred embodiment system 90 has numerous features in common with that system depicted in FIG. 2 and such attributes share like numerals with those detailed with respect to FIG. 2. In FIG. 3, a data encoder 12 converts the data set to a set of qubit amplitudes that satisfies the expression of Equation 15 and triggers a light source 14 accordingly. The light source 14 may be a laser, such as Nd:YAG, ion lasers, diode lasers, excimer lasers, dye lasers, and frequency modified lasers. Photons in path 16 emitted from the light source 14 are optionally passed through a spatial filter 18. Filter 18 converts the photons in path 16 in an image space domain to a spatial frequency domain and serves the purpose of removing, for example, stripe noise of low frequency and/or high frequency noise as described above in connection with FIG. 2. The photons represented by path 20 having passed through spatial filter 18 are then passed through a Type-II nonlinear optics crystal 22, as described in connection with FIG. 2. An optional dichroic mirror or bandpass filter that is operative to transmit specified wavelengths and reflect all others 24 is used to selectively reflect out of the beam path 26 those photons 28 that have reflected wavelengths as a result of passing through the crystal 22 into a stop 30. After passage through mirror 24, the remaining entangled photons 26 are split by interaction with a polarization beam splitter 32 into two paths; a known photon state path 34 and a comparator wave function state path 36. The comparator wave function state path 36 is directed onto a single photon counting module 38 by an optional mirror set 40. It is appreciated that a reorganization of beam paths in the system 10 obviates the need for mirror set 40. The detection of the photons from the comparator wave function state path 36 by the single photon counting module 38 is fed to coincidence electronics 42 and is used to reconstruct the data set. The entangled photons in the known photon state path 34 are then passed through a polarization modulator 44 and a phase modulator 46. Exemplary polarization phase modulators illustratively include liquid crystals, Kerr cells, and Pockel cells. Preferably, a series of two liquid crystal devices and a quarter wave plate may be used to achieve arbitrary polarization. The polarization modulator 44 and a phase modulator 46 are each controlled by a computer or processor 207 which may be connected via lines 209, 210 to coincidence detecting circuitry 42. Note that the coincidence circuitry has an input from the photon counting module 38. Upon the entangled photons known photon state path 34 interacting with the polarization and phase modulators 44 and 46, respectively, the entangled photons are transformed into an arbitrarily oriented elliptical polarization state for passage via path 48 based on the data set signal being transformed and any previously measured photon state, if any, being known. The photons in the path 48 are referenced in connection with FIGS. 10-13 as corresponding to the qubit Q1. The entangled photons in the arbitrarily oriented elliptical polarization state passing via path 48 are optionally reflected from a mirror 50 and then enter a polarization interferometer depicted generally within the dotted lines labeled 92.

In contrast to system 10 depicted in FIG. 2, the system 90 includes an interferometer shown generally at 92 that has the geometry of a polarization Michelson interferometer. The interferometer 92 receives orthogonally polarized entangled photon pairs from the arbitrarily oriented elliptical polarization state path 48 incident on a polarization beam splitter 62 that splits the arbitrarily oriented elliptical polarization state 48 with one component of the polarization 93 phase shifted at phase modulator 94 relative to the other polarization component 96. The polarization component 96 interacts with a quarter wave plate 98 two times rotating polarization by 90 degrees. Phase component 96 is then reflected from mirror 100 back to polarization beam splitter 62 where the phase component 96 is recombined with phase shifted polarization component 93 that has passed through polarization modulator 94, a quarter wave plate 102 two times rotating the polarization by 90 degrees and returning to polarization beam splitter through reflection from translating mirror 104. It is appreciated that the phase modulator b 94 is readily removed and the phase difference applied to phase shifted polarization component 93 is imparted by the translating mirror 104. Phase modulator 94 is connected to the computer/processor and coincidence circuitry 42 via line/path 208, 209, 210. Regardless of the specific components of interferometer 92, the recombined state 74 is reflected off mirror 76 and further manipulated as detailed with respect to FIG. 2 such that a valid probability density function measurement is only counted upon coincidence between photon detection at modules 38 and 84, or between modules 38 and 86.

The controlled phase shift transformed entangled photon wavefunction components representing a recombined phase state in path 74 (of the qubit Q1) then interacts with a half wave plate oriented at 22.5 degrees 78 in order to implement a quantum Hadamard gate transformation therein and thus complete a quantum Fourier transform.

Continuing to the left side of FIG. 3, entangled photon source 250 provides entangled photons P1 and P2. In the drawing, for explanatory purposes, the second entangled photon P2 is repeated as an input into the Bell state measurement element 251 (represented by the square with a diagonal line). Within the Bell state measurement element 251, entangled photon P2 and the informational qubit Q1 passing via the path 74 interact via quantum interference. Note that as discussed above, the informational photon may have passed though the half wave plate 78, which implements a quantum Hadamard gate transformation thereon. In the Bell state measurement element 251, the measurement takes place between the entangled photon P2 and the informational photon. This interaction is depicted in FIG. 10, which depicts photon P2 and qubit Q1 undergoing a joint Bell state measurement. In the case of FIGS. 2 though 7, the qubit Q1 is the resultant of the interferometers 60 (FIGS. 2 & 5), 92 (FIGS. 3 & 6), 122 (FIG. 4 or 7). The determination of the Bell measurement, a joint quantum-mechanical measurement of two qubits, determines which of the four Bell states the two qubit system (Q1 and P2) exist. This is recorded by the photodetectors 252, 253, and the results are referred to herein as the "two-bit measurement."

In the general context of the entangled photons P1 and P2 being separated with photon P1 being at the receiving side and the photon P2 being at the sender, information contained in the qubit Q1 may be transmitted from the sender to the receiver with only the two-bit measurement (recorded by detectors 252, 253) being physically transmitted. That is, the information contained in the qubit Q1 as shown in FIG. 10, appears on the receiving side (bottom left of FIG. 10) due to the quantum properties of entanglement. Specifically, entangled photon P1 enters a unitary transformation at element 260, labeled unitary transformation operation, wherein the result or output is the information contained on qubit Q1 by detectors 84 and 86 (after passage through half mirror 82.

As explained in the foregoing (regarding the unitary transformation operation) when the sender wishes to send a qubit (quantum teleportation) the sender will perform a Bell measurement with sender's half of the shared entangled quantum system and the qubit to be transferred to the receiver (at elements 251, 252, 253). The outcome of the Bell measurement will be sent to the receiver over classical channels and consists of two bits. When the receiver gets the two bits (transferred via computer 211 to the unitary transformation element 260) the receiver applies to their remaining portion of the initially shared entangled state one of four unitary operations depending upon what the two bits indicate. Typically these operations can be represented by a matrix and correspond to the Identity matrix and three other matrices. For example, $$I = \begin{vmatrix} 1 & 0 \\ 0 & 1 \end{vmatrix}, T1 = \begin{vmatrix} 1 & 0 \\ 0 & -1 \end{vmatrix}, T2 = \begin{vmatrix} 0 & 1 \\ 1 & 0 \end{vmatrix}, \text{ and } T3 = \begin{vmatrix} 0 & -1 \\ 1 & 0 \end{vmatrix}.$$

The matrices are called unitary because they do not change the length, $\sqrt{a^2+b^2}$, of the vector that the matrix multiplies. After this operation, the receiver will possess the quantum information of the qubit that the sender transmitted. The unitary operation may (260) be performed by an element comprising, for example, a half wave plate and a quarter wave plate. For example, if the identity matrix is to be applied, nothing is done with the remaining portion of the initially shared entangled state. If the two bits indicate that the matrix T2 is to be applied the half wave plate will perform a ninety degree rotation. If T1 is to be applied, then two suitable quarter wave plate operations will be performed. If T3 is to be applied, then two suitable quarter wave plate operations followed by a suitable half wave plate operation will be performed. The outcome of the unitary transformation operation is detected by detectors 84, 86 via beamsplitter 82.

Thus, the information contained in qubit Q1 is passed from the sender to the receiver with only the physical transfer of the two-bit measurement via "classical channels." Thus, data relating to how to perform the Bell state measurement is transferred while the properties of entanglement between photons P1 and P2 result in the transference of information by teleportation of information; i.e., when the photon P2 "encounters" the qubit Q1 in the Bell state measurement element 251, the other photon P1 is effected by the "encounter" so as to in effect impart information from qubit Q1 to the entangled photons P1 and P2 simultaneously. Photons P1 and P2 may be significant distances from each other and still achieve the effects of entanglement; i.e. P1 is impacted by the conditions affecting P2.

The half wave plate 78 provides a qubit prioritized input 80 to a polarization beam splitter 82. Note that the half wave plate 78 may optionally be positioned following the Unitary Transformation circuitry 260 (as shown by dotted lines).

Referring now to FIG. 4, an inventive system is depicted generally at 120, the system 120 has numerous features in common with that system depicted in FIG. 2 and such attributes share like numerals with those detailed with respect to FIG. 2.

Specifically, as shown in FIG. 4, a data encoder 12 converts the data set to a set of qubit amplitudes that satisfies the expression of Equation 15 (i.e., the amplitude of the "data" is stored as the amplitudes of a superposed quantum state $\psi = \Sigma \alpha_i |k\rangle_i$ and triggers a light source 14 accordingly.

The light source 14 may be a laser, such as Nd:YAG, ion lasers, diode lasers, excimer lasers, dye lasers, and frequency modified lasers. Photons in path 16 emitted from the light source 14 are optionally passed through a spatial filter 18. Filter 18 converts the photons in path 16 in an image space domain to a spatial frequency domain and serves the purpose of removing, for example, stripe noise of low frequency and/or high frequency noise as described above in connection with FIG. 2. The photons represented by path 20 having passed through spatial filter 18 are then passed through a Type-II nonlinear optics crystal 22. An optional dichroic mirror or bandpass filter 24 that is operative to transmit specified wavelengths and reflect all others is used to selectively reflect out of the beam path 26 those photons 28 that have reflected wavelengths as a result of passing through the crystal 22 into a stop 30. Whatever photon goes through will be wavelength shifted such that the sum of energies is equal to the "parent" photon. After passage through half-mirror 24, the remaining entangled photons 26 are split by interaction with a polarization beam splitter 32 into two paths; a known photon state path 34 and a comparator wave function state path 36. The comparator wave function state path 36 is directed onto a single photon counting module 38 by an optional mirror set 40. It is appreciated that a reorganization of beam paths in the system 10 obviates the need for mirror set 40. The detection of the photons from the comparator wave function state path 36 by the single photon counting module 38 is fed to coincidence electronics 42 and is used to reconstruct the data set at the receiver end. The entangled photons in the known photon state path 34 are then passed through a polarization modulator 44 and a phase modulator 46. Exemplary polarization phase modulators illustratively include liquid crystals, Kerr cells, and Pockel cells. Preferably, a series of two liquid crystal devices and a quarter wave plate may be used to achieve arbitrary polarization. Upon the entangled photons known photon state path 34 interacting with the polarization and phase modulators 44 and 46, respectively, the photons Q1 are transformed into an arbitrarily oriented elliptical polarization state for passage via path 48 based on the data set signal being transformed and any previously measured photon state, if any is known. The photons Q1 in the arbitrarily oriented elliptical polarization state passing via path 48 are optionally reflected from a mirror 50 and then enter a polarization interferometer depicted generally at 122.

In contrast to system 10 depicted in FIG. 2, and system 90 depicted in FIG. 3, the system 120 includes an interferometer shown generally at 122 that has the geometry of a polarization Sagnac interferometer. The arbitrarily oriented elliptical polarization state 48 is split at polarization beam splitter 62 to phase shift a polarization component 123 through interaction with a phase modulator 94. A second component 126 is recombined with the phase shifted component 123 through coincidental reflection with the mirrors collectively labeled 128. The recombined state 74 is reflected by mirror 76 onto a half wave plate 78 to implement a quantum Hadamard gate transformation.

Continuing to the left side of FIG. 4, entangled photon source 250 provides entangled photons P1 and P2. In the drawing, for explanatory purposes, the second entangled photon P2 is repeated as an input into the Bell state measurement element 251 (represented by the square with a diagonal line). Within the Bell state measurement element 251, entangled photon P2 and the informational qubit Q1 interact via quantum interference. Note that as discussed above, the informational photon may have passed though the half wave plate 78, which implements a quantum Hadamard gate transformation thereon. In the Bell state measurement element 251, the measurement takes place between the entangled photon P2 and the informational photon. This interaction is depicted in FIG. 10, which depicts photon P2 and qubit Q1 undergoing a joint Bell state measurement. The determination of the Bell measurement, a joint quantum-mechanical measurement of two qubits, determines which of the four Bell states the two qubit system (Q1 and P2) exist. This is recorded by the photodetectors 252, 253, and the results are referred to herein as the "two-bit measurement." The transfer of these two bits via lines 254 may be accomplished by first passing the two bits through an optional computer 211 for input into the unitary transformation element 260.

It is noted again that in the general context of the entangled photons P1 and P2 being separated with photon P1 being at the receiving side and the photon P2 being at the sender, information contained in the qubit Q1 may be transmitted from the sender to the receiver with only the two-bit measurement (recorded by detectors 252, 253) being physically transmitted. The half wave plate 78 provides a qubit prioritized input 80 to a polarization beam splitter 82. Note that the half wave plate 78 may optionally be positioned following the Unitary Transformation circuitry 260 (as shown by dotted lines).

As explained in the foregoing (regarding the unitary transformation operation) when the sender wishes to send a qubit (quantum teleportation) the sender will perform a Bell measurement with sender's half of the shared entangled quantum system and the qubit to be transferred to the receiver (at elements 251, 252, 253). The outcome of the Bell measurement will be sent to the receiver over classical channels and consists of two bits. When the receiver gets the two bits (transferred via computer 211 to the unitary transformation element 260) the receiver applies to their remaining portion of the initially shared entangled state one of four unitary operations depending upon what the two bits indicate. Typically these operations can be represented by a matrix and correspond to the Identity matrix and three other matrices. For example, $$I = \begin{vmatrix} 1 & 0 \\ 0 & 1 \end{vmatrix}, T1 = \begin{vmatrix} 1 & 0 \\ 0 & -1 \end{vmatrix}, T2 = \begin{vmatrix} 0 & 1 \\ 1 & 0 \end{vmatrix}, \text{ and } T3 = \begin{vmatrix} 0 & -1 \\ 1 & 0 \end{vmatrix}.$$

The matrices are called unitary because they do not change the length, $\sqrt{a^2+b^2}$, of the vector that the matrix multiplies. After this operation, the receiver will possess the quantum information of the qubit that the sender transmitted. The unitary operation may (260) be performed by an element comprising, for example, a half wave plate and a quarter wave plate. For example, if the identity matrix is to be applied, nothing is down with the remaining portion of the initially shared entangled state. If the two bits indicate that the matrix T2 is to be applied the half wave plate will perform a ninety degree rotation. If T1 is to be applied, then two suitable quarter wave plate operations will be performed. If T3 is to be applied, then two suitable quarter wave plate operations followed by a suitable half wave plate operation will be performed. The outcome of the unitary transformation operation is detected by detectors 84, 86 via beamsplitter 82.

Continuing, in the left side of FIG. 4 single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement.

Figure 5:
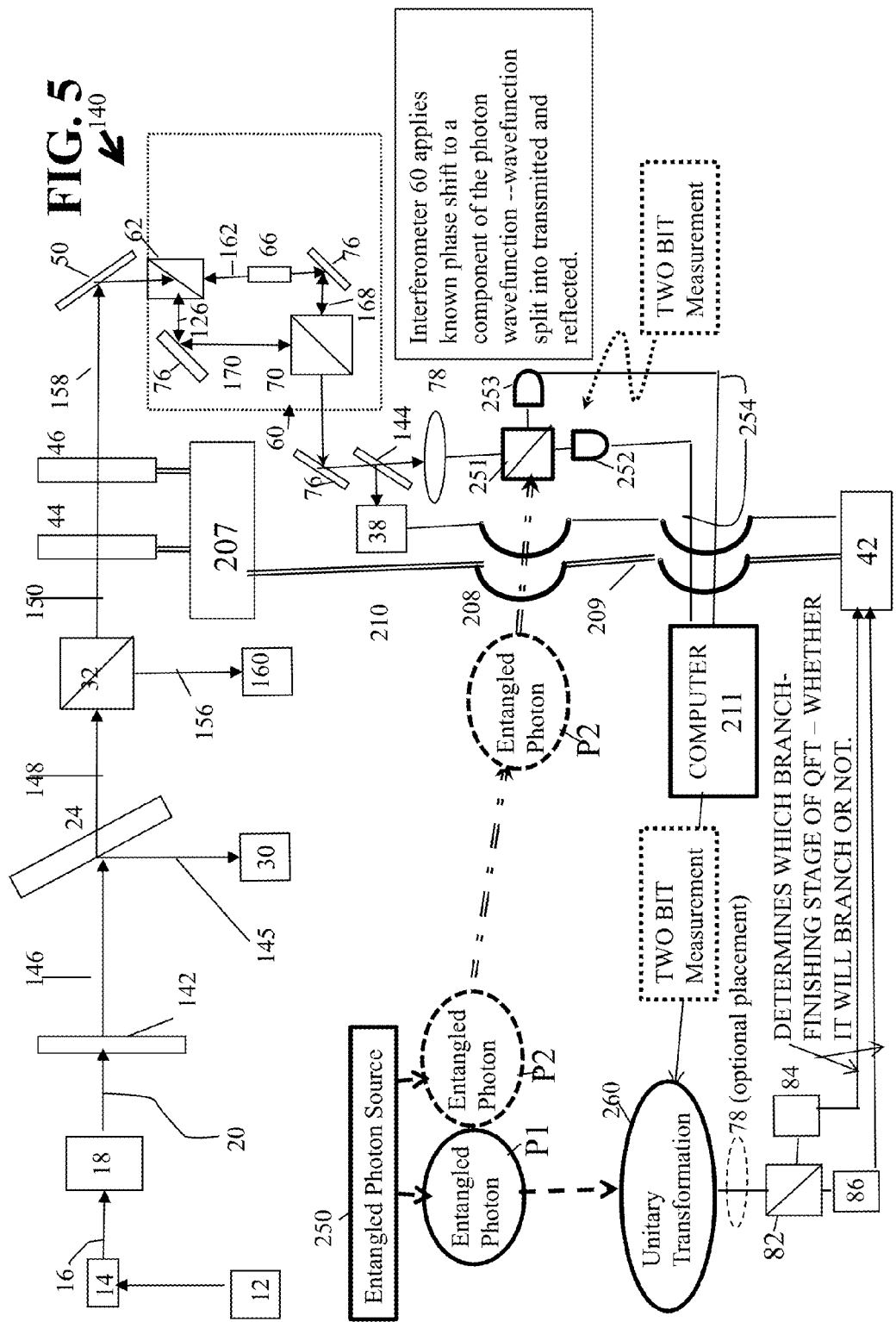
FIG. 5 is a schematic of an optical bench configured as a quantum computer system according to the present invention using a Type-I nonlinear optics crystal and a polarization Mach-Zehnder interferometer to perform a QFT.

Referring now to FIG. 5, an inventive system is depicted generally at 140 that is a Type-I nonlinear optics crystal analog. A data encoder 12 converts the data set to a set of qubit amplitudes that satisfies the expression of Equation 15 and triggers a light source 14 accordingly. Photons in path 16 emitted from the light source 14 are optionally passed through a spatial filter 18. Filter 18 converts the photons in path 16 in an image space domain to a spatial frequency domain and serves the purpose of removing, for example, stripe noise of low frequency and/or high frequency noise. Photons in path 16 emitted from the light source 14 are optionally passed through a spatial filter 18. The photons 20 having passed through spatial filter 18 are then passed through a Type-I nonlinear crystal 142 generates entangled photon pairs with the same known polarization from photons 20. Type I nonlinear optical crystals operative herein illustratively include beta-barium borate, potassium niobate, lithium triborate and cesium lithium borate. Preferably, the crystal 142 is tuned for non-degenerative down conversion with regard to dichroic mirror 144. The entangled photon pair Q1, Q2 with same known polarization 146 is separated by an optional dichroic mirror or bandpass filter that is operative to transmit specified wavelengths and reflect all others 24 which is used to selectively reflect out of the path 26 those photons 28 that have reflected wavelengths as a result of passing through the crystal 22 into a stop 30. The nearly monochromatic known polarization beam 148 comprising photons or qubits Q1, Q2 is incident on polarization beam splitter 32 and that component with a known photon state 150 is directed through a polarization modulator 44, a phase modulator 46 to yield an arbitrarily oriented polarization state 158 that is optionally reflected off mirror 50 and into interferometer 60 that has the geometry of a polarization Mach-Zehnder interferometer. Second photon state 156 is directed onto beam stop 160. The arbitrarily oriented elliptical polarization state 158 retains characteristics of the data set signal to be subsequently transformed in any previously measured photon state, if such is known. The interferometer 60 depicted has the geometry of a polarization Mach-Zehnder interferometer and includes a polarization beam splitter 62 that transmits one portion 162 to a phase modulator 66 resulting in a phase shift in the light component 168 reaching polarization beam splitter 70 relative to the other polarization component 170. Polarization beam splitter 70 recombines beam components 168 and 170 to complete a quantum Fourier transform on the recombined state 172 from the interferometer 60. Ancillary mirrors collectively number 76 are provided to reflect light in desired directions. The recombined state 172 is such that one of the photons of an entangled photon pair is reflected by dichroic mirror 144 to single photon counting module 38 while the other photon of the entangled photon pair will be transmitted onto the half wave plate 78.

Continuing to the left side of FIG. 5, entangled photon source 250 provides entangled photons P1 and P2. In the drawing, for explanatory purposes, the second entangled photon P2 is repeated as an input into the Bell state measurement element 251 (represented by the square with a diagonal line). Within the Bell state measurement element 251, entangled photon P2 and the informational qubit Q1 (which passes through the interferometer 122 and which passes via the path 74) interact via quantum interference. Note that as discussed above, the informational photon may have passed though the half wave plate 78, which implements a quantum Hadamard gate transformation thereon. In the Bell state measurement element 251, the entanglement takes place between the entangled photon P2 and the informational photon. This interaction is depicted in FIG. 10, which depicts photon P2 and qubit Q1 undergoing a joint Bell state measurement. The determination of the Bell measurement, a joint quantum-mechanical measurement of two qubits, determines which of the four Bell states the two qubit system (Q1 and P2) exists. This is recorded by the photodetectors 252, 253, and the results are referred to herein as the "two-bit measurement."

It is noted again that in the general context of the entangled photons P1 and P2 being separated with photon P1 being at the receiving side and the photon P2 being at the sender, information contained in the qubit Q1 may be transmitted from the sender to the receiver with only the two-bit measurement (recorded by detectors 252, 253) being physically transmitted. The half wave plate 78 provides a qubit prioritized input 80 to a polarization beam splitter 82. Note that the half wave plate 78 may optionally be positioned following the Unitary Transformation circuitry 260 (as shown by dotted lines).

As explained in the foregoing (regarding the unitary transformation operation) when the sender wishes to send a qubit (quantum teleportation) the sender will perform a Bell measurement with sender's half of the shared entangled quantum system and the qubit to be transferred to the receiver (at elements 251, 252, 253). The outcome of the Bell measurement will be sent to the receiver over classical channels and consists of two bits. When the receiver gets the two bits (transferred via computer 211 to the unitary transformation element 260) the receiver applies to their remaining portion of the initially shared entangled state one of four unitary operations depending upon what the two bits indicate. Typically these operations can be represented by a matrix and correspond to the Identity matrix and three other matrices. For example, $$I = \begin{vmatrix} 1 & 0 \\ 0 & 1 \end{vmatrix}, T1 = \begin{vmatrix} 1 & 0 \\ 0 & -1 \end{vmatrix}, T2 = \begin{vmatrix} 0 & 1 \\ 1 & 0 \end{vmatrix}, \text{ and } T3 = \begin{vmatrix} 0 & -1 \\ 1 & 0 \end{vmatrix}.$$

The matrices are called unitary because they do not change the length, $\sqrt{a^2+b^2}$, of the vector that the matrix multiplies. After this operation, the receiver will possess the quantum information of the qubit that the sender transmitted. The unitary operation may (260) be performed by an element comprising, for example, a half wave plate and a quarter wave plate. For example, if the identity matrix is to be applied, nothing is down with the remaining portion of the initially shared entangled state. If the two bits indicate that the matrix T2 is to be applied the half wave plate will perform a ninety degree rotation. If T1 is to be applied, then two suitable quarter wave plate operations will be performed. If T3 is to be applied, then two suitable quarter wave plate operations followed by a suitable half wave plate operation will be performed. The outcome of the unitary transformation operation is detected by detectors 84, 86 via beamsplitter 82.

Continuing, in the left side of FIG. 5 single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement. Note that in all embodiments of FIGS. 2-7, one result of detectors 84, 86 is the determination of which branch (or whether or not a branch will be undertaken, the finishing stage of the QFT) of the branches depicted in FIGS. 1-1C with respect to the Quantum Binary Tree. Moreover, the result is represented by Q1' in FIG. 10. The representation Q1' refers to the transferred photon information state and can be many bits per photon transferred.

Figure 6:
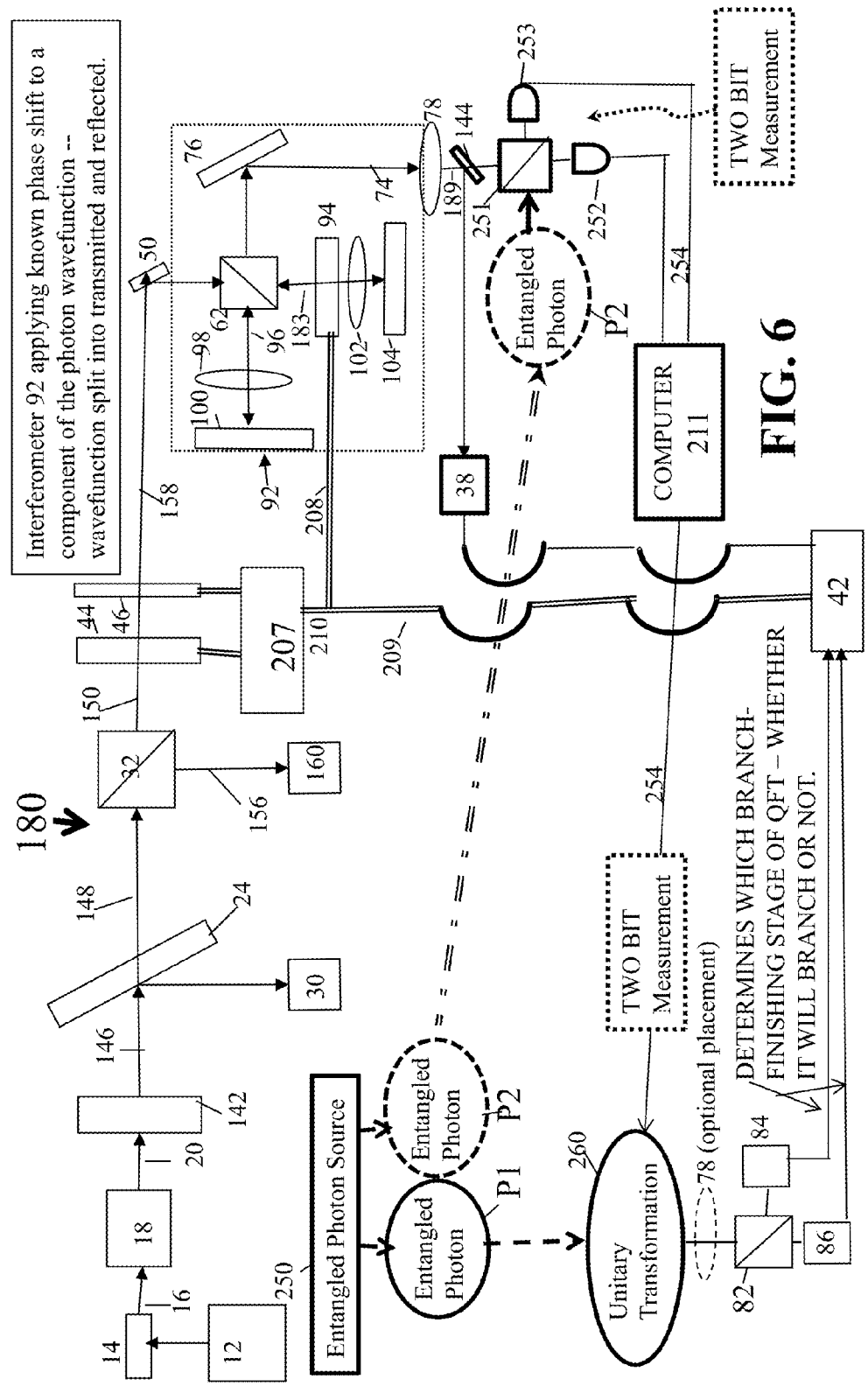
FIG. 6 is a schematic of an optical bench configured as a quantum computer system according to the present invention using a Type-I nonlinear optics crystal and a polarization Michelson interferometer to perform a QFT.
Figure 7:
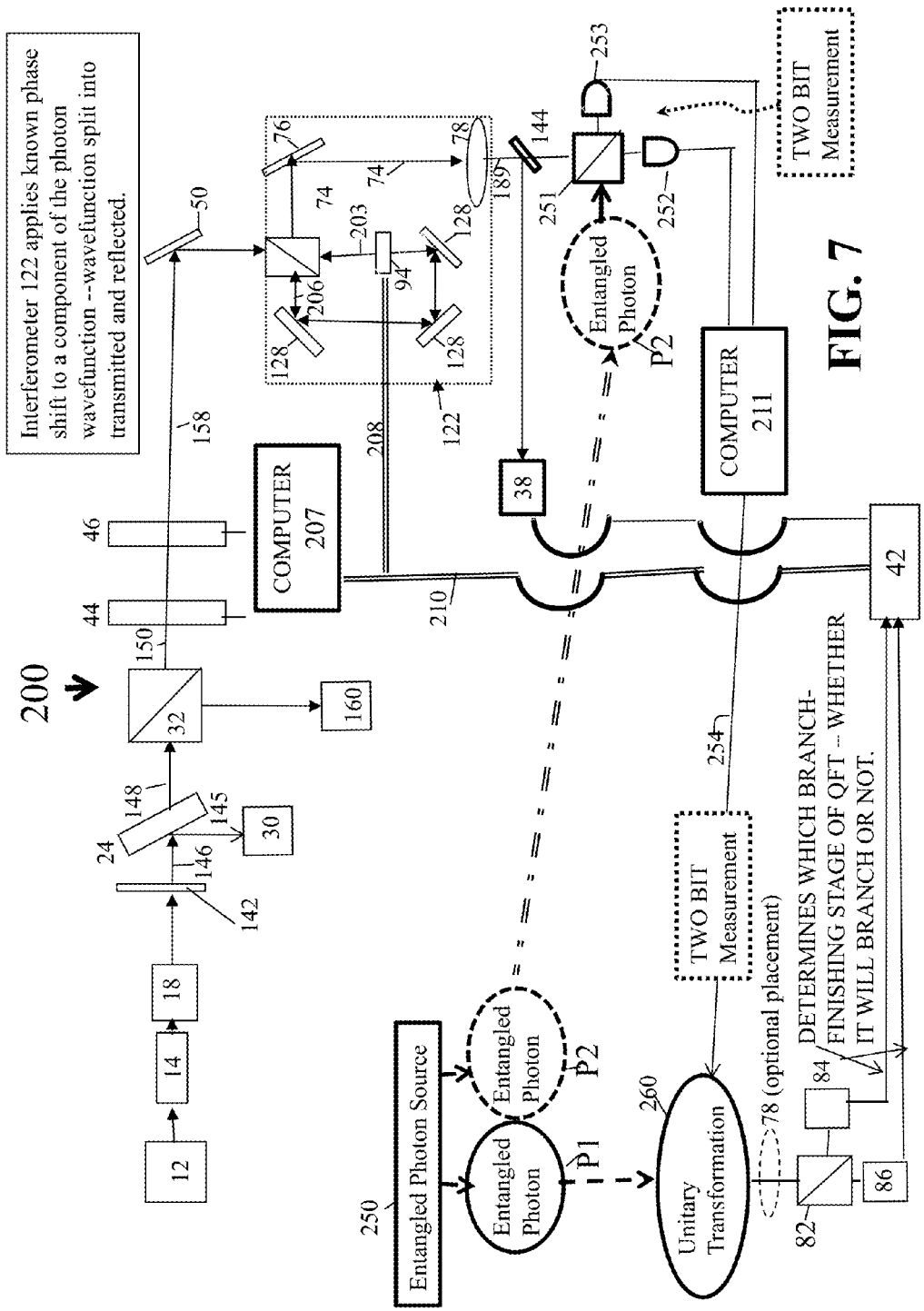
FIG. 7 is a schematic of an optical bench configured as a quantum computer system according to the present invention using a Type-I nonlinear optics crystal and a polarization Sagnac interferometer to perform a QFT.

Referring now to FIG. 6, a Type-I nonlinear optical crystal analog system 180 is depicted. A data encoder 12 converts the data set to a set of qubit amplitudes that satisfies the expression of Equation 15 and triggers a light source 14 accordingly. Photons in path 16 emitted from the light source 14 are optionally passed through a spatial filter 18. The photons 20 having passed through spatial filter 18 are then passed through a Type-I nonlinear crystal 14 that generates entangled photon pairs Q1, Q2 with the same known polarization via path 20. Preferably, the crystal 142 is tuned for non-degenerative down conversion with regard to dichroic mirror 144 that is operative to separate the non-degenerate down converted wavelengths. The entangled photon pairs Q1, Q2 with same known polarization in path 146 is separated from reflected frequency shifted components in path 145 by optional dichroic mirror or bandpass filter 24 that are terminated at beam stop 30. The nearly monochromatic known polarization beam in path 148 is incident on polarization beam splitter 32 and that component with a known photon state in path 150 is directed through a polarization modulator 44, a phase modulator 46 to yield an arbitrarily oriented elliptical polarization state entangled photons in path 158 that are reflected off mirror 50 and into an interferometer shown generally at 92 that has the geometry of a polarization Michelson interferometer. The arbitrarily oriented elliptical polarization state in path 158 retains characteristics of the data set signal to be subsequently transformed in any previously measured photon state, if such is known. The interferometer 92 is identical to the interferometer 92 in FIG. 3. The interferometer 92 receives the photon pairs Q1, Q2 in the arbitrarily oriented elliptical polarization state on path 158 incident on a polarization beam splitter 62 that splits the arbitrarily oriented elliptical polarization state photon wavefunctions Q1 and Q2 in path 158 with one component of the polarization wavefunction for Q1 and Q2 in path 183 phase shifted at phase modulator 94 relative to the other polarization wavefunction component for photons Q1 and Q2 in path 186. The polarization components of photons in path 186 interact with a quarter wave plate 98 two times rotating polarization by 90 degrees. Phase polarization wavefunction components in path 186 are then reflected from mirror 100 back to polarization beam splitter 62 where the wavefunction components in path 96 are recombined with phase shifted polarization components in path 183 that has passed through polarization modulator 94, a quarter wave plate 102 two times rotating the polarization by 90 degrees and returning to polarization beam splitter through reflection off of translating mirror 104. The combined state 74 is transmitted through a half wave plate 78 oriented at so as to perform a quantum Hadamard transform to yield recombined transformed output 189. Note that the half wave plate 78 may optionally be positioned following the Unitary Transformation circuitry 260 (as shown by dotted lines). The recombined transformed output 189 is such that one of the photon components (e.g., Q2) thereof is reflected by dichroic mirror 144 to single photon counting module 38 while the other photon component (e.g., Q1) is directed to Bell measurement element 251. Continuing to the left side of FIG. 6, entangled photon source 250 provides entangled photons P1 and P2. In the drawing, for explanatory purposes, the second entangled photon P2 is repeated as an input into the Bell state measurement element 251 (represented by the square with a diagonal line). Within the Bell state measurement element 251, entangled photon P2 and the informational qubit Q1 (which passes through the interferometer 122 and which passes via the path 74) interact via quantum interference. Note that as discussed above, the informational photon may have passed though the half wave plate 78, which implements a quantum Hadamard gate transformation thereon. In the Bell state measurement element 251, the measurement takes place between the entangled photon P2 and the informational photon. This interaction is depicted in FIG. 10, which depicts photon P2 and qubit Q1 undergoing a joint Bell state measurement. The determination of the Bell measurement, a joint quantum-mechanical measurement of two qubits, determines which of the four Bell states the two qubit system (Q1 and P2) exists. This is recorded by the photodetectors 252, 253, and the results are referred to herein as the "two-bit measurement."

It is noted again that in the general context of the entangled photons P1 and P2 being separated with photon P1 being at the receiving side and the photon P2 being at the sender, information contained in the qubit Q1 may be transmitted from the sender to the receiver with only the two-bit measurement (recorded by detectors 252, 253) being physically transmitted.

As explained in the foregoing (regarding the unitary transformation operation), when the sender wishes to send a qubit (quantum teleportation) the sender will perform a Bell measurement with sender's half of the shared entangled quantum system and the qubit to be transferred to the receiver (at elements 251, 252, 253). The outcome of the Bell measurement will be sent to the receiver over classical channels and consists of two bits. When the receiver gets the two bits (transferred via computer 211 to the unitary transformation element 260) the receiver applies to their remaining portion of the initially shared entangled state one of four unitary operations depending upon what the two bits indicate. Typically these operations can be represented by a matrix and correspond to the Identity matrix and three other matrices. For example, $$I = \begin{vmatrix} 1 & 0 \\ 0 & 1 \end{vmatrix}, T1 = \begin{vmatrix} 1 & 0 \\ 0 & -1 \end{vmatrix}, T2 = \begin{vmatrix} 0 & 1 \\ 1 & 0 \end{vmatrix}, \text{ and } T3 = \begin{vmatrix} 0 & -1 \\ 1 & 0 \end{vmatrix}.$$

The matrices are called unitary because they do not change the length, $\sqrt{a^2+b^2}$, of the vector that the matrix multiplies. After this operation, the receiver will possess the quantum information of the qubit that the sender transmitted. The unitary operation may (260) be performed by an element comprising, for example, a half wave plate and a quarter wave plate. For example, if the identity matrix is to be applied, nothing is done with the remaining portion of the initially shared entangled state. If the two bits indicate that the matrix T2 is to be applied the half wave plate will perform a ninety degree rotation. If T1 is to be applied, then two suitable quarter wave plate operations will be performed. If T3 is to be applied, then two suitable quarter wave plate operations followed by a suitable half wave plate operation will be performed. The outcome of the unitary transformation operation is detected by detectors 84, 86 via beamsplitter 82. Note that in all embodiments of FIGS. 2-7, one result of detectors 84, 86 is the determination of which branch (or whether or not a branch will be undertaken, the finishing stage of the QFT) of the branches depicted in FIGS. 1-1C with respect to the Quantum Binary Tree. Moreover, the result is represented by Q1' in FIG. 10. The representation Q1' refers to the transferred photon information state and can be many bits per photon transferred.

Continuing, in the left side of FIG. 6 single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement.

Referring now to FIG. 7, a Type-I nonlinear optical crystal analog system 200 is depicted, which in general is similar to the system 120 of FIG. 4 (for example, interferometers 122 are present in both systems 120 and 200) and where like numerals used with reference to FIG. 4 correspond to the description of those previously described with respect to the proceeding figures. In FIG. 7, a Type-I nonlinear crystal 142 generates entangled photon pairs with the same known polarization from photons passing in path 20. Preferably, the crystal 142 is tuned for non-degenerative down conversion with regard to dichroic mirror 144. The known polarization beam of entangled photons in path 148 is incident on polarization beam splitter 32 that operates to transmit one polarization component and reflect other polarization components and that component with a known photon polarization state in path 150 is directed to a polarization modulator 44. As in all of the embodiments in FIGS. 4-7, the polarization modulator 44 and phase modulator 46 are controlled by computer 207, which determines which half of the data to process (as explained with reference to FIG. 1A) based upon the last measurement fed back from coincident detector 42, which is connected to the computer 207 by lines 209 and 110. The component with a known photon state is directed through a polarization modulator 44 and phase modulator 46 to yield an arbitrarily oriented elliptical polarization state in path 158 that is reflected off mirror 50 and into an interferometer shown generally at 122 that has the geometry of a polarization Sagnac interferometer. The arbitrarily oriented elliptical polarization state in path 158 retains characteristics of the data set signal to be subsequently transformed in any previously measured photon state, if such is known. The interferometer 122 comprises like elements referenced by the same numerals as the interferometer 122 of FIG. 4 and receives the arbitrarily oriented elliptical polarization state in path 158 incident on a polarization beam splitter 62 that splits the arbitrarily oriented elliptical polarization state in path 158 to phase shift a polarization component in path 203 through interaction with a phase modulator 94. Phase Modulator 94 is also connected to computer 207 by lines 208 and 210. The computer 207 controls the phase modulator 94 depending upon the stage of the Fourier transform.

In connection with the embodiments depicted in FIGS. 3, 4, 6 and 7, optionally, a second computer 211 may be used to control phase modulator 94 if the phase modulator is at a remote location. The second component (of the entangled photon pair Q1, Q2) in path 206 is recombined with the phase shifted component 203 (of the entangled photon pair Q1, Q2) through coincidental reflection with the mirrors collectively labeled 128. The combined state 187 is transmitted through a half wave plate 78 oriented at so as to perform a quantum Hadamard transform to yield recombined transformed output 189. Note that the half wave plate 78 may optionally be positioned following the Unitary Transformation circuitry 260 (as shown by dotted lines). The recombined transformed output 189 is such that one of the photon components thereof is reflected by dichroic mirror 144 to single photon counting module 38 while the other photon component is processed as follows.

Continuing to the left side of FIG. 7, entangled photon source 250 provides entangled photons P1 and P2. In the drawing, for explanatory purposes, the second entangled photon P2 is repeated as an input into the Bell state measurement element 251 (represented by the square with a diagonal line). Within the Bell state measurement element 251, entangled photon P2 and the informational qubit Q1 (which passes through the interferometer 122 and which passes via the path 74) interact via quantum interference. Note that as discussed above, the informational photon may have passed though the half wave plate 78, which implements a quantum Hadamard gate transformation thereon. In the Bell state measurement element 251, the measurement takes place between the entangled photon P2 and the informational photon. This interaction is depicted in FIG. 10, which depicts photon P2 and qubit Q1 undergoing a joint Bell state measurement. The determination of the Bell measurement, a joint quantum-mechanical measurement of two qubits, determines which of the four Bell states the two qubit system (Q1 and P2) exists. This is recorded by the photodetectors 252, 253, and the results are referred to herein as the "two-bit measurement."

It is noted again that in the general context of the entangled photons P1 and P2 being separated with photon P1 being at the receiving side and the photon P2 being at the sender, information contained in the qubit Q1 may be transmitted from the sender to the receiver with only the two-bit measurement (recorded by detectors 252, 253) being physically transmitted. The half wave plate 78 provides a qubit prioritized input 80 to a polarization beam splitter 82 and yields a single photon registered on one of the single photon counting modules 84 or 86. Note that the half wave plate 78 may optionally be positioned following the Unitary Transformation circuitry 260 (as shown by dotted lines).

As explained in the foregoing (regarding the unitary transformation operation) when the sender wishes to send a qubit (quantum teleportation) the sender will perform a Bell measurement with sender's half of the shared entangled quantum system and the qubit to be transferred to the receiver (at elements 251, 252, 253). The outcome of the Bell measurement will be sent to the receiver over classical channels and consists of two bits. When the receiver gets the two bits (transferred via computer 211 to the unitary transformation element 260) the receiver applies to their remaining portion of the initially shared entangled state one of four unitary operations depending upon what the two bits indicate. Typically these operations can be represented by a matrix and correspond to the Identity matrix and three other matrices. For example, $$I = \begin{vmatrix} 1 & 0 \\ 0 & 1 \end{vmatrix}, T1 = \begin{vmatrix} 1 & 0 \\ 0 & -1 \end{vmatrix}, T2 = \begin{vmatrix} 0 & 1 \\ 1 & 0 \end{vmatrix}, \text{ and } T3 = \begin{vmatrix} 0 & -1 \\ 1 & 0 \end{vmatrix}.$$

The matrices are called unitary because they do not change the length, $\sqrt{a^2+b^2}$, of the vector that the matrix multiplies. After this operation, the receiver will possess the quantum information of the qubit that the sender transmitted. The unitary operation may (260) be performed by an element comprising, for example, a half wave plate and a quarter wave plate. For example, if the identity matrix is to be applied, nothing is done with the remaining portion of the initially shared entangled state. If the two bits indicate that the matrix T2 is to be applied the half wave plate will perform a ninety degree rotation. If T1 is to be applied, then two suitable quarter wave plate operations will be performed. If T3 is to be applied, then two suitable quarter wave plate operations followed by a suitable half wave plate operation will be performed. The outcome of the unitary transformation operation is detected by detectors 84, 86 via beamsplitter 82. Note that in all embodiments of FIGS. 2-7, one result of detectors 84, 86 is the determination of which branch (or whether or not a branch will be undertaken, the finishing stage of the Quantum Fourier Transform (QFT)) of the branches depicted in FIGS. 1-1C with respect to the Quantum Binary Tree. Moreover, the result is represented by Q1' in FIG. 10. The representation Q1' refers to the transferred photon information state and can be many bits per photon transferred.

Continuing, in the left side of FIG. 7, single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement.

The coincidence electronics 42 feed the result back to the computer 207 via lines 209 and 210 so that the computer 207 determines which portion of the data to process next and how to prepare the data bases on the last measurement detected by the coincident electronics. The feature is depicted in FIG. 1A where dotted lines are used to show data paths which are no longer in use and the BINS labeled R are no longer used while the BINS labeled L remain to be processed. By making a determination not to use the 4 BINS labeled R as depicted in FIG. 1A, data compression is achieved.

It is noted the foregoing depicts the functions of respective elements that are controlled or implemented by a computer. Such operations may be performed, for example by or in conjunction with the computer labeled as Computer 207 in FIGS. 2-7, which depicts a classic computer, and the capabilities of computer 207 or associated computers may include the loading with an input signal. The computer 207 (or associated computers) then performs a quantum Fourier transform and either a classical inverse Fourier transform or a quantum inverse Fourier transform. The output of system 207 (or associated computers) may be provided to a buffer store (not shown). From the buffer store it may be provided to an output device on either a real time or delayed basis as still images, video images, movies, audio sound representations, and the like. Computer or processor 207 may be loaded with the input signal that determines the wave function amplitudes that satisfy Equation 15, controls modulators 44 and 46, and controls the phase shift elements (e.g. 66 in FIG. 2). Processor 207 is also operatively connected to coincidence electronics 42. The coincidence electronics serve to determine when a valid Bell State measurement has occurred by a coincidence between a detection event at, for example, detector 38 in FIGS. 2-7 and the Bell State measurement indicated by detectors 252 and 253. Processor 207 would then classically communicate, e.g. via the Internet etc, two bits that represent the outcome of the Bell State measurement to processor 211 optionally with a time stamp provided by 42 indicating when the coincidence took place. Computer 211 may be operationally connected to Unitary transformer 260, coincidence electronics 42 and one half of an entangled pair of photons P1, and detectors 86 and 84. On receiving two bits from Processor 207, computer 211 then sets the Unitary transformer 260 to the appropriate matrix values as described above to transform photon P1 into the quantum photon state at path 74 to complete the quantum teleportation of information operation. Computer 211 records the result of the measurement at 84, 86 and communicates to Processor 207 that result so that the next qubit can be teleported along the correct branch of the quantum binary tree (FIG. 1). Computer 211 can then perform either a classical inverse Fourier transform or a quantum inverse Fourier transform to recover the signal communicated by processor 207. The output of system 211 may be provided to a buffer store (not shown). From the buffer store it may be provided to an output device on either a real time or delayed basis as still images, video images, movies, audio sound representations, and the like.

EXAMPLE

Sound Spectrum Computation

Figure 8:
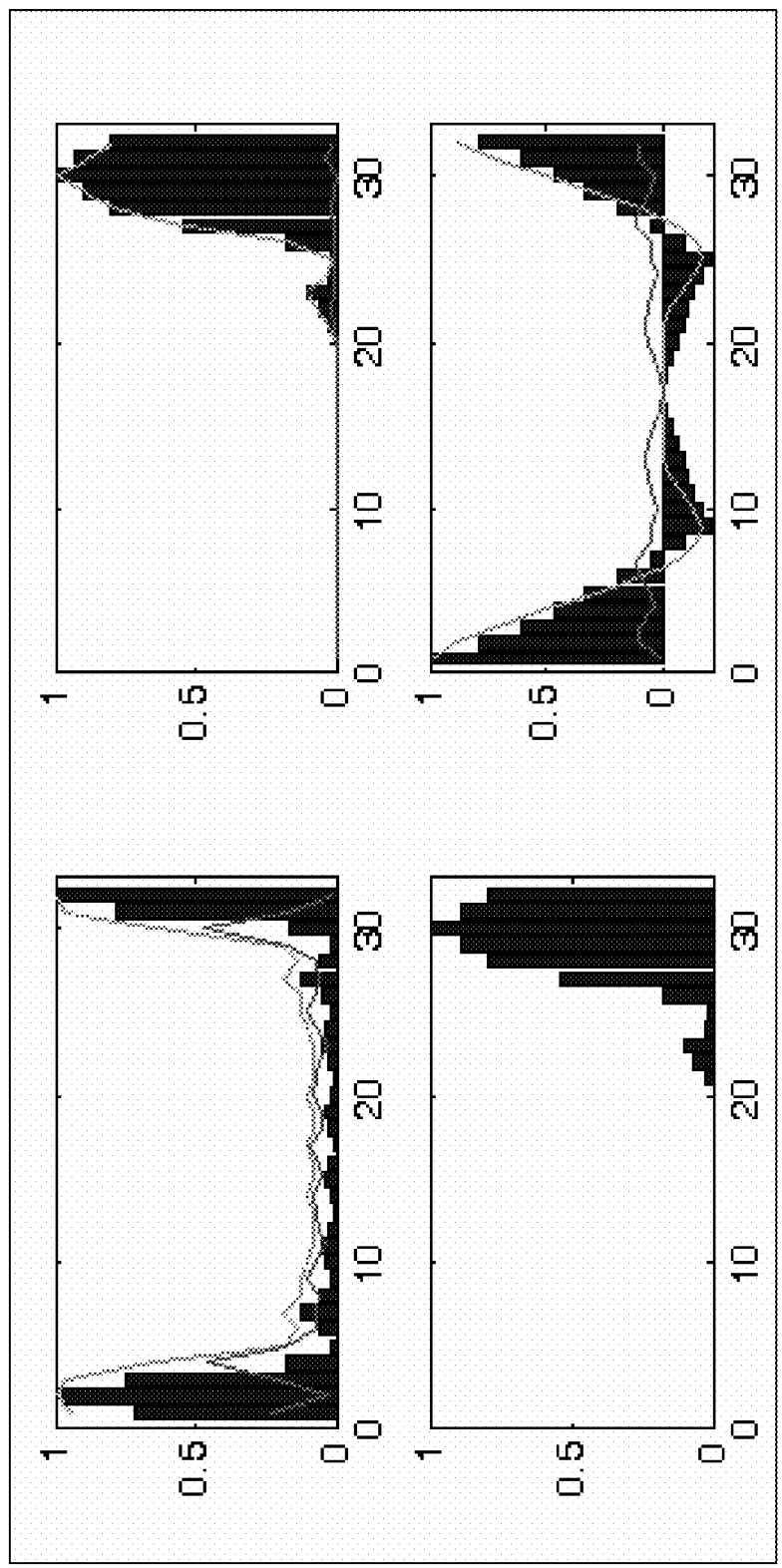
FIG. 8 is a series of 32 normalized sound spectrum samples depicted as a quantized histogram of amplitudes, black line and gray line overlies denoting classical and quantum Fourier transforms of the sample, respectively.

In order to evaluate the ability of the inventive quantum algorithm to compress and transmit a signal representative of the data set with a comparatively small number of photons, 32 sound samples defining a normalized arbitrary spectrum are provided in the top left panel of FIG. 8. The histogram defines a quantized spectrum while the solid lines superimposed thereover represent classical Fourier (gray line) transform and QFT (black line) fits to the data. The 32 sound sample elements of the top left spectrum are amenable to storage and operation on $2^n$ or 4 qubits. The top right panel of FIG. 8 represents a single statistical evaluation of the arbitrary spectrum depicted in the top left panel. The line superimpositions on the histogram in the top right represents a classical and quantum magnitude superposition. The lower left panel is duplicative of the conventional four photon single evaluation of the arbitrary spectrum (upper left panel) and represents the input signal into the processor 207 depicted in FIG. 2. The lower right panel depicts the reconstructed arbitrary spectrum (upper left panel) based on quantum Fourier transform as described herein, followed by an inverse Fourier transform. The solid overlapping lines represent reconstructed probability and classical magnitudes.

Figure 9B:
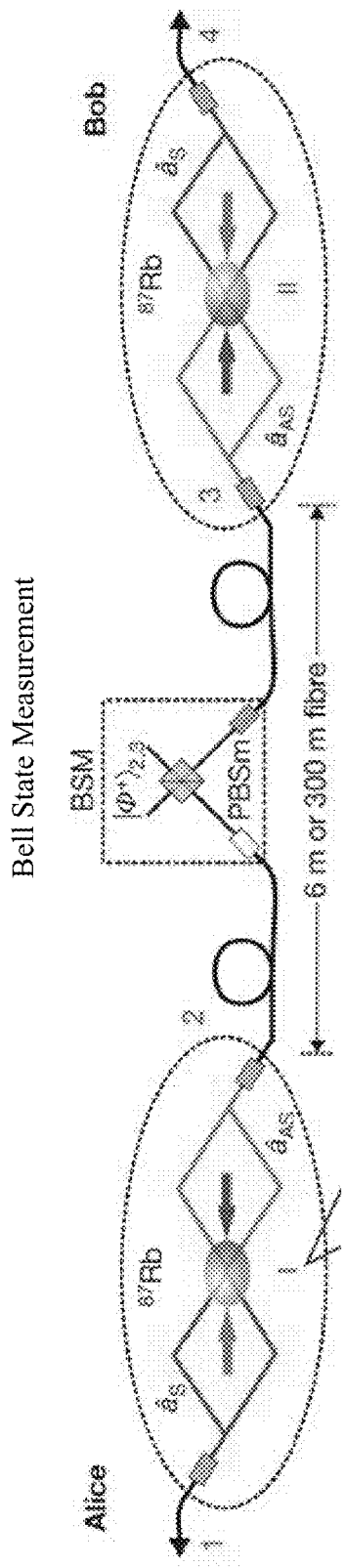
FIG. 9B illustrates a prior art phase stable scheme for entangling distant atomic ensembles through two-photon Hong-Ou-Mandel type interference.

FIG. 10 is a schematic depiction of the concept of the preferred embodiment system of FIGS. 2 through 7 in which a qubit Q1 of converted data is transferred to the receiver as a photon state. Bold dashed arrowed lines indicate the travel paths of individual portions of an entangled photon pair generated by the entangled photon source 250. Filled eight-sided stars P1 and P2 indicate each part of an entangled photon pair. The dotted line between the stars represents the entanglement of the two photons. The crossed circle indicates the qubit Q1 of data to be converted. The bold arrowed dash-dot line in the upper right of FIG. 10 denotes the direction and travel path for the qubit (or photon information to be transferred) of data to be converted. The square with a diagonal line, element 251) represents the presence of a device that performs a Bell state measurement. Such devices may be for example optical elements such as beam splitters and waveplates coupled with nonlinear interactions (as described in Yoon-Ho Kim, Sergei P. Kulik, and Yanhua Shih, "Quantum Teleportation of a Polarization State with a Complete Bell State Measurement," Physical Review Letters, Vol. 86, No. 7, pp. 1370-1373, (2001) (herein incorporated by reference), or Bell state detection is done sequentially using Raman transitions for atomic systems, as described in Lloyd, S., et al. "Long Distance, Unconditional Teleportation of Atomic States via Complete Bell State Measurements," Phys. Rev. Lett. Volume 87, Number 16, page 167903-1 (2001), herein incorporated by reference. Note that Ronald E. Meyers, et al., "A Quantum Network with Atoms and Photons (QNET-AP)," US Army Research Laboratory, Adelphi, Md. 20783, Proc. SPIE 8518, Quantum Communications and Quantum Imaging X, 85180G (Oct. 17, 2012); (herein incorporated by reference) proposes a configuration similar to FIG. 9B but using photonic qubit wavelength conversion between atomic emissions and photons at telecommunication wavelengths in fiber in order to optimize photon qubit transmission distance before absorption in optical fiber.

An example of a Bell state measurement device is shown to the right in FIG. 10, wherein the Bell state measurement device 251 comprises a beam splitter and includes four number resolving detectors. A photon number resolving detector is able to tell whether it measured one photon or two within its measurement. Birefringent elements on each outlet side of the beam splitter delay polarization components with respect to the other of the same photon wavefunction. As shown to the right in FIG. 10, after the birefringent elements, two polarizing beam splitters are aligned to 45 degrees that measure the four Bell states. Note that there are two birefringent elements are at each arm and two detectors at each arm going through 45 degree coincidence (for example, as to the Bell state, double clicking for $\phi^+$). Note that the qubit and the second entangled photon are interfering in Bell state device and that the Bell state measurement is a joint measurement corresponding to the interaction of the photons interaction. Each photon has a polarization and phase; their wavefunctions are going to exit the beam splitter in certain superpositions. The result is the measurement of the components of the wavefunctions that interacted at 251. Q1 will interact with P2 and because of the interaction and entanglement between P2 and P1, some information on Q1 is transferred to P1.

Referring again to FIG. 10, the arrow double lines represent the travel paths of the photon wavefunctions prior to measurement at a detector. The dash-dot-dot-dash line indicates a "classical" communication channel 254 that extends between the sender and the receiver where two bits of information representing the outcome of the Bell State measurement conducted in element 251 are transmitted to the receiver. In Bell state measurement element 251, a joint measurement is performed between 1 part of an entangled pair (represented as P2 in FIG. 10) and the photon to be communicated (represented as Q1). The two bits in channel 254 tell the receiver (and in particular element 260) how to measure the remaining entangled photon. The element 260 in FIG. 10 represents a device that performs a unitary transformation specified by the two bits of classically transmitted information from the sender (resulting from the outcome of detectors 252, 253) on the remaining portion of the initial entangled photon pair. In element 260, a unitary transformation operation is performed to complete communication. These unitary transformations are often represented by a Pauli matrix. The solid arrowed line indicates the travel path of the transferred qubit, represented by the double-lined crossed circle, towards a detector, as explained above in conjunction with FIGS. 2 through 7. In FIG. 10, the representation Q1' refers to the transferred photon information state and can be many bits per photon transferred. Elements 82, 84 and 86 operationally connected to Computer 211 serve to complete the measurement of the transferred information. The results of the measurement would be transmitted to Processor 207 (not shown) to be used to prepare the next qubit (Q1) of information to teleported to 211.

FIG. 11 is a schematic depiction of an alternate concept for the preferred embodiment systems of FIGS. 2 through 7 wherein a qubit of converted data prepared by the sender is transferred to the receiver as a photon state. Filled eight sided stars indicate the photon P1, P2 generated by the entangled quantum memories, the dotted line between the quantum memories representing the two quantum memories A1, A2 are entangled. Bold dashed arrowed lines indicate the travel paths of individual photons P1, P2 generated by the quantum memories A1, A2 that are indicated by gray filled hexagons.

The crossed circle Q1 represents the qubit Q1 of quantum information or data to be communicated. The qubit Q1 may, for example, be data collected from and representative of the nearby environment is transferred to the receiver as a photon state. The bold arrow dash dot dash line denotes the direction and travel path for the qubit Q1. The square with a diagonal line represents the presence of a device or element 251 that performs a Bell state measurement. The joint Bell state measurement between photon P2, one part of an entangled quantum pair, i.e. of atom/ion systems, and the photon to be teleported represented by Q1. The arrowed double lines originating at the Bell State measurement device 251 represent the travel paths of the photon wavefunctions prior to measurement at detectors 252, 253. The channel 254 represented by a dash-dot-dot-dash line indicates a "classical" communications channel between the sender and the receiver where two bits of information representing the outcome of the Bell State measurement conducted in element 251 and measured at detectors 253, 254 are transmitted to the receiver. The element 260 indicates a device that performs a unitary transformation specified by the two bits of classically transmitted information from the sender on the remaining portion of the initial entangled photon pair. The unitary transformation operation conducted by element 260 operates to complete teleportation of information and may be represented by a Pauli matrix. The solid-arrowed line indicates the travel path of the transferred qubit Q1', represented by the double-lined crossed circle, towards a detector 256. The qubit Q1' represents the transferred photon quantum information state, which can be many bits per photon. Elements 82, 84 and 86 operationally connected to Computer 211 serve to complete the measurement of the transferred information. The results of the measurement would be transmitted to Processor 207 (not shown) to be used to prepare the next Q1 qubit of information to teleported to 211.

FIG. 12 is a schematic depiction of a preferred embodiment system used for exfiltration from a sensor of remotely generated information. Filled eight sided stars indicate each part of an entangled photon pair P1, P2. Bold dashed arrowed lines indicate the travel paths of individual portion of the entangled photon pair P1, P2 generated by the entangled photon source 250. The dotted swiggly line between the photons P1, P2 is meant to indicate that the two photons are entangled. The bold arrowed dash dot dash line denotes the direction and travel path for the qubit of converted data. The Bell state measurement element 251 (represented by the square with a diagonal line) indicates the presence of a device that performs a Bell State measurement. A joint measurement takes place between a time offset part of an entangled photon pair P1, P2 and modulated (earlier in time) photon. The delay occurs due to the path length difference that P1 travels from 250 to 271 and then to 251 optical delay 257 ensures overlap between the entangled photon $P1_M$ from the distant qubit modulator 271 and the entangled photon generated by the source 250 at a later time. The arrowed double lines represent the travel paths of the photon wavefunctions prior to measurement at detectors 252, 253. The distant qubit modulator 271 may be, for example, be operatively connected to a distant sensor 272 that measures information from the local area, the qubit modulator 271 modulates the quantum state of an entangled photon from the entangled photon source to represent the information acquired from the vicinity of the sensor 272. The optical delay 257 is a device to ensure overlap of the modulated entangled photon wavefunction returning from the remote sensor 271 with the wavefunction of a portion of an entangled photon pair generated by the entangled photon source 250 at a subsequent time. The outcome of the Bell measurement performed by 251 contains information from the remote sensor 271. As an example, assume that the distant sensor at 272 is a device that counts the number of hostile troops traversing a particular area, such a crossing a bridge. In this instance say 12 hostile troops have been measured by 272 to have crossed that bridge over some time interval. The information from sensor 272 needs to be exfiltratated. The exfiltration process happens when a quantum sender and receiver consisting of an entangled photon source 250, Bell state measurement system 251, detectors 252, 253, optical delay element 257, coincidence electronics 42, and computer 258. At time T the quantum sender and receiver would transmit one half of an entangled photon state P1 towards the qubit modulator 271 and the other half of the entangled state P2 is directed towards the Bell state measurement system 251. The photons P1 and P2 are entangled in a known Bell state. At time T+1 dt the photon P2 has interacted with the Bell state measurement system and been destroyed. Photon P1 would then interact with and be modulated by the qubit modulator 271 at time T+2 dt. At time T+3 dt the quantum sender transmits another pair of entangled photons with P1 directed towards 271 and P2 directed towards 251. At time T+4 dt, the P1 photon created at time T which has been modulated by 271 undergoes a joint Bell state measurement with photon P2 that was created at time T+3 dt. Due to the modulation applied by 271 the Bell state that would be measured corresponds to branch 3 of "Bell State 1" on FIG. 17. The next Bell state measurement occurs at time T+8 dt and would correspond to branch 0 of "Bell State 2" on FIG. 17. This would complete the transmission of a "12" to the quantum sender and receiver and be a successful exfiltration of that information from the modulator 271 and sensor 272 as only a few photons are needed and if any of those photons were intercepted there is no information unique to the photons P1, all the information is instead encoded into the Bell states of the P1 and P2 when measured by 251. This is enabled by the transmission of a known bell state to the modulator 271 and based on the known transmitted Bell state is able to modulate that known state towards a particular outcome when measured.

Cloud Computing

An alternate embodiment comprises a system for quantum cloud computing in support of tactical intelligence operations and other operations. Utilizing more than one computer processor and computing resources to solve a problem nearly simultaneously is referred to as parallel processing. Even though the processors are relatively far apart, they can be connected by communications systems, networks and links to enable problem solving; also know as distributed computing. The collection of the distributed computing resources is often called "cloud computing." Resources may include, but are not limited to quantum and classical computer nodes, quantum and classical memory, quantum and classical computer codes, quantum and classical storage, quantum and classical communications, and the like.

D-Wave and PiCloud have announced a joint venture to develop cloud computing software for remote access to one or more D-Wave quantum computers at a center or centers. The D-Wave/PiCloud quantum computing cloud is for a central computing resource available remotely. The communications between the quantum computers and the remote devices in this instance are classical.

One problem is that it is not designed or built to be used in support of tactical operations, intelligence or otherwise. Tactical communications resources are different from commercial enterprises which depend heavily on stationary infrastructure support. A tactical environment has a connectivity which needs to be ad-hoc and continually changing to account for mobility. Bandwidth is often restricted because of the smaller throughput of fielded system vs. commercial infrastructure supported systems.

A new method for quantum cloud computing improves security and compression between the nodes by applying the methods and techniques of quantum security and compression of data in transmission described in U.S. patent application Ser. No. 12/705,566 entitled "Quantum Based Information Transmission System and Method," filed Feb. 12, 2010, by Ronald E. Meyers and Keith S. Deacon to provide the communications links between quantum computing or classical computing nodes operating in a tactical environment. As described in the '566 Application, the information sent to each location at each step in the process depends of the information previously measured by one or more receivers in the preceding step or steps.

Frequency Conversion

Over short transmission distances photons of different frequencies may propagate satisfactorily for quantum communications between the sender and the receiver. However, over longer distances photons at some frequencies may be susceptible to appreciable absorption by the transmission media such as optical fiber, the atmosphere, or water. If the photon is absorbed then the quantum information associated with that photon would be lost. One way to extend the distance over which quantum information may be transmitted through a media is to convert the frequency of the photon carrying the quantum information to a frequency which is less readily absorbed (see Shahriar, et al, "Connecting processing-capable quantum memories over telecommunication links via quantum frequency conversion," J. Phys. B: At. Mol. Opt. Phys. 45 (2012) 124018). A difficulty in doing this is that conventional frequency conversion methods tend to destroy the quantum information. In the following we describe an invention to convert photon frequency while preserving the quantum information associated with that photon. A preferred embodiment is directed to mitigation of transmission loss; specifically towards mitigating the transmission loss of photon based qubits when propagating through absorbing and transmitting media and improving the efficiency for the detection of a photon based qubit. As an example, for a photon based qubit propagating through a typical optical fiber there are minima of attenuation at approximately for frequencies corresponding to 1310 nm and 1550 nm wavelengths. Other media such as the atmosphere or underwater would have different transmission properties that make it advisable to convert the frequency of the photon based qubit to minimize absorption and scattering losses along the path from the sender to the receiver.

A further advantage to be attained with frequency conversion is for detection efficiency. Many silicon based photon detectors have peak detection efficiencies at frequencies corresponding to approximately 780 nm wavelengths. However, for example cold atom ensembles or ion quantum systems, have peak emissions at frequencies corresponding to wavelengths for instance at 240 nm for one type of quantum system to 1400 nm for another type of quantum system.

In practice, one means by which frequency conversion of a photon based qubit would be to 1) convert the frequency of the photon based qubit to a frequency optimized for transmission through the media between the sender and the receiver; 2) the receiver would then convert the frequency of the transmitted qubit to a frequency optimized for their detection system.

Generally speaking, transmission of quantum information, or qubits, over long distances or in challenging environments is problematic. To mitigate absorption or scattering losses inherent in long distance transmission of quantum information the choice of an appropriate photon frequency or wavelength for transmission is desirable. Typically frequency/wavelength conversion for lasers is accomplished using the non-linear processes of Sum Frequency Generation (SFG) or Difference Frequency Generation (DFG). To bridge the difference in wavelength between photons suited for fiber-based communication and the photons emitted and absorbed by the atomic memories, two strategies have been demonstrated. One strategy is sum-frequency generation (SFG) and difference-frequency generation (DFG) which are second-order nonlinear processes that must satisfy energy conservation and phase matching conditions. For SFG the processes involves three frequencies interacting in a non-linear crystal subject to the condition $v_1+v_2=v_3$ where $v_1$ is the frequency of the photon that one wants to change to a more desirable frequency ($v_3$) and a pump source at frequency $v_2$. Similarly in difference-frequency generation the conservation condition is $v_1-v_2=v_3$. The nonlinear crystals used typically have phase matching conditions where the momentum and polarization of the light interacting with the crystal must be considered. Typically, in order to preserve quantum state information, often encoded in the polarization of a single photon, the wavefunction of that single photon needs to be split into orthogonal polarization components and each component would then be frequency individually before the wavefunctions is recombined for transmission or interaction with some device.

Difference-frequency generation and Sum Frequency Generation typically occur in materials with large $\chi^2$ such as periodically-poled lithium niobate (PPLN) and conversion efficiencies can approach 100%. Another proven method to bridge the wavelength gap is the third-order nonlinear process of four-wave mixing (FWM). Under the correct conditions a near-IR photon can be converted to a telecom wavelength photon via four-wave mixing using two pump lasers and an atomic ensemble. Cold Rb atoms in a magneto-optical trap (MOT) combined with the correct pump lasers can achieve high efficiency four-wave mixing with very little noise added to the signal. See in this regard, A Quantum Network with Atoms and Photons (QNET-AP), b$_y$, Ronald E. Meyers, et al., US Army Research Laboratory, Adelphi, Md. 20783, Proc. SPIE 8518, Quantum Communications and Quantum Imaging X, 85180G (Oct. 17, 2012); doi:10.1117/12.97414, herein incorporated by reference.

It is to be appreciated that frequency conversion may also be done to transform the frequency of light from some quantum system that may be difficult to manipulate or detect into another frequency where those operations, such as photon detection are more efficiently accomplished {see L. Ma, et al., "Single photon frequency up-conversion and its applications," Proc. SPIE 8163 81630N (2011)}. The non-linear media used may be bulk crystals such as BBO or LBO, newer periodically poled media such as periodically poled lithium niobate (PPLN), or even nonlinear interactions in doped optical fibers. Each type of nonlinear media must be engineered to meet the requirements of the particular application, i.e. what frequencies to be converted between, what polarizations and what momentum are to be phase matched. A further concern with many non-linear crystals is their inherent property of birefringence. This birefringence property leads to a delay in the time it takes one planarization to travel across these crystals relative to a different polarization. With respect to quantum frequency conversion, any such delay must be accounted for and corrected or quantum information would be lost in the frequency conversion process. A further motivation to perform quantum frequency conversion would be to mitigate temporal dispersion effects which would typically lead to timing and synchronization problems between a sender and a receiver.

FIG. 13 is a schematic depiction of an alternate preferred embodiment system 300 utilizing a Mach-Zehnder configuration, wherein a single qubit of quantum information encoded into a photon is frequency/wavelength converted prior to transmission, detection, or manipulation to a more favorable frequency/wavelength. Beginning with a laser pump source 301, the laser beam is pumped into a polarization controller 302 that sets the pump polarization at 45 degrees. Next a wave division multiplexer or dichroic mirror 303 transmits the generation of a single photon from single photon generator 304. Arrowed dotted lines indicate the travel path for the photon carrying the encoded quantum information. Arrowed solid lines indicate the path for the high flux laser pump photons. Elements 306, 308 labeled PC-SET or PC (90R) indicate polarization altering devices such as polarizers and wave plates. The wave division multiplexers (WDM) 303 and 312 represent optical devices to combine or separate the wavelengths/frequencies of the pump photons with the quantum information photons onto a common or different optical path. For example, the wave division multiplexer or dichroic mirror 303 transmits $\lambda_1$ and reflects $\lambda_P$ or all other $\lambda$.

The arrowed double lines indicate the travel paths for the combined pump photons and qubit photons. Polarizing beam splitter 305 transmits and reflects the orthogonal polarization components of the wavefunction of the qubit photon and pump photons. Polarizing Beamsplitter (PBS) 305 and 309 always transmit one of the orthogonal components and reflects the other. Polarization controller 306 operates to rotate pump polarization and single photon wavefunction polarization by 90 degrees. The nonlinear media boxes 307 and 310 are the locations where the quantum frequency conversion takes place employing either sum-frequency-generation or difference-frequency-generation. An optical delay line 311 operates to ensure wavefunction overlap at the polarizing beamsplitter 309 (PBS 2). The box 313 labeled beam-stop is a device to capture excess pump photons and noise photons produced in the SFG or DFG device. The arrowed dashed line indicates the travel path of the frequency/wavelength converted qubit. This converted qubit Q1 may then be coupled into transmission optics or into optical devices for manipulation or detection. The net result of the system 300 operation is to in essence create a "quantum information waveguide" for the single photon produced at generator 304, the orthogonal components of which are split by beam splitter 305, frequency "converted" by nonlinear media 307, 310, recombined at beamsplitter 309, and filtered at elements 312, 313.

Figure 14:
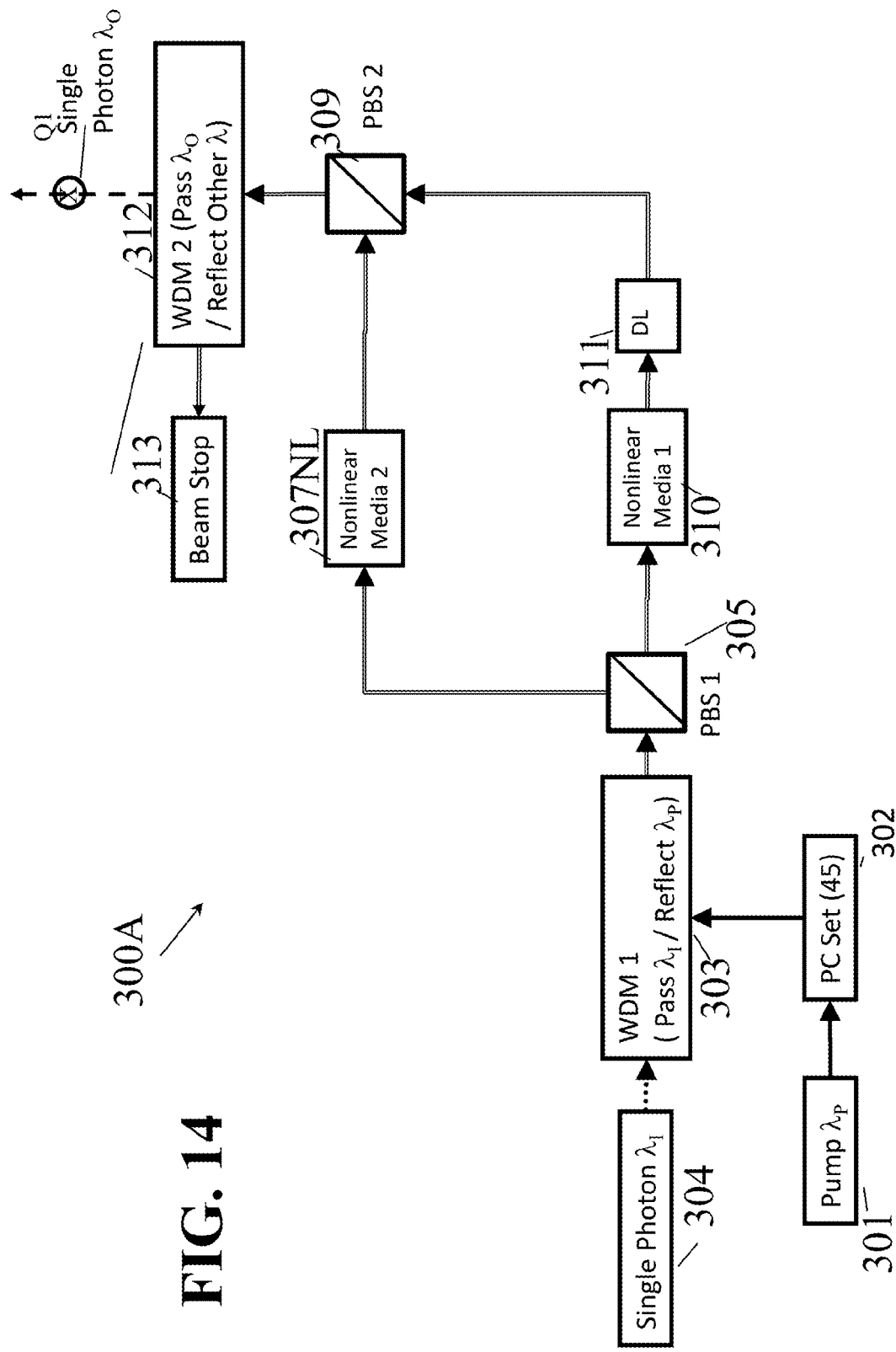
FIG. 14 is a schematic depiction of an alternate preferred embodiment of FIG. 14 with the inclusion of an optical delay line to fine tune the overlap of the wavefunction components on PBS 2.

FIG. 14 is a schematic depiction of an alternate preferred embodiment similar to that of FIG. 13 with the exception of the omission of the polarization controller 306 and the inclusion of the nonlinear crystal 2 that is cut 90 degrees from the nonlinear crystal 1. Note that the delay line 311 is included to fine tune the overlap of the wavefunction components on PBS 2. The nonlinear media in FIG. 14 is oriented to function with the polarization of the photons along each path.

Referring to the details of FIG. 14, a schematic depiction of an alternate preferred embodiment system 300A utilizing a Mach-Zehnder configuration, wherein a single qubit of quantum information encoded into a photon is frequency/wavelength converted prior to transmission, detection, or manipulation to a more favorable frequency/wavelength. Beginning with a laser pump source 301 with wavelength $\lambda_P$, the laser beam is pumped into a polarization controller 302 that sets the pump polarization at 45 degrees. Next a wave division multiplexer or dichroic mirror 303 transmits the generation of a single photon from single photon generator 304. Wave division multiplexer or dichroic mirror Wave division multiplexer or dichroic mirror that transmits $\lambda_1$, and reflects Wave division multiplexer or dichroic mirror that transmits $\lambda_1$ and reflects $\lambda_P$, or all other $\lambda$. Arrowed dotted lines indicate the travel path for the photon carrying the encoded quantum information. Arrowed solid lines indicate the path for the high flux laser pump photons. The wave division multiplexers (WDM) 303 and 312 represent optical devices to combine or separate the wavelengths/frequencies of the pump photons with the quantum information photons onto a common or different optical path. For example, the wave division multiplexer or dichroic mirror 303 transmits $\lambda_1$ and reflects $\lambda_P$ or all other $\lambda$.

The arrowed double lines indicate the travel paths for the combined pump photons and qubit photons. Next, polarizing beam splitter 305 transmits and reflects the orthogonal polarization components of the wavefunction of the qubit photon and pump photons. Polarizing Beamsplitter (PBS) 305 and 309 always transmit one of the orthogonal components and reflects the other. Polarization controller 306 operates to rotate pump polarization and single photon wavefunction polarization by 90 degrees. The nonlinear media boxes 307NL and 310 are the locations where the quantum frequency conversion takes place employing either sum-frequency-generation or difference-frequency-generation. Specifically, at 307 NL, the nonlinear media is oriented 90 degrees from nonlinear nonlinear media 310NC. An optical delay line 311 operates to ensure wavefunction overlap at the polarizing beamsplitter 309 (PBS 2). The beam stop 313 is a device to capture excess pump photons and noise photons produced in the SFG or DFG device. Wave division multiplexer or dichroic mirror 312 transmits $\lambda_Q$ and reflects all other $\lambda$. The arrowed dashed line indicates the travel path of the frequency/wavelength converted qubit Q1. This converted qubit Q1 may then be coupled into transmission optics or into optical devices for manipulation or detection. The net result of the system 300A operation is to in essence create a "quantum information waveguide" for the single photon produced at 304, the orthogonal components of which are split by beam splitter 305, frequency "converted" by nonlinear media 307, 310, recombined at beamsplitter 309, and filtered at elements 312, 313.

Figure 15:
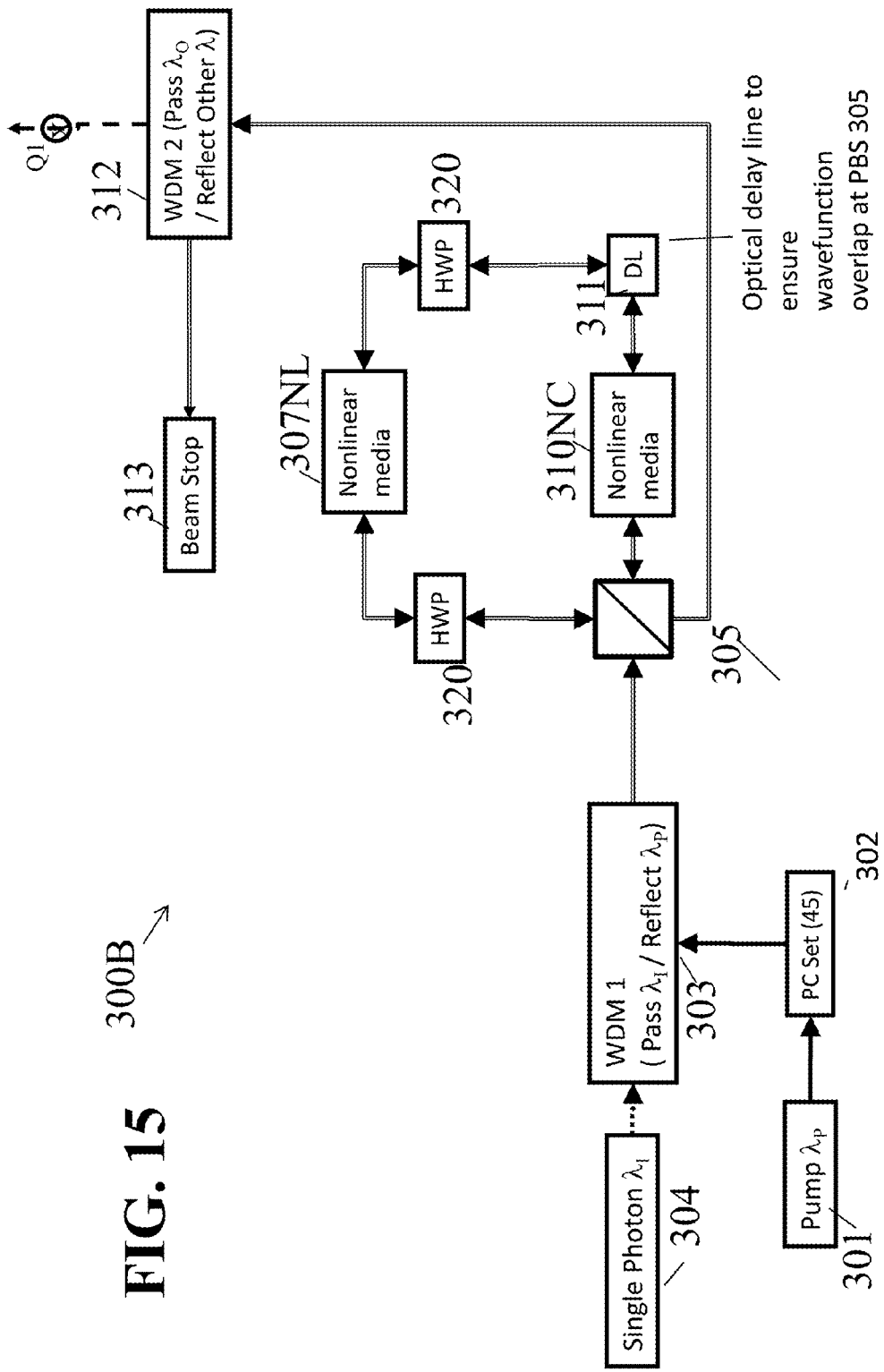
FIG. 15 is a schematic depiction of an alternate preferred embodiment system 300B utilizing a Sagnac configuration, wherein a single qubit of quantum information encoded into a photon is frequency/wavelength converted prior to transmission, detection, or manipulation to a more favorable frequency/wavelength. An advantage of the Sagnac configuration is that the wavefunctions of all the photons travel through the same optical devices in both polarizations which help to mitigate polarization dependent birefringence effects between the orthogonal polarization components.

Referring to the details of FIG. 15, a schematic depiction of an alternate preferred embodiment system 300B utilizing a Sagnac configuration, wherein a single qubit of quantum information encoded into a photon is frequency/wavelength converted prior to transmission, detection, or manipulation to a more favorable frequency/wavelength. An advantage of the Sagnac configuration is that the wavefunctions of all the photons travel through the same optical devices in both polarizations which help to mitigate polarization dependent birefringence effects between the orthogonal polarization components. Beginning with a laser pump source 301 with wavelength $\lambda_1$, the laser beam is pumped into a polarization controller 302 that sets the pump polarization at 45 degrees. Next a wave division multiplexer or dichroic mirror 303 transmits the generation of a single photon from single photon generator 304. The wave division multiplexer or dichroic mirror Wave division multiplexer or dichroic mirror that transmits $\lambda_1$, and reflects $\lambda_P$, or all other $\lambda$. Arrowed dotted lines indicate the travel path for the photon carrying the encoded quantum information. Arrowed solid lines indicate the path for the high flux laser pump photons. The wave division multiplexers (WDM) 303 and 312 represent optical devices to combine or separate the wavelengths/frequencies of the pump photons with the quantum information photons onto a common or different optical path. For example, the wave division multiplexer or dichroic mirror 303 transmits $\lambda_1$ and reflects $\lambda_P$ or all other $\lambda$.

The arrowed double lines indicate the travel paths for the combined pump photons and qubit photons. Next, polarizing beam splitter 305 transmits and reflects the orthogonal polarization components of the wavefunction of the qubit photon and pump photons. Polarizing Beamsplitter (PBS) 305 always transmits one of the orthogonal components and reflects the other. The nonlinear media boxes 307NL and 310NC are the locations where the quantum frequency conversion takes place employing either sum-frequency-generation or difference-frequency-generation. Specifically, at 307 NL, the nonlinear media is oriented parallel to the nonlinear media 310 NC. An optical delay line 311 operates to ensure recombining wavefunction overlap at the polarizing beamsplitter 305. Halfwave plates (HWP) 320A and 320B operate to rotate polarization by pump polarization and single photon wavefunction polarization by 90 degrees to ensure proper phase matching for interaction and non-interaction with the nonlinear media 307NL and 310NC for both clock wise and counter clock wise propagating photons. The beam stop 313 is a device to capture excess pump photons and noise photons produced in the SFG or DFG device. Wave division multiplexer or dichroic mirror 312 transmits $\lambda_O$ and reflects all other $\lambda$. The arrowed dashed line indicates the travel path of the frequency/wavelength converted qubit Q1. This converted qubit Q1 may then be coupled into transmission optics or into optical devices for manipulation or detection. The net result of the system 300B operation is to in essence create a "quantum information waveguide" for the single photon produced at 304, the orthogonal components of which are split by beam splitter 305, frequency "converted" by nonlinear media 307, 310, recombined at beamsplitter 305, and filtered at elements 312, 313.

Figure 16:
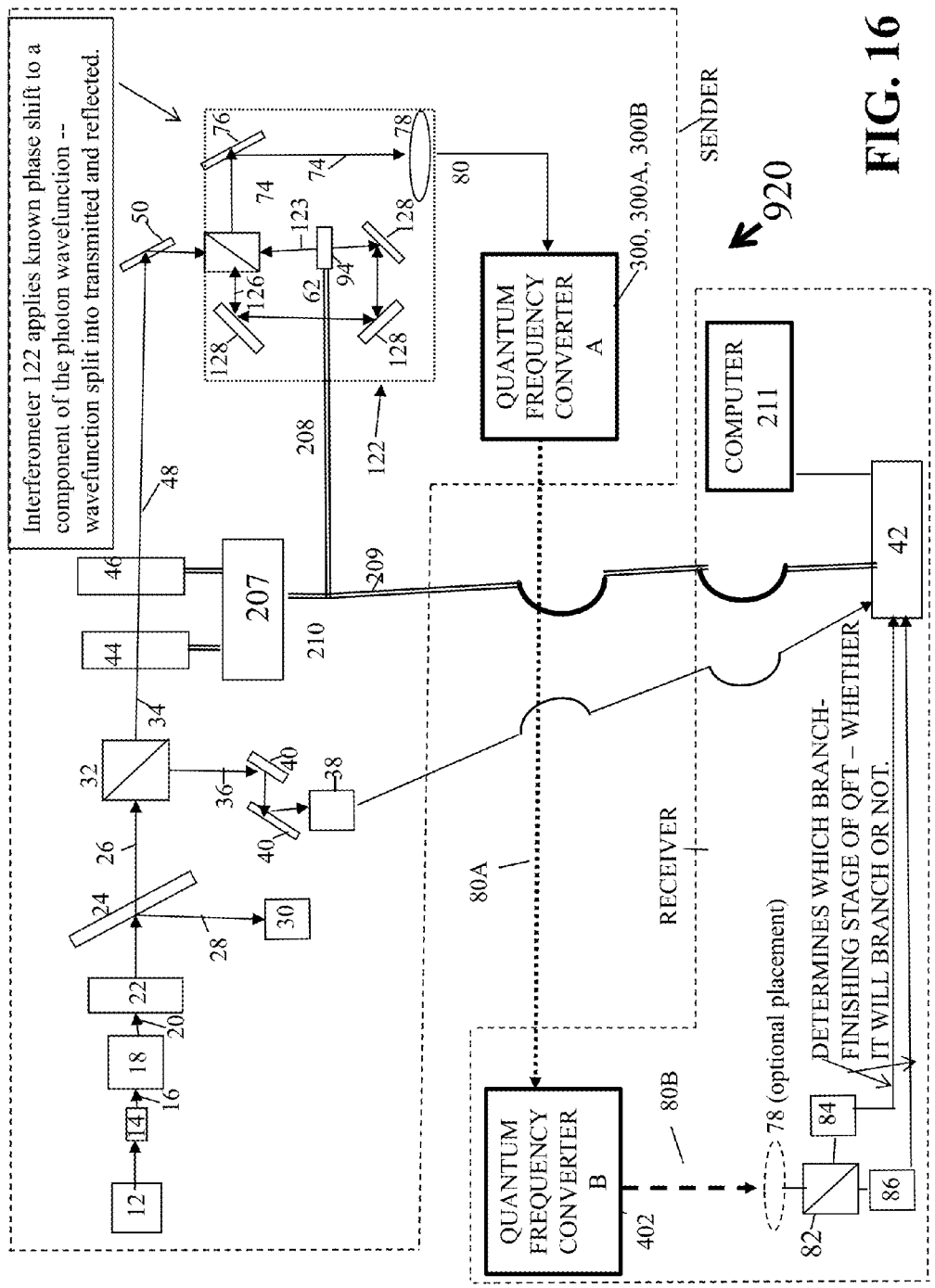
FIG. 16 is a schematic of an optical bench configured as a quantum computer system according to the present invention using a Type-II nonlinear optics crystal and a polarization Sagnac interferometer to perform a QFT operatively connected to two Quantum Frequency Conversion (QFC) devices to help mitigate photonic qubit losses due to propagation through media between the sender and receiver.

FIG. 16 is an alternate preferred embodiment of the inventive system depicted generally at 120, the system 120 has numerous features in common with that system depicted in FIG. 2 and such attributes share like numerals with those detailed with respect to FIG. 2. Specifically, as shown in FIG. 16, a data encoder 12 converts the data set to a set of qubit amplitudes that satisfies the expression of Equation 15 (i.e., the amplitude of the "data" is stored as the amplitudes of a superposed quantum state and triggers a light source 14 accordingly. The light source 14 may be a laser, such as Nd:YAG, ion lasers, diode lasers, excimer lasers, dye lasers, and frequency modified lasers. Photons in path 16 emitted from the light source 14 are optionally passed through a spatial filter 18. Filter 18 converts the photons in path 16 in an image space domain to a spatial frequency domain and serves the purpose of removing, for example, stripe noise of low frequency and/or high frequency noise as described above in connection with FIG. 2. The photons in path 20 having passed through spatial filter 18 are then passed through a Type-II nonlinear optics crystal 22. An optional dichroic mirror or bandpass filter 24 that is operative to transmit specified wavelengths and reflect all others is used to selectively reflect out of the beam path 26 those photons 28 that have reflected wavelengths as a result of passing through the crystal 22 into a stop 30. Whatever photon goes through will be wavelength shifted such that the sum of energies is equal to the "parent" photon. After passage through half-mirror 24, the remaining entangled photons in path 26 are split by interaction with a polarization beam splitter 32 into two paths; a known photon state path 34 and a comparator wave function state path 36. The comparator wave function state path 36 is directed onto a single photon counting module 38 by an optional mirror set 40. It is appreciated that a reorganization of beam paths in the system 10 obviates the need for mirror set 40. The detection of the photons from the comparator wave function state path 36 by the single photon counting module 38 is fed to coincidence electronics 42 and is used to reconstruct the data set at the receiver end. The entangled photons in the known photon state path 34 are then passed through a polarization modulator 44 and a phase modulator 46. Exemplary polarization phase modulators illustratively include liquid crystals, Kerr cells, and Pockel cells. Preferably, a series of two liquid crystal devices and a quarter wave plate may be used to achieve arbitrary polarization. Upon the entangled photons known photon state path 34 interacting with the polarization and phase modulators 44 and 46, respectively, the entangled photons Q1, Q2 are transformed into an arbitrarily oriented elliptical polarization state for passage via path 48 based on the data set signal being transformed and any previously measured photon state, if any is known. The entangled photons Q1, Q2 in the arbitrarily oriented elliptical polarization state passing via path 48 are optionally reflected from a mirror 50 and then enter a polarization interferometer depicted generally at 122.

The system 920 of FIG. 16 includes an interferometer shown generally at 122 that has the geometry of a polarization Sagnac interferometer. The arbitrarily oriented elliptical polarization state in path 48 is split at polarization beam splitter 62 to phase shift a polarization component 123 through interaction with a phase modulator 94. A second component 126 is recombined with the phase shifted component 123 through coincidental reflection with three mirrors labeled 128. The recombined state 74 is reflected by mirror 76 onto a half wave plate 78 to implement a quantum Hadamard gate transformation.

The qubit Q1 travels along path 80 to 401, Quantum Frequency Converter A, which is implemented to convert the frequency of the qubit Q1 to a frequency suitable for propagation to the receiver along path 80A. That is, the frequency is changed as shown in FIGS. 13-15. The frequency is converted via one of devices 300, 300A, or 300B which are as described in FIGS. 13-15. When the qubit Q1 interacts with, for example 300B, the photon Q1 with frequency $\lambda_1$ will combine with a laser with an appropriate frequency for the desired wavelength conversion, $\lambda_P$, inside of wave-division multiplexer 303. The laser pump 301 provides a high intensity source of photons at frequency $\lambda_P$. This high intensity laser illumination then interact with the optical element 302 which sets the polarization of the high intensity photons to 45 degrees. The combined Q1 and high intensity photons then interact with polarizing beam splitter 305. 305 is operative to split the polarization wavefunction components of Q1 into clock-wise CW and counter clock-wise (CCW) propagating paths, each path with a unique polarization; the high intensity pump beam is also split into the clock-wise and counter clock-wise paths, each path having equal intensity of pump beam light. For the Q1 components and pump beam traveling the clock-wise propagation path first interact with a half wave plate 320A which operates to rotate the polarization of the photons to the correct phase matching condition for non-linear media 307NL. The non-linear media 307NL operates to convert the frequency of the wavefunction components of Q1 traveling the clock-wise propagation path. After exiting 307NL the clock-wise propagating wavefunction components of Q1 and pump beam interact with half waveplate 320B which operates to rotate the polarization of the clock-wise propagating wavefunction components of Q1 and the clock-wise propagating pump beam to a phase matching condition for non-interaction with nonlinear media 310NC. Note that frequency conversion requires that the correct phase matching conditions be met for the nonlinear media. The clock-wise path propagating components may optionally interact with delay line 311 to ensure wavefunction overlap on polarizing beam splitter 305 to recombine the clock-wise and counter clock-wise propagating components. The Q1 components and pump beam traveling the counter clockwise path first interact with the optional delay line 311 to ensure wavefunction overlap on polarizing beam splitter 305 to recombine the clock-wise path and counter clock-wise path propagating components. For the Q1 components and pump beam traveling the counter clock-wise path, then interact with nonlinear media 310NC. The nonlinear media 310NC operates to convert the frequency of the wavefunction components of Q1 traveling the counter clock-wise propagation path. The frequency converted components of Q1 and pump beam then interact with halfwave plate 320B which operates to rotate the polarization of light on the counter clock-wise path to a non-interacting phase matching condition with nonlinear media 307NL. After passing through 307NL the counter clockwise path wavefunction components and pump beam then interact with half wave plate 320A to rotate the counter clockwise path propagating polarizations to enable wavefunction recombination on beam splitter 305. The recombined frequency converted Q1 and pump beam then interact with wave division multiplier 312 which operates to transmit the frequency of the converted Q1 ($\lambda_O$) and reflect all other frequencies to beam stop 313. After propagating to the receiver the qubit Q1 interacts with 402, Quantum Frequency Converter B which operates to convert the frequency of the qubit Q1 from the propagation frequency, such as 1550 nm in optical fiber, to a frequency more suitable for operation such as measurement by detectors 84 and 86, e.g. 700 nm for some silicon avalanche photodiode detectors. It is to be appreciated that the interactions of the frequency converted Q1 from path 80 with the components of 402 are substantially equivalent to those recited above with optionally a different pump laser frequency and phase matching criteria for the non-linear media 307NL and 310NC. Continuing, in the left side of FIG. 16 single photon counting modules 84 and 86 count individual photons with a given polarization and report a counting event to coincidence electronics 42. Only when coincidence is noted between a photon counting event at module 38 and 84, or between module 38 and module 86 is the count considered a valid probability density function measurement. The result of the coincidence measurements by 38 and 84 or 38 and 86 are transmitted over classical channels to processor 207 for the preparation and transmission of the next qubit.

FIG. 17 is a prior art quantum quad tree depicted as a branching between 0, 1, 2 and 3 outcomes via branches 9-1, 901, 903, 904 for successive steps in FIG. 17. Using the Bell state measurement representation shown in FIG. 17, the first step is to determine whether a zero, one, two or three exists at the first branch (901, 902, 903, 904) located at the top of the triangle depicted in FIG. 17 (BELL STATE 1). If a zero value is measured then 901 is followed, if a one is measured, then 902, if a two is measured then 903, and if a three is measured then 904 is followed.

The outcomes of the successive steps sum to the values 0 through $4^n-1$, where n is the number of Bell state qubits. The means of obtaining the 0, 1, 2, or 3 depends on the specific experimental and corresponding simulation implementation. There are several conventional rules that are possible for determining the 0, 1, 2 or 3 value. For example, a 0 state may correspond to a Bell state measurement of $\Psi^+$, the 1 may correspond to a measurement of $\Psi^-$, the 2 to a measurement of $\Phi^+$, and the 3 to a measurement of $\Phi^-$, or other alternative assignments may be true. In general, the series of Bell state measurements are prepared such that each value of the state preparation is conditioned to determine the 0, 1, 2 or 3 at each branch.

In the simulation depicted in FIG. 17 (Quantum Quad Tree), n Bell state measurements are made. The n value is determinative of the first branch. The $4^n$ lower branches (905-908), where n is the number of Bell states, are divided into four parts (905-908). The side with the greatest sum of the indices measured determines the path of the first branch. The second level branch has one fourth the number of indices of the first branch. Consecutive indices assigned are from the selected half from the first branch. The same process is used for the second branch level as from the first branch, but with half of the indices. This process repeats until all the branching is determined and the selected single index is determined. The quantum quad tree depicted in prior art FIG. 17 for two Bell state measurements provides an index space of sixteen. The quantum quad tree is expandable to n Bell states which is equivalent to an index space of $4^n$.

The terminology "computer" as used herein means processor, microprocessor, CPU, multiprocessor, personal computer or any device which has the capability of performing the functions of a computer.

As used herein, the terminology Bell state "two bit measurement" refers to the two bits of data associated with the Bell state measurement which are to be used to know how to measure the Bell states.

The terminology "processor" as used herein means as used herein means computer, microprocessor, CPU, multiprocessor, personal computer or any device which has the capability of performing the functions of a computer.

As used herein the terminology "unitary transformation device" relates to a device that performs a unitary transformation operation on the entangled state. As an example, the identity function is trivially a unitary operator and rotations in R2 are a nontrivial example of unitary operators. Rotations do not change the length of a vector or the angle between 2 vectors.

The foregoing description is illustrative of particular embodiments of the invention, but is not meant to be a limitation upon the practice thereof. The following claims, including all equivalents thereof, are intended to define the scope of the invention.

The invention claimed is:

1. A system for transferring data in the form of sequential qubits from a sender to a receiver comprising:
   an entangled photon source for producing first and second entangled photons, the first entangled photon becoming associated with a receiver, the second entangled photon being associated with a sender;
   a Bell state measurement device for performing a joint Bell state measurement on the second entangled photon and a first sequential qubit with encoded data; the Bell state measurement device outputting two bits of data to be used at the receiver;
   a transmission channel for transmitting two bits of information from the outcome of the Bell state measurement device to the receiver;
   at the receiver, a unitary transformation device operatively connected to the transmission channel for performing a unitary transformation operation on the first entangled photon based upon the value of the two bits of data;
   at least one detector operatively connected to the unitary transformation device for detecting encoded information from the first entangled photon;

at least one processor operatively connected to the at least one detector, the at least one processor operating to determine whether or not to transmit portions of data from the next sequential qubit based upon the value of the previous sequential qubit measured at the receiver location, and wherein based upon the value of the at least one qubit measured at the receiver location, data compression occurs such that fewer qubits are used to transmit a message to the receiver without changing the content of the data transferred.

2. The system of claim 1 wherein the unitary transformation device comprises a half wave plate and two quarter waveplates, and wherein based upon the values of the two bits of data, the unitary transform device performs one of (a) no operation on the first entangled photon, (b) a half-wave plate operation, (c) a combination of the half wave plate and quarter wave plate operations or (d) two quarter wave plate operations.

3. The system of claim 1 wherein the entangled photon source comprises paired atomic systems, the first atomic system of the paired atomic systems emitting a first photon and the second atomic system of the paired atomic systems emitting a second photon, the first photon being emitted later that the emission of the second photon and after the joint Bell state measurement on the second photon and the at least one qubit with encoded data.

4. The system of claim 1 further comprising a beam splitter operatively associated with the unitary transformation device and wherein the at least one detector comprises two detectors and wherein the beam splitter operates to reflect the first entangled photon into one of the two detectors and wherein the first entangled photon is measured based upon which detector records a hit.

5. The system of claim 1 wherein the at least one processor operates to convert data into n qubits representing $2^n$ bits of data and to determine whether or not to transfer portions of data from a sequential successive qubit based upon the values measured by the at least one detector, and wherein based upon the values measured, data compression occurs such that fewer qubits are used to transfer a message to the receiver without changing the content of the data transferred.

6. A method of data transfer from a sender to a receiver comprising:
using at least one processor, converting data into a plurality of sequential qubits having information associated therewith;
providing first and second entangled photons from an entangled photon source;
associating the first entangled photon with the sender and the second entangled photon with the receiver;
performing a joint Bell state measurement on the second entangled photon and a first qubit of the plurality of sequential qubits;
obtaining a two-bit measurement from the joint Bell state measurement; the two bits indicating whether or not to perform a unitary transformation operation on the transferred qubit;
transmitting the two bits obtained from the two-bit measurement to the at least one receiver;
performing a unitary transformation operation on the first entangled photon and, using at least one photodetector, to measure the output of the unitary transformation operation to obtain the value of the qubit being transferred;
based upon the value or the qubit, determining whether or not to transmit portions of data from a sequential qubit, and wherein based upon the value of the qubit measured at the output of the unitary transformation operation, data compression occurs such that fewer qubits are used to transmit a message to the receiver without changing the content of the data transferred.

7. The method of claim 6 wherein the unitary transformation operation comprises an element that causes rotation in a 2D space.

8. The method of claim 6 wherein the plurality of sequential qubits comprises n qubits and wherein for n equal to 3, the first qubit represents a first group of four bins of data weighted for a first photon characteristic and a second group of four bins of data weighted for the conjugate of the first photon characteristic; and, depending upon the measured value of the first qubit, only one half of the data is used to prepare the second qubit, represented by $2^{(n-1)}$ bins for transmission.

9. The method of claim 6 wherein the third qubit represents four groups of two bins of data, and depending upon the measurement of the second qubit, a qubit representing 2 bins of data is transmitted and the remaining 6 bins of data are discarded.

10. The method of claim 6 wherein each of the at least one qubit represents $2^n$ bins of data, and for each successive qubit, data represented by the qubit is decreased by a factor of 2.

11. A system for data compression and transmission comprising a sender and a receiver,
an entangled photon source for providing first and second entangled photons; the first entangled photon of an entangled photon pair being utilized by the receiver, second entangled photon of an entangled photon pair being utilized by the receiver;
the sender comprising:
at least one processor for converting data into qubits of information;
an operator performing a Bell state measurement on the second entangled photon and a first qubit containing information; the Bell state measurement producing an output comprising two measurement bits;
a transmitter for transmitting the two measurement bits to the receiver;
the receiver comprising:
a device for performing a unitary transform operation on the first entangled photon based upon the two measurement bits to thereby obtain the information in the first qubit;
the at least one processor operating to determine whether or not to transmit portions of data from a sequential successive qubit based upon the value of the at least one qubit measured at the receiver location, and wherein based upon the value of the at least one qubit measured at the receiver location, data compression occurs such that fewer qubits are used to transmit a message to the receiver without changing the content of the data transferred.

12. The system of claim 11 further comprising a feedback circuit for transmitting the measured value of the first qubit to the sender prior to performing a Bell state operation between the second entangled photon and a second qubit;
whereby the transfer of data for each successive qubit is based upon the value measured for the preceding qubit and the sender utilizes only the data for each successive qubits which correlates to the measured value of the preceding qubit.

13. The system of claim 12 whereby the qubits are interrelated such that the measurement of the first qubit determines what portion of the data is necessary data for transfer of the second qubit.

14. The system of claim 11 wherein the at least one processor comprises at least one processor associated with the receiver and at least one processor associated with the sender, the at least one processor associated with the sender operating to:
  (a) divide a signal into a series of sections with each section comprising N samples of the signal;
  (b) prepare a first qubit from N samples of the signal using a Quantum Fourier transform;
and wherein the at least one processor associated with the receiver operates to:
  (c) pass the first entangled photon though a unitary transfer device;
  (d) measure each qubit and record the result of the measurement of each qubit;
and wherein the at least one processor associated with the sender operates to:
  (e) determine which half of the N samples of the current signal section are used as a subsection to prepare the next qubit, and discard the remainder;
  (f) prepare a next qubit generated from the original signal section with the next qubit using only half of the succeeding signal subsection;
  (g) pass the succeeding qubit though a phase shift device;
  (h) measure the succeeding qubit and record the result of the Bell state measurement;
  (i) determine which half of the N samples of the succeeding signal section are used as a subsection to prepare the next qubit, and discard the remainder;
  (j) repeat the steps (f) through (i) until the last qubit is prepared.

15. The system of claim 11 wherein at least one processor operates to convert data into qubits of information by:
  splitting an entangled polarization wave function into an arbitrarily oriented elliptical polarization state component and a comparator wave function state component for each of a plurality of qubits encoding an input data set, the input data set having a maximum amplitude;
  transmitting the comparator wave function state component to a detector;
  performing a controlled phase shift transform on the arbitrarily oriented elliptical polarization wave function state component to yield a phase shifted recombined state component;
  performing a quantum Hadamard gating transform on the phase shifted recombined state component to yield successive qubits each in one of two quantum Fourier transformed states;
  evaluating each of the successive qubits each in one of the two quantum Fourier transformed states based on coincidence with the comparator wave function state component to yield a plurality of coincident qubits; and
  reconstructing the input data set by inverse Fourier transforming the plurality of coincident qubits.

16. The system of claim 15 wherein at least one processor operates to perform a quantum Fourier transform on the arbitrarily oriented elliptical polarization state component prior to transmission to the receiver.

17. The system of claim 11 wherein the qubits of data originate from an input data set comprising sound into a light output and wherein the at least one processor operates to:
  perform a quantum Fourier transform on at least a portion of the light output to yield successive qubits each in one of two quantum Fourier transformed states;
  evaluate coincidence between qubits each in one of two quantum Fourier transformed states with a comparator wave function state component to yield a plurality of coincident qubits; and reconstruct the first sound at the receiver by inverse Fourier transforming the plurality of coincident qubits.

18. The system of claim 11 wherein the qubits of data originate from an input data set and further comprising:
  a light source having a photonic output for encoding the input data set;
  a nonlinear optical crystal of a type selected from the group consisting of a Type-I and Type-II receiving the photonic output to yield an entangled photonic output;
  a polarization modulator and a phase modulator for polarization and phase modulation of least a portion of the entangled photonic output to yield an arbitrarily oriented polarization state;
  a polarization interferometer performing a controlled phase shift transform on the arbitrarily oriented polarization state to yield an interferometer output;
  a half wave plate generating one of two photonic states from the interferometer output completing the quantum Fourier transform;
  electronics evaluating the quantum Fourier transform state based on coincident arrival of the one of two photonic signals and one of: the entangled photonic output or the interferometer output; and
  wherein the at least one processor performs an inverse Fourier transform on a set of coincident photons to reconstruct at the receiver the input data set.

19. The system of claim 18 wherein coincident arrival is determined with single photon counting modules.

20. The system of claim 18 wherein the nonlinear optical crystal is Type-I and the entangled photonic output is passed to the coincidence electronics via the interferometer and wherein the half wave plate is oriented to perform a quantum Hadamard transform, and wherein the polarization interferometer has a geometry selected from the group consisting of: Mach-Zehnder, Micklesen, and Sagnac.

* * * * *